United States Patent
Shimoshikiryoh et al.

(10) Patent No.: US 8,456,583 B2
(45) Date of Patent: Jun. 4, 2013

(54) LIQUID CRYSTAL DISPLAY DEVICE

(75) Inventors: Fumikazu Shimoshikiryoh, Osaka (JP);
Toshihide Tsubata, Osaka (JP);
Masanori Takeuchi, Osaka (JP); Masae Kitayama, Osaka (JP); Ikumi Itsumi, Osaka (JP); Akihiro Shohraku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 604 days.

(21) Appl. No.: 12/530,560

(22) PCT Filed: Mar. 6, 2008

(86) PCT No.: PCT/JP2008/054069
§ 371 (c)(1),
(2), (4) Date: Sep. 9, 2009

(87) PCT Pub. No.: WO2008/111490
PCT Pub. Date: Sep. 18, 2008

(65) Prior Publication Data
US 2010/0103339 A1    Apr. 29, 2010

(30) Foreign Application Priority Data

Mar. 15, 2007 (JP) ................................. 2007-066724
Oct. 29, 2007 (JP) ................................. 2007-280865

(51) Int. Cl.
*G02F 1/1343* (2006.01)
(52) U.S. Cl.
USPC .......................................................... 349/39
(58) Field of Classification Search
USPC .................................................... 349/38, 39
See application file for complete search history.

(56) References Cited

U.S. PATENT DOCUMENTS

| 4,345,249 A | 8/1982 | Togashi |
| 6,724,452 B1 | 4/2004 | Takeda et al. |
| 6,958,791 B2 | 10/2005 | Shimoshikiryo |
| 7,034,789 B2 | 4/2006 | Takeuchi et al. |
| 2002/0008685 A1 | 1/2002 | Ban et al. |

(Continued)

FOREIGN PATENT DOCUMENTS

| JP | 10-274783 A | 10/1998 |
| JP | 2005-250085 | 9/2005 |

OTHER PUBLICATIONS

International Search Report for PCT/JP2008/054069, mailed Apr. 22, 2008.

(Continued)

*Primary Examiner* — Bumsuk Won
*Assistant Examiner* — Michael Inadomi
(74) *Attorney, Agent, or Firm* — Nixon & Vanderhye P.C.

(57) ABSTRACT

A liquid crystal display device according to the present invention includes: a plurality of pixels that are arranged in rows and columns so as to form a matrix pattern; and TFTs (TFT-A, TFT-B and TFT-C), source bus lines, gate bus lines and CS bus lines (CS-A and CS-B), which are associated with the respective pixels. Each pixel includes at least three subpixels (SP-A, SP-B and SP-C) with liquid crystal capacitors that are able to retain mutually different voltages. By supplying a signal (CS-A or CS-B) that makes two of the at least three subpixels display mutually different luminances at least at a certain grayscale tone from the source, gate and CS bus lines to each pixel, the at least three subpixels are able to display mutually different luminances.

3 Claims, 49 Drawing Sheets

U.S. PATENT DOCUMENTS

| | | |
|---|---|---|
| 2002/0105509 A1 | 8/2002 | Johnson et al. |
| 2002/0190937 A1 | 12/2002 | Song |
| 2003/0227429 A1 | 12/2003 | Shimoshikiryoh et al. |
| 2004/0246423 A1* | 12/2004 | Sasabayashi et al. ......... 349/130 |
| 2005/0219186 A1 | 10/2005 | Kamada et al. |
| 2006/0092342 A1* | 5/2006 | Lee ................................. 349/38 |
| 2006/0221283 A1* | 10/2006 | Nakao et al. .................. 349/117 |
| 2008/0106660 A1 | 5/2008 | Kitayama et al. |
| 2008/0122772 A1 | 5/2008 | Takeuchi et al. |
| 2010/0182345 A1 | 7/2010 | Shimoshikiryoh et al. |

OTHER PUBLICATIONS

English translation of the International Preliminary Report on Patentability mailed Oct. 8, 2009 in corresponding PCT Application No. PCT/JP2008/054069.

Supplementary EP Search Report mailed Aug. 12, 2010 in corresponding EP application 08721489.6.

* cited by examiner

FIG.15
(a)
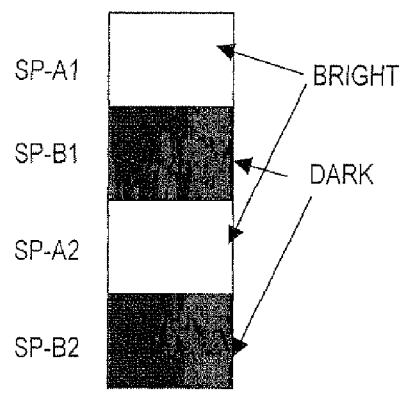
(b)
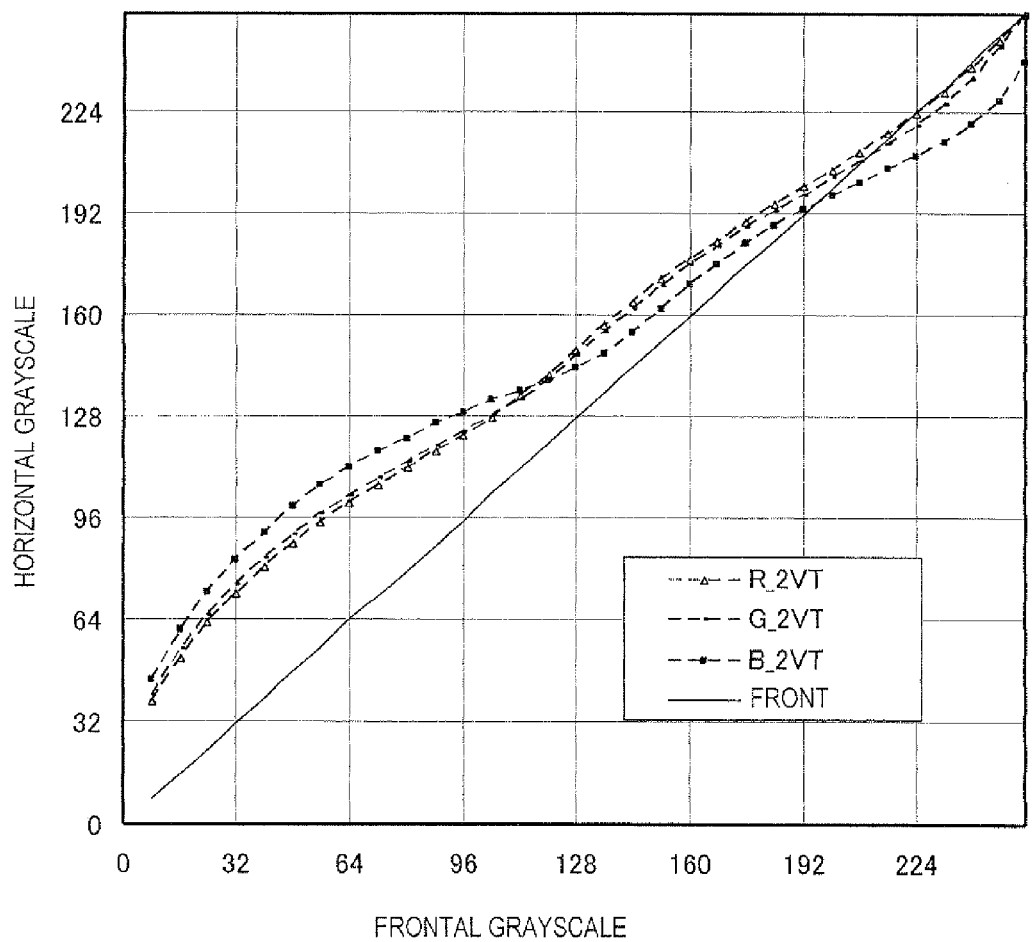

*FIG.16*
(a)
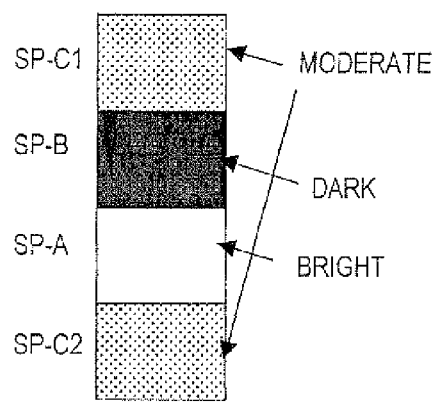
(b)
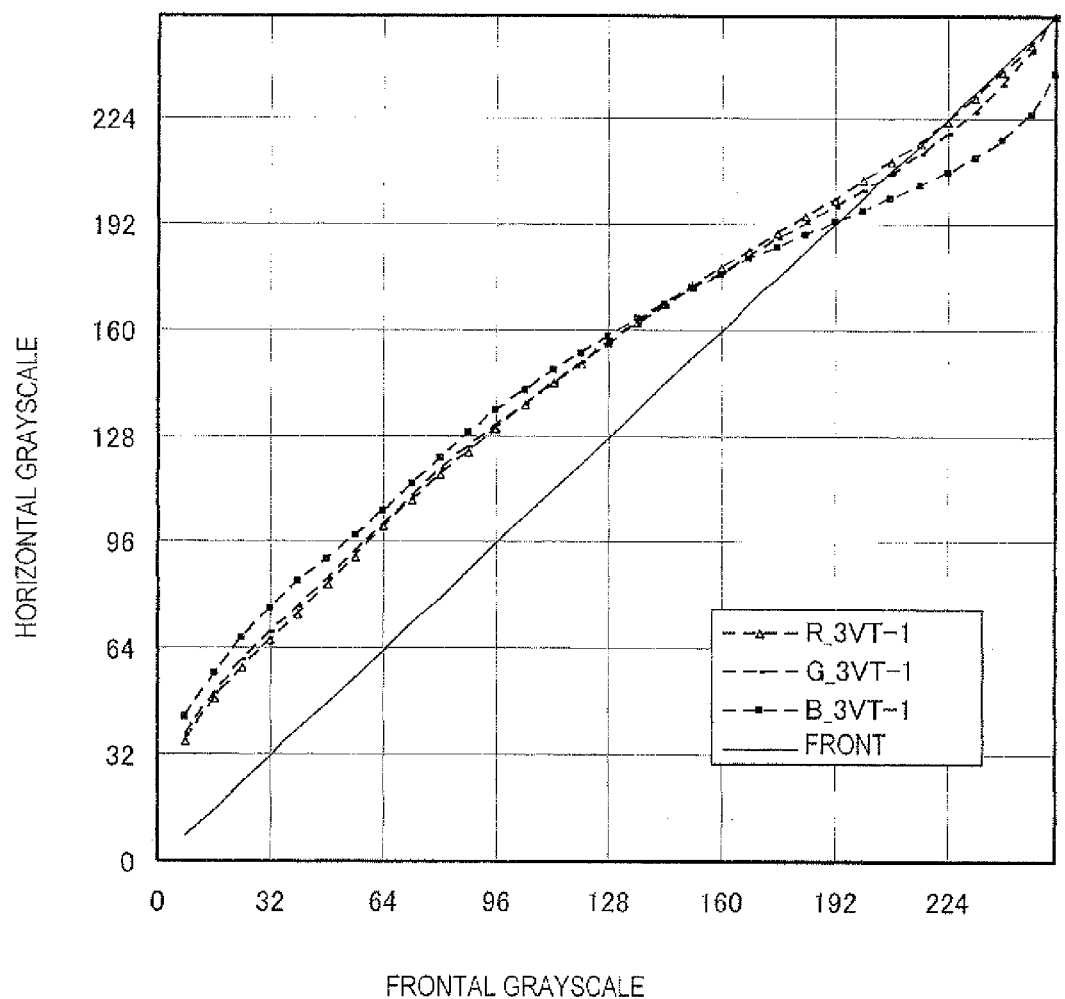

*FIG.17*
(a)
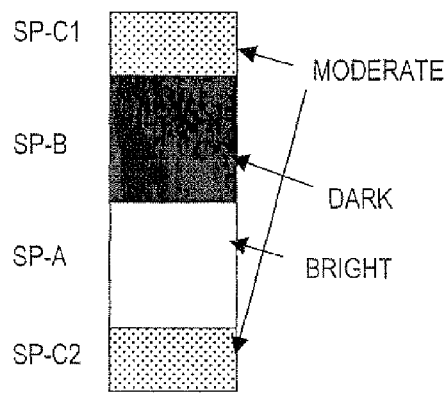
(b)
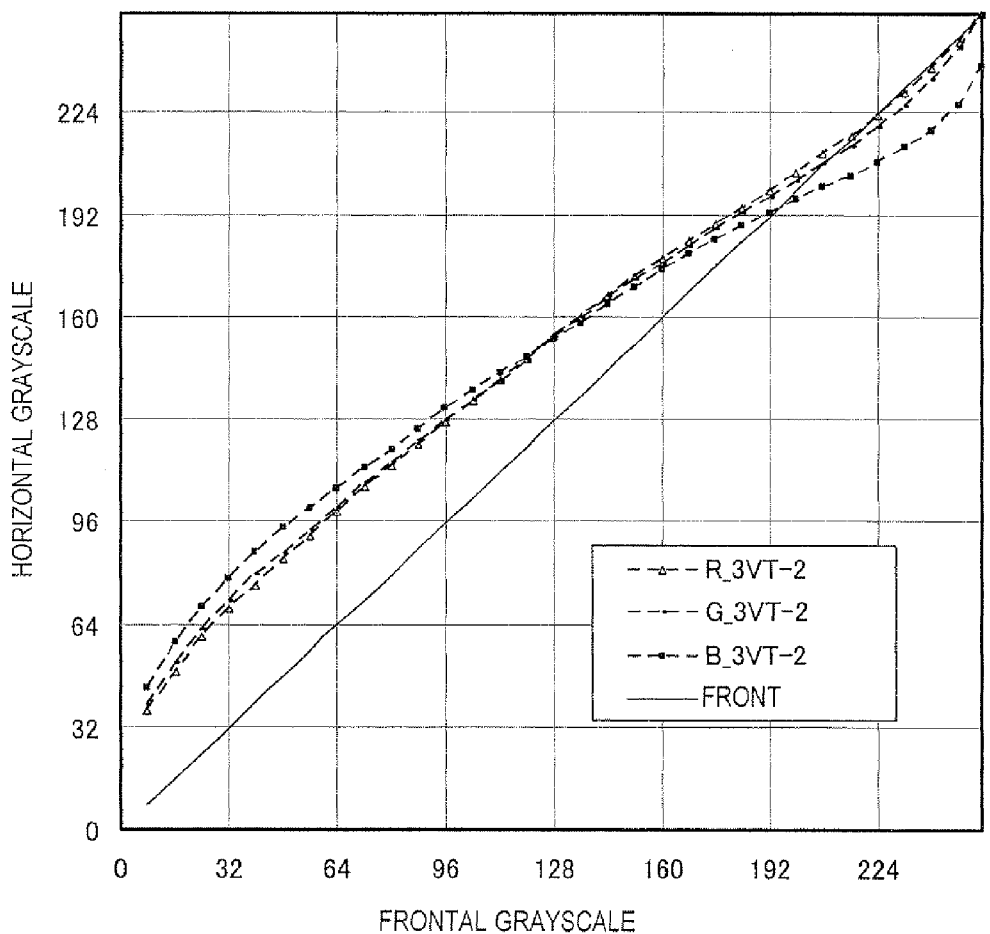

FIG.45
(a)
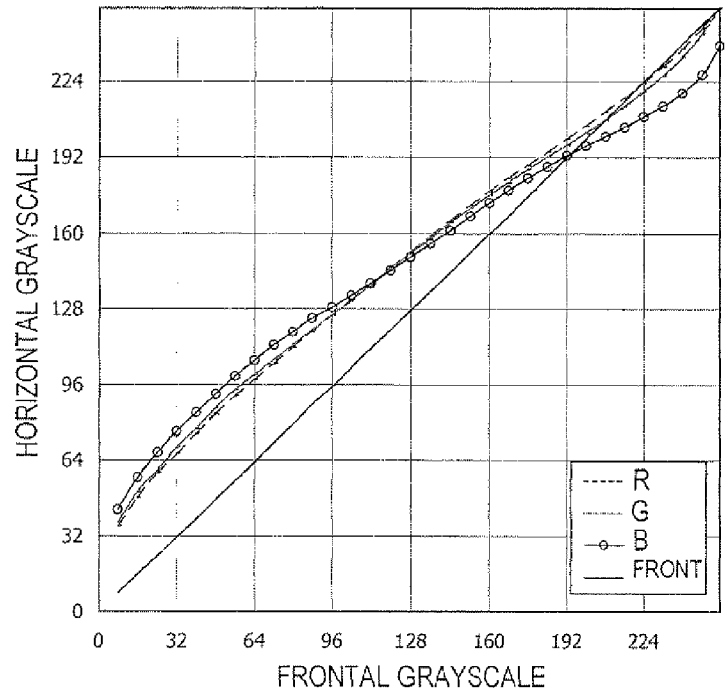
(b)
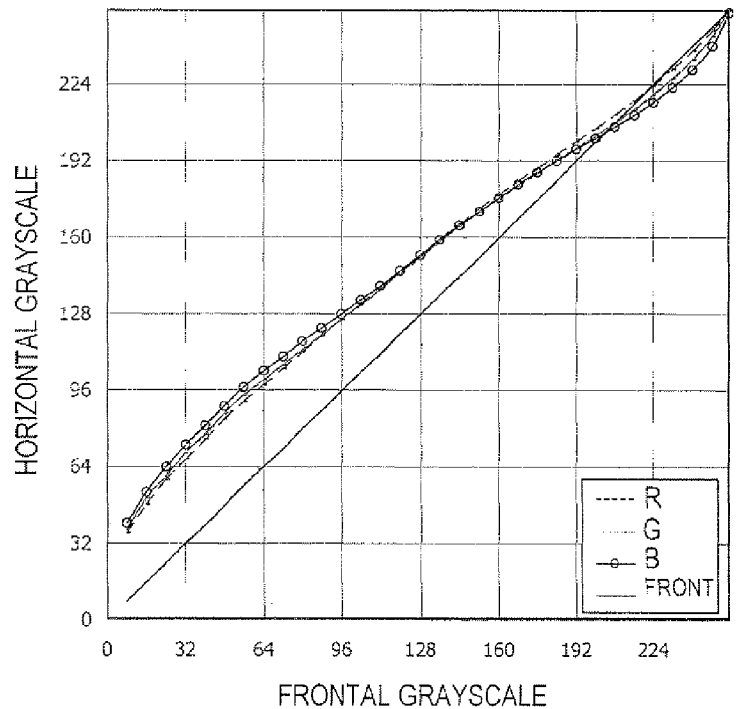

LIQUID CRYSTAL DISPLAY DEVICE

This application is the U.S. national phase of International Application No. PCT/JP2008/054069 filed 6 Mar. 2008, which designated the U.S. and claims priority to JP Application Nos. 2007-066724 filed 15 Mar. 2007; and 2007-280865 filed 29 Oct. 2007, the entire contents of each of which are hereby incorporated by reference.

TECHNICAL FIELD

The present invention relates to a liquid crystal display device and more particularly relates to a liquid crystal display device with a big screen that exhibits a wide viewing angle characteristic.

BACKGROUND ART

A liquid crystal display (LCD) is a flat-panel display that has a number of advantageous features including high resolution, drastically reduced thickness and weight, and low power dissipation. The LCD market has been rapidly expanding recently as a result of tremendous improvements in its display performance, significant increases in its productivity, and a noticeable rise in its cost effectiveness over competing technologies.

Among other things, in-plane switching (IPS) mode LCDs (see Patent Document No. 1, for example) and multi-domain vertical aligned (MVA) mode LCDs (see Patent Document No. 2, for example) have been used as liquid crystal display devices with a wide viewing angle characteristic, of which the contrast ratio on the screen does not decrease significantly, or of which the display grayscale does not invert, even when the image on the screen is viewed obliquely, in liquid crystal TV sets.

Although the display qualities of LCDs have been further improved nowadays, the problem of varying the γ characteristic with the viewing angle has arisen just recently. That is to say, the γ characteristic when an image on the screen is viewed straight is different from the characteristic when it is viewed obliquely. As used herein, the "γ characteristic" refers to the grayscale dependence of display luminance. That is why if the γ characteristic when the image is viewed straight is different from the characteristic when the same image is viewed obliquely, then it means that the grayscale display state changes according to the viewing direction. This is a serious problem particularly when a still picture such as a photo is presented or when a TV program is displayed.

The viewing angle dependence of the γ characteristic is more significant in the MVA mode rather than in the IPS mode. According to the IPS mode, however, it is more difficult to make panels that realize a high contrast ratio when the image on the screen is viewed straight with good productivity rather than in the MVA mode. Taking these circumstances into consideration, it is particularly necessary to reduce the viewing angle dependence of the γ characteristic of MVA mode liquid crystal display devices, among other things.

To overcome such a problem, the applicant (or the assignee) of the present application disclosed a liquid crystal display device that can reduce the viewing angle dependence of the γ characteristic (or an whitening phenomenon of an image among other things) by dividing a single pixel into a number of subpixels with mutually different brightness values, and a method for driving such a device in Patent Document No. 3. Such a display or drive mode will sometimes be referred to herein as "area-grayscale display", "area-grayscale drive", "multi-pixel display" or "multi-pixel drive".

Patent Document No. 3 discloses a liquid crystal display device in which storage capacitors CS are provided for respective subpixels SP of a single pixel P. In the storage capacitors, the storage capacitor counter electrodes (which are connected to storage capacitor lines) are electrically independent of each other between the subpixels. And by varying the voltages applied to the storage capacitor counter electrodes (which will be referred to herein as "storage capacitor counter voltages" or "CS signal voltages"), mutually different effective voltages can be applied to the respective liquid crystal layers of multiple subpixels by utilizing a capacitance division technique.

Hereinafter, the pixel division structure of the liquid crystal display device 900 disclosed in Patent Document No. 3 will be described with reference to FIG. 47. In this example, a liquid crystal display device including TFTs as switching elements will be described.

The pixel 10 is split into a subpixel 10a and another subpixel 10b. To the subpixels 10a and 10b, connected are their associated TFTs 16a and 16b and their associated storage capacitors (CS) 22a and 22b, respectively. The gate electrodes of the TFTs 16a and 16b are both connected to the same scan line 12 (which will also be referred to herein as a "gate bus line" or "G bus line"). And the source electrodes of the TFTs 16a and 16b are connected to the same signal line (which will also be referred to herein as a "source bus line" or "S bus line"). The storage capacitors 22a and 22b are connected to their associated storage capacitor lines (CS bus lines) 24a and 24b, respectively. The storage capacitor 22a includes a storage capacitor electrode that is electrically connected to the subpixel electrode 18a, a storage capacitor counter electrode that is electrically connected to the storage capacitor line 24a, and an insulating layer (not shown) arranged between the electrodes. The storage capacitor 22b includes a storage capacitor electrode that is electrically connected to the subpixel electrode 18b, a storage capacitor counter electrode that is electrically connected to the storage capacitor line 24b, and an insulating layer (not shown) arranged between the electrodes. The respective storage capacitor counter electrodes of the storage capacitors 22a and 22b are independent of each other and have such a structure as receiving mutually different storage capacitor counter voltages (CS signal voltages) from the storage capacitor lines 24a and 24b, respectively.

Hereinafter, the principle on which mutually different effective voltages can be applied to the respective liquid crystal layers of the two subpixels 10a and 10b of the liquid crystal display device 900 will be described with reference to the accompanying drawings.

FIG. 48 schematically shows the equivalent circuit of one pixel of the liquid crystal display device 900. In this electrical equivalent circuit, the liquid crystal capacitors of the respective subpixels SP-A. (10a) and SP-B (10b) are identified by CLC-A (13a) and CLC-B (13b), respectively. Each of these liquid crystal capacitors CLC-A and CLC-B includes a subpixel electrode 18a, 18b, a liquid crystal layer, and a counter electrode (that is shared by the subpixel electrodes 18a and 18b).

The liquid crystal capacitors CLC-A and CLC-B are supposed to have the same electrostatic capacitance CLC (V). The value of CLC (V) depends on the effective voltages (V) applied to the liquid crystal layers of the respective subpixels SP-A and SP-B. Also, the storage capacitors CCS-A (22a) and CCS-B (22b) that are connected independently of each other to the liquid crystal capacitors of the respective subpixels SP-A and SP-B are supposed to have the same electrostatic capacitance CCS.

In the subpixel SP-A, one electrode of the liquid crystal capacitor CLC-A and one electrode of the storage capacitor CCS-A are connected to the drain electrode of the TFT-A (16a), which is provided to drive the subpixel SP-A. The other electrode of the liquid crystal capacitor CLC-A is connected to the counter electrode. And the other electrode of the storage capacitor CCS-A is connected to the storage capacitor line CS-A (24a). In the subpixel SP-B, one electrode of the liquid crystal capacitor CLC-B and one electrode of the storage capacitor CCS-B are connected to the drain electrode of the TFT-B (16b), which is provided to drive the subpixel SP-B. The other electrode of the liquid crystal capacitor CLC-B is connected to the counter electrode. And the other electrode of the storage capacitor CCS-B is connected to the storage capacitor line CS-B (24b). The gate electrodes of the TFT-A and TFT-B are both connected to the G bus line (scan line) 12 and the source electrodes thereof are both connected to the S bus line (signal line) 14.

Portions (a) through (f) of FIG. 49 schematically show the timings to apply respective voltages to drive the liquid crystal display device 900.

Specifically, portion (a) of FIG. 49 shows the voltage waveform Vs of the S bus line 14; portion (b) of FIG. 49 shows the voltage waveform Vcsa of the CS bus line CS-A; portion (c) of FIG. 49 shows the voltage waveform Vcsb of the CS bus line CS-B; portion (d) of FIG. 49 shows the voltage waveform Vg of the G bus line 12; portion (e) of FIG. 49 shows the voltage waveform Vlca of the subpixel electrode 18a; and portion (f) of FIG. 49 shows the voltage waveform Vlcb of the subpixel electrode 18b. In FIG. 49, the dashed line indicates the voltage waveform COMMON (Vcom) of the counter electrode.

Hereinafter, it will be described with reference to portions (a) through (f) of FIG. 49 how the equivalent circuit shown in FIG. 48 operates.

First, at a time T1, the voltage Vg rises from VgL to VgH to turn the TFT-A and TFT-B ON simultaneously. As a result, the voltage Vs on the S bus line 14 is transmitted to the subpixel electrodes 18a and 18b to charge the liquid crystal capacitors CLC-A and CLC-B of the subpixels SP-A and SP-B with the voltage Vs. In the same way, the storage capacitors CCS-A and CCS-B of the respective subpixels are also charged with the voltage on the S bus line 14.

Next, at a time T2, the voltage Vg on the G bus line 12 falls from VgH to VgL to turn the TFT-A and TFT-B OFF simultaneously and electrically isolate the liquid crystal capacitors CLC-A and CLC-B of the subpixels SP-A and SP-B and the storage capacitors CCS-A and CCS-B from the S bus line 14. It should be noted that immediately after that, due to the feedthrough phenomenon caused by parasitic capacitances of the TFT-A and TFT-B and other factors, the voltages Vlca and Vlcb applied to the respective subpixel electrodes decrease by approximately the same voltage Vd to:

$$Vlca = Vs - Vd$$

$$Vlcb = Vs - Vd$$

respectively. Also, in this case, the voltages Vcsa and Vcsb on the CS bus lines are:

$$Vcsa = Vcom - Vad$$

$$Vcsb = Vcom + Vad$$

respectively.

Next, at a time T3, the voltage Vcsa on the CS bus line CS-A connected to the storage capacitor CCS-A rises from Vcom−Vad to Vcom+Vad and the voltage Vcsb on the CS bus line CS-B connected to the storage capacitor Csb falls from Vcom+Vad to Vcom−Vad. That is to say, these voltages Vcsa and Vcsb both change twice as much as Vad. As the voltages on the CS bus lines CS-A and CS-B change in this manner, the voltages Vlca and Vlcb applied to the respective subpixel electrodes change into:

$$Vlca = Vs - Vd + 2 \times Kc \times Vad$$

$$Vlcb = Vs - Vd - 2 \times Kc \times Vad$$

respectively, where Kc=CCS/(CLC(V)+CCS) and × is the symbol of multiplication.

Next, at a time T4, Vcsa falls from Vcom+Vad to Vcom−Vad and Vcsb rises from Vcom−Vad to Vcom+Vad. That is to say, these voltages Vcsa and Vcsb both change twice as much as Vad again. In this case, Vlca and Vlcb also change from $$Vlca = Vs - Vd + 2 \times Kc \times Vad$$

$$Vlcb = Vs - Vd - 2 \times Kc \times Vad$$

into $$Vlca = Vs - Vd$$

$$Vlcb = Vs - Vd$$

respectively.

Next, at a time T5, Vcsa rises from Vcom−Vad to Vcom+Vad and Vcsb falls from Vcom+Vad to Vcom−Vad. That is to say, these voltages Vcsa and Vcsb both change twice as much as Vad again. In this case, Vlca and Vlcb also change from $$Vlca = Vs - Vd$$

$$Vlcb = Vs - Vd$$

into $$Vlca = Vs - Vd + 2 \times Kc \times Vad$$

$$Vlcb = Vs - Vd - 2 \times Kc \times Vad$$

respectively.

After that, every time a period of time that is an integral number of times as long as one horizontal scanning period (or one horizontal write period) 1H has passed, the voltages Vcsa, Vcsb, Vlca and Vlcb alternate their levels at the times T4 and T5. Consequently, the effective values of the voltages Vlca and Vlcb applied to the subpixel electrodes become:

$$Vlca = Vs - Vd + Kc \times Vad$$

$$Vlcb = Vs - Vd - Kc \times Vad$$

respectively.

Therefore, the effective voltages V1 and V2 applied to the liquid crystal layers 13a and 13b of the subpixels SP-A and SP-B become:

$$V1 = Vlca - Vcom$$

$$V2 = Vlcb - Vcom$$

That is to say, $$V1 = Vs - Vd + Kc \times Vad - Vcom$$

$$V2 = Vs - Vd - Kc \times Vad - Vcom$$

respectively.

As a result, the difference ΔV12 (=V1−V2) between the effective voltages applied to the liquid crystal layers 13a and 13b of the subpixels SP-A and SP-B becomes ΔV12==2×Kc×

Vad (where Kc=CCS/(CLC(V)+CCS)). Thus, mutually different voltages can be applied to the liquid crystal layers 13a and 13b.

FIG. 50 schematically shows the relation between V1 and V2. As can be seen from FIG. 50, the smaller the V1 value, the bigger ΔV12 in the liquid crystal display device 900. Since ΔV12 increases as the V1 value decreases in this manner, the whitening phenomenon can be reduced, among other things.

However, if the multi-pixel structure disclosed in Patent Document No. 3 is applied to either a high-definition LCD TV monitor or a large-screen LCD TV monitor, the following problem will arise. Specifically, as the definition or the screen size of a display panel increases, the oscillating voltage comes to have an even shorter period of oscillation. Consequently, it becomes increasingly difficult (and expensive) to make a circuit for generating the oscillating voltage, the power dissipation will increase too much, or the influence of waveform blunting due to the electrical load impedance of the CS bus lines will be more and more significant. Nevertheless, if a plurality of electrically independent CS trunks are arranged and connected to the multiple CS bus lines as disclosed in Patent Document No. 4, one period of oscillation of the oscillating voltage applied to the storage capacitor counter electrodes via the CS bus lines can be extended. The entire disclosures of Patent Documents Nos. 3 and 4 are hereby incorporated by reference.

Patent Document No. 1: Japanese Patent Gazette for Opposition No. 63-21907
Patent Document No. 2: Japanese Patent Application Laid-Open Publication No. 11-242225
Patent Document No. 3: Japanese Patent Application Laid-Open Publication No. 2004-62146 (corresponding to U.S. Pat. No. 6,958,791)
Patent Document No. 4: WO 2006/070829 A1

DISCLOSURE OF INVENTION

Problems to be Solved by the Invention

The applicant (or assignee) of the present application is commercially selling big-screen LCD TV sets with a liquid crystal display device, to which the multi-pixel technology disclosed in Patent Documents Nos. 3 and 4 is applied. The conventional multi-pixel technology adopts a dual subpixel structure in which each pixel is split into two subpixels with mutually different luminances (i.e., a bright subpixel and a dark subpixel). However, the present inventors discovered that such a dual subpixel structure would not be enough to further increase the screen size and further reduce the viewing angle dependence of the γ characteristic. Specifically, the bigger the size of a single pixel becomes as the screen size of a display device increases, the more easily the checkerboard pattern formed by the bright and dark subpixels will be seen as jaggedness of the image on the screen when a grayscale tone is displayed.

Also, the two division structure averages the degrees of viewing angle dependence of the γ characteristic by superposing the V-T curves (i.e., voltage-luminance (display grayscale) curves) of the two subpixels one upon the other. That is why the γ characteristic curve at an oblique viewing angle does not vary smoothly but comes to have a locally depressed portion. Consequently, when viewed from an oblique viewing angle, the image on the screen will look unnatural, which is a problem.

To overcome such a problem, each pixel may be divided into three or more subpixels. In other words, the V-T curve of a single pixel may be represented by superposing three or more different V-T curves one upon the other. To increase the pixel division number according to the multi-pixel technology disclosed in Patent Document No. 3, the number of electrically independent storage capacitor counter voltages (CS signal voltages) may be increased along with the pixel division number.

However, to provide electrically independent storage capacitor counter voltages, the number of CS trunks should be increased and the drivers should get complicated, thus increasing the overall cost. In order to make big-screen LCD TVs even more popular, reasonable pricing is no less important as improvement of their display performance. That is why it is difficult to adopt such a method.

It is therefore an object of the present invention to provide a liquid crystal display device that realizes a multi-subpixel structure with three or more subpixels without complicating the driver of a conventional liquid crystal display device having the dual subpixel structure.

Means for Solving the Problems

A liquid crystal display device according to the present invention includes: a plurality of pixels that are arranged in rows and columns so as to form a matrix pattern; and TFTs, source bus lines, gate bus lines and CS bus lines, which are associated with the respective pixels. Each said pixel includes at least three subpixels with liquid crystal capacitors that are able to retain mutually different voltages. By supplying a signal that makes two of the at least three subpixels display mutually different luminances at least at a certain grayscale tone from the source, gate and CS bus lines to each said pixel, the at least three subpixels are able to display mutually different luminances.

In one preferred embodiment, each said pixel is associated with at least three TFTs for the at least three subpixels, one source bus line, at least one gate bus line and at least two CS bus lines. Each of the TFTs associated with the at least three subpixels includes a gate electrode, a source electrode and a drain electrode.

In one preferred embodiment, the at least three subpixels have liquid crystal capacitors, which include at least three subpixel electrodes, a liquid crystal layer, and a counter electrode that faces the at least three subpixel electrodes with the liquid crystal layer interposed between them. The counter electrode is a single electrode that is provided in common for the at least three subpixel electrodes.

In one preferred embodiment, if the at least three subpixels are comprised of first, second and third subpixels and the at least two CS bus lines are comprised of first and second CS bus lines, the first subpixel has a storage capacitor that is connected to the first CS bus line, the second subpixel has a storage capacitor that is connected to the second CS bus line, and the third subpixel has a storage capacitor that is connected to the first CS bus line and a storage capacitor that is connected to the second CS bus line.

In one preferred embodiment, the gate bus line includes first and second gate lines, the first CS bus line includes first and second CS lines, and the second CS bus line includes third and fourth CS lines.

In one preferred embodiment, the first and second gate lines, the first and second CS lines and the third and fourth CS lines are all branched within the liquid crystal display device.

In one preferred embodiment, the first, second and third subpixels are arranged in a column direction, and the third subpixel is arranged between the first and second subpixels.

In one preferred embodiment, the third subpixel includes a TFT, of which the gate electrode is connected to the first gate line, and another TFT, of which the gate electrode is connected to the second gate line.

In one preferred embodiment, the gate bus line further includes an interconnect that connects the first and second gate lines together. The CS bus line further includes an interconnect that connects the first and second CS lines together and/or an interconnect that connects the third and fourth CS lines together. The interconnect of the gate bus line is made of the same material as the first and second gate lines of the gate bus line. And the interconnects of the CS bus line are made of the same material as the source bus line.

In one preferred embodiment, in the third subpixel, the storage capacitor connected to the first CS bus line and the storage capacitor connected to the second CS bus line have substantially equal electrostatic capacitance values.

In one preferred embodiment, if the first, second and third subpixels display mutually different luminances, the luminance of the third subpixel is higher than that of one of the first and second subpixels but lower than that of the other. And the respective third subpixels are arranged in stripes in the column direction.

In one preferred embodiment, the first and second subpixels are arranged in the column direction, and the source bus line is arranged between the first and second subpixels and the third subpixel.

In one preferred embodiment, the first, second and third subpixels have an area ratio of one to one to one.

In one preferred embodiment, the third subpixel straddles the gate bus line.

In one preferred embodiment, the subpixel electrode of the third subpixel straddles the gate bus line.

In one preferred embodiment, when measured in a row direction, the length of a portion of the subpixel electrode of the third subpixel, which straddles the gate bus line, is smaller than the maximum length of the subpixel electrode of the third subpixel.

In one preferred embodiment, the drain electrode of the TFT of the third subpixel straddles the gate bus line.

In one preferred embodiment, the subpixel electrode of the third subpixel includes first and second electrodes. The drain electrode of the TFT of the third subpixel is arranged parallel to the source bus line and connects together the first and second electrodes of the subpixel electrode of the third subpixel.

In one preferred embodiment, a portion of the drain electrode of the TFT of the third subpixel that overlaps with the gate bus line has a smaller area than a portion of the drain electrode of the TFT of the first and second subpixels that overlaps with the gate bus line.

In one preferred embodiment, the first and second subpixels are arranged in the column direction. The third subpixel has first and second regions. The source bus line includes a first source line that is arranged between the first and second subpixels and the first region of the third subpixel and a second source line that is arranged between the first and second subpixels and the second region of the third subpixel. When measured in the column direction, each of the first and second subpixels is a half as long as each of the first and second regions of the third subpixel. And when measured in the row direction, each of the first and second subpixels is approximately four times as long as the first or second region of the third subpixel.

In one preferred embodiment, the third subpixel includes subpixel electrodes that are provided for the first and second regions, and multiple TFTs are connected to each of the subpixel electrodes of the first, second and third subpixels.

In one preferred embodiment, multiple TFTs are provided for each of the first and second source lines. The third subpixel includes TFTs that are provided for the first and second regions. And each of the drain electrodes of the TFTs that are provided for the first and second regions of the third subpixel has a smaller area than the area of each of the drain electrodes of the TFTs of the first and second subpixels.

In one preferred embodiment, multiple TFTs are provided for each of the first and second subpixels, and the number of TFTs provided for each of the first and second regions is smaller than that of TFTs provided for each of the first and second subpixels.

In one preferred embodiment, at a certain grayscale tone, the first subpixel has a higher luminance than any other of the at least three subpixels, and at least one of the second and third subpixels has two areas that are arranged so as to interpose the first subpixel between them.

In one preferred embodiment, the at least one of the second and third subpixels includes a subpixel electrode that extends continuously through the two regions.

In one preferred embodiment, the subpixel electrode that extends continuously through the two regions has a ring shape.

In one preferred embodiment, the subpixel electrode that extends continuously through the two regions has a U-shape.

In one preferred embodiment, the at least one of the second and third subpixels includes two subpixel electrodes, which are provided for the two regions and which are connected together with a drain extension line that is connected to the drain electrode of the TFT associated with that subpixel.

In one preferred embodiment, the liquid crystal display device includes three drain extension lines that are respectively connected to the drain electrodes of the three TFTs. At least one of the first and second CS bus lines has an extended portion. The extended portion overlaps with at least one of the three or more subpixel electrodes and the three drain extension lines with an insulating layer interposed between them.

In one preferred embodiment, the extended portion that the at least one of the first and second CS bus lines has includes a ringlike portion.

In one preferred embodiment, a portion of at least one line selected from the group consisting of the drain extension line, the source bus line, and the first and second CS bus lines is arranged in a gap between two adjacent ones of the at least three subpixel electrodes.

In one preferred embodiment, the liquid crystal display device includes a vertical alignment liquid crystal layer, and the gap between the two adjacent ones of the at least three subpixel electrodes includes a gap that extends in a direction that defines an angle of approximately 45 degrees with respect to the column direction.

In one preferred embodiment, the first, second and third subpixels are arranged between the first and second CS bus lines, each of which is connected to the storage capacitor of a pixel that is adjacent to the line in the column direction.

In one preferred embodiment, in each of the subpixel electrodes of the first, second and third subpixels, the two sides thereof running in the column direction have approximately equal lengths.

In one preferred embodiment, the at least one gate bus line includes first and second gate lines. The third subpixel includes a TFT, of which the gate electrode is connected to the first gate line, and a TFT, of which the gate electrode is connected to the second gate line. The drain electrodes of these two TFTs of the third subpixel are respectively connected to two drain extension lines, which intersect with the at least one gate bus line.

In one preferred embodiment, the at least one gate bus line includes a gate line. The third subpixel includes two TFTs, of which the gate electrodes are connected to the gate line. The drain electrodes of the two TFTs of the third subpixel are respectively connected to the two drain extension lines. And the subpixel electrode of the third subpixel straddles the gate bus line.

In one preferred embodiment, the subpixel electrode of the third subpixel includes a first electrode, a second electrode, and a coupling portion that couples the first and second electrodes together. When measured in the row direction, the coupling portion is shorter than the first and second electrodes.

In one preferred embodiment, the coupling portion of the subpixel electrode of the third subpixel is located around the center of the pixel in the row direction.

In one preferred embodiment, the respective gate electrodes of the TFT of the first subpixel and one of the two TFTs of the third subpixel and/or the respective gate electrodes of the TFT of the second subpixel and the other TFT of the third subpixel are arranged so as to form integral parts of a gate electrode section and connected to the gate bus line. The respective drain electrodes of the TFTs of the first and second subpixels overlap with the gate electrode section and the gate bus line.

In one preferred embodiment, the two drain extension lines overlap with the first and second CS bus lines, respectively. The subpixel electrodes of the first and second subpixels do not overlap with a region where the two drain extension lines overlap with the first and second CS bus lines.

In one preferred embodiment, the subpixel electrode of the third subpixel is connected to the two drain extension lines through contact holes, and the two drain extension lines have storage capacitor electrodes that overlap with the first and second CS bus lines respectively.

In one preferred embodiment, the at least one gate bus line includes first and second gate lines, and the third subpixel includes a TFT, of which the gate electrode is connected to either the first gate line or the second gate line.

In one preferred embodiment, the drain electrode of the TFT of the third subpixel is connected to a drain extension line, which overlaps with the first and second CS bus lines. And the subpixel electrodes of the first and second subpixels do not overlap with a region where the drain extension line overlaps with the first and second CS bus lines.

In one preferred embodiment, when viewed in the row direction, the gate electrode of the TFT of each said third subpixel is connected to one of the two gate lines after another at least every other pixel.

In one preferred embodiment, in two pixels that are adjacent to each other in the row direction, the gate electrode of the TFT of the third subpixel in one of the two pixels is connected to the first gate line, while the gate electrode of the TFT of the third subpixel, in the other pixel is connected to the second gate line.

In one preferred embodiment, the drain electrode of the TFT of the third subpixel has a smaller area than that of the TFT of the first and second subpixels.

In one preferred embodiment, the first, second and third subpixels have substantially equal areas.

In one preferred embodiment, each said pixel further includes a fourth subpixel, and the fourth subpixel includes a storage capacitor that is connected to the first CS bus line and a storage capacitor that is connected to the second CS bus line.

In one preferred embodiment, if the storage capacitors that are connected to the first and second CS bus lines in the third subpixel are called a first storage capacitor and a second storage capacitor, respectively, and if the storage capacitors that are connected to the first and second CS bus lines in the fourth subpixel are called a third storage capacitor and a fourth storage capacitor, respectively, then the first and second storage capacitors have mutually different electrostatic capacitance values, and the third and fourth storage capacitors have mutually different electrostatic capacitance values.

In one preferred embodiment, the source bus line includes first and second source lines. The first and second subpixels are arranged in the column direction between the first and second source lines. The third subpixel is arranged with respect to the first and second subpixels with the first source line interposed between them, and the fourth subpixel is arranged with respect to the first and second subpixels with the second source line interposed between them.

In one preferred embodiment, the third and fourth subpixels straddle the gate bus line.

In one preferred embodiment, each of the first, second, third and fourth subpixels has a plurality of TFTs.

In one preferred embodiment, the subpixel electrodes of the third and fourth subpixels straddle the gate bus line.

In one preferred embodiment, when measured in the row direction, the length of respective portions of the subpixel electrodes of the third and fourth subpixels, which straddle the gate bus line, is smaller than the maximum length of the subpixel electrodes of the third and fourth subpixels.

In one preferred embodiment, the drain electrodes of the TFTs of the third and fourth subpixels straddle the gate bus line.

In one preferred embodiment, the subpixel electrode of each of the third and fourth subpixels includes two electrodes. The drain electrode of the TFT of each of the third and fourth subpixels is arranged parallel to the source bus line and connects together the two electrodes of its associated subpixel electrode.

In one preferred embodiment, the respective drain electrodes of the TFTs of the first, second, third and fourth subpixels overlap with the gate bus line, and a portion of the drain electrode of the TFT of each of the third and fourth subpixels that overlaps with the gate bus line has a smaller area than a portion of the drain electrode of the TFT of each of the first and second subpixels that overlaps with the gate bus line.

In one preferred embodiment, each of the first and second subpixels has a plurality of TFTs, and the third and fourth subpixels have a smaller number of TFTs than the first and second subpixels.

In one preferred embodiment, the first, second, third and fourth subpixels have approximately equal areas.

In one preferred embodiment, if the at least three subpixels are comprised of first, second and third subpixels and the at least two CS bus lines are comprised of first and second CS bus lines, the first subpixel has a storage capacitor that is connected to the first CS bus line, the second subpixel has a storage capacitor that is connected to the second CS bus line, and the third subpixel has a storage capacitor that is connected to the at least one gate bus line.

In one preferred embodiment, the first, second and third subpixels are arranged between two adjacent gate bus lines. The respective gate electrodes of the TFTs of the first, second and third subpixels are connected to one of the two gate bus lines. The first and second CS bus lines are also arranged between the two gate bus lines. The storage capacitor of the third subpixel is connected to the other gate bus line of the two.

In one preferred embodiment, the first, second and third subpixels are arranged between the first and second CS bus lines, and the storage capacitor of the third subpixel is connected to a gate bus line for selecting pixels that are adjacent to each other in the column direction.

In one preferred embodiment, the pixels include a red pixel to represent the color red, a blue pixel to represent the color blue, and a green pixel to represent the color green, and the blue pixel has a narrower cell gap than the red pixel or the green pixel.

Effects of the Invention

The present invention provides a liquid crystal display device that realizes a three division structure without complicating the driver, thus contributing to improving the display quality (especially in terms of the viewing angle dependence of the γ characteristic) while suppressing the increase in cost.

BRIEF DESCRIPTION OF DRAWINGS

FIGS. 15(a) and 15(b) respectively show an arrangement of subpixels and the viewing angle dependence of a γ characteristic in a situation where a two division structure (2VT structure) is adopted.

FIGS. 16(a) and 16(b) respectively show a preferred arrangement of subpixels and the viewing angle dependence of a γ characteristic in a situation where a three division structure (3VT structure) is adopted.

FIGS. 17(a) and 17(b) respectively show another preferred arrangement of subpixels and the viewing angle dependence of a γ characteristic in a situation where a three division structure (3VT structure) is adopted.

FIGS. 45(a) and 45(b) are graphs showing the viewing angle characteristics of liquid crystal display devices with the 4VT structure.

Figure 49:
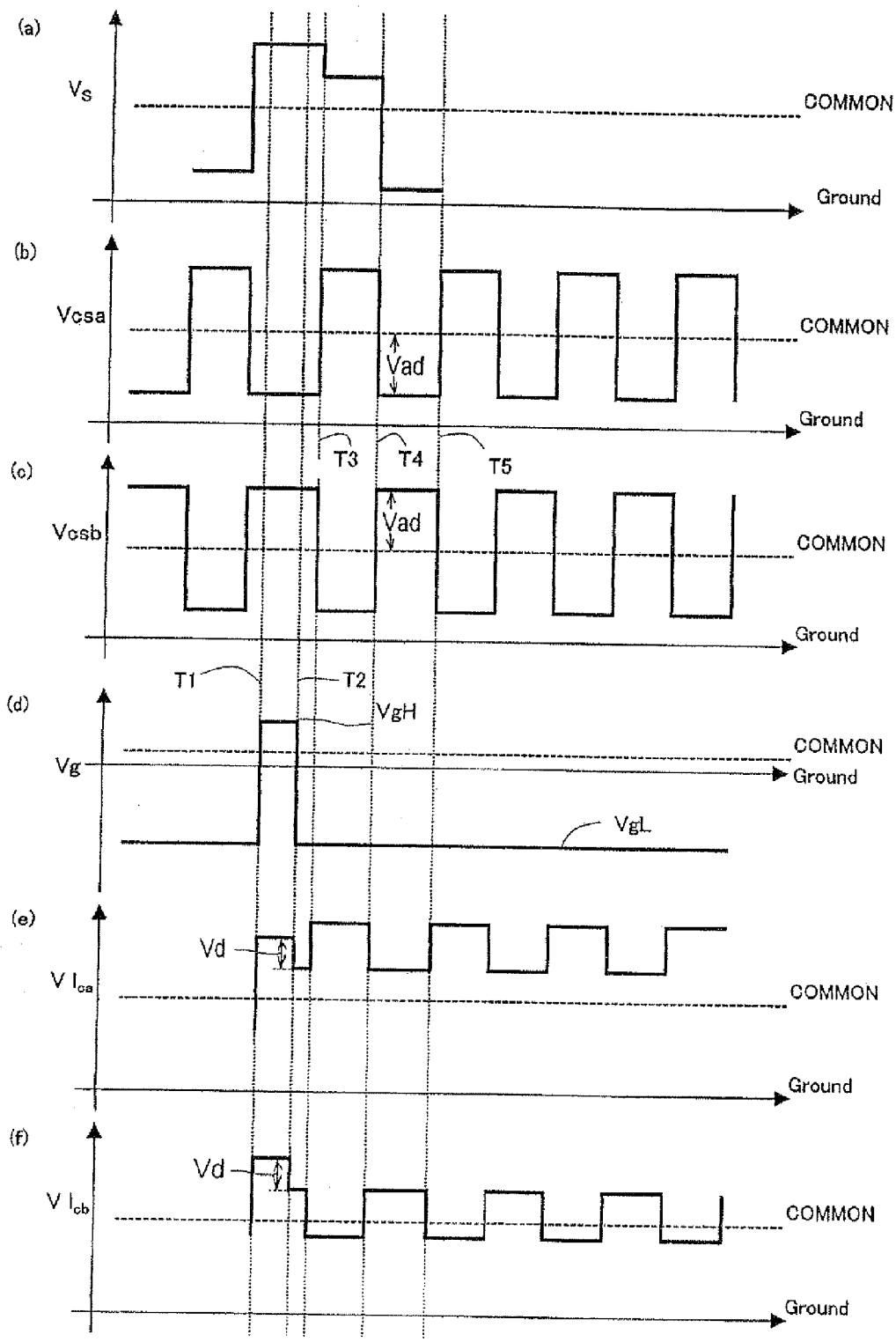

Portions (a) through (f) of FIG. 49 show the timings to apply respective voltages to drive the liquid crystal display device 900.

Figure 50:
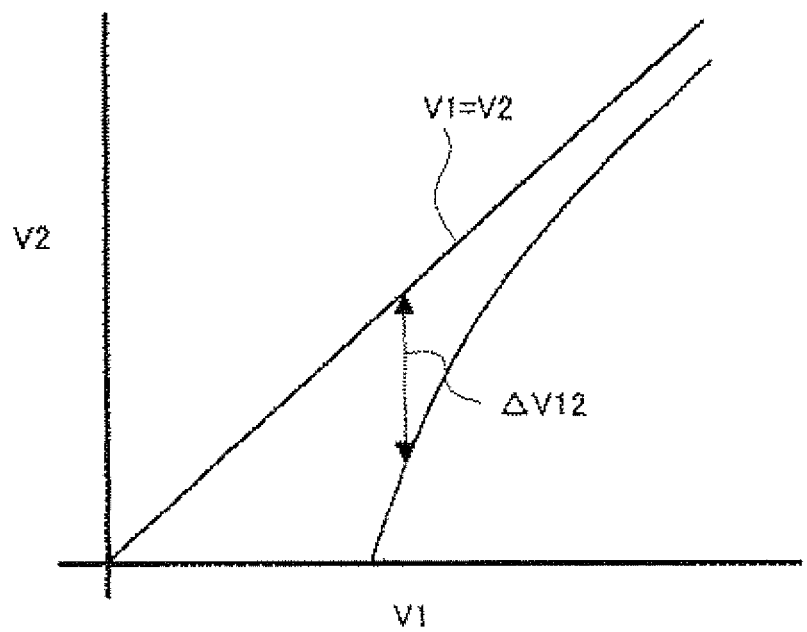

FIG. 50 shows a relation between the voltages applied to the liquid crystal layers of respective subpixels in the liquid crystal display device 900.

DESCRIPTION OF REFERENCE NUMERALS 10 pixel
10a, 10b subpixel
12 scan line (gate bus line)
14 signal line (source bus line)
16a, 16b TFT
18a, 18b subpixel electrode
100A, 100B, 100B, 100C, 100D, 200A, 200B, 200C, 200C', 200D, 300B, 300C, 300D, 300E, 300F, 400A, 400B, 500A, 500B, 500C, 500D, 600A, 600B, 600C, 600C1, 600C2, 600C3, 600C4 liquid crystal display device
111a, 111b, 111c subpixel electrode
112 gate bus line (G bus line)
113 CS bus line
114 source bus line (S bus line)
116a, 116b, 116c TFT
117a, 117b, 117c, 117c1, 117c2, 117d1, 117d2 drain extension line
118a, 118b, 118c1, 118c2, 118d1, 118d2 storage capacitor electrode
119a, 119b, 119c contact portion
SP-A, SP-B, SP-C, SP-D subpixel
TFT-A, TFT-A1, TFT-A2, TFT-B, TFT-B1, TFT-B2, TFT-C, TFT-C1, TFT-C2, TFT-D, TFT-D1, TFT-D2 thin-film transistor
CCS-A, CCS-B, CCS-C, CCS-C1, CCS-C2, CCS-D, CCS-D1, CCS-D2 storage capacitor
CLC-A, CLC-B, CLC-C, CLC-D liquid crystal capacitor

BEST MODE FOR CARRYING OUT THE INVENTION

Hereinafter, configurations for a liquid crystal display device as a preferred embodiment of the present invention and a TFT substrate for use in the device will be described with reference to the accompanying drawings. It should be noted that the present invention is in no way limited to specific preferred embodiments to be described below.

Figure 1:
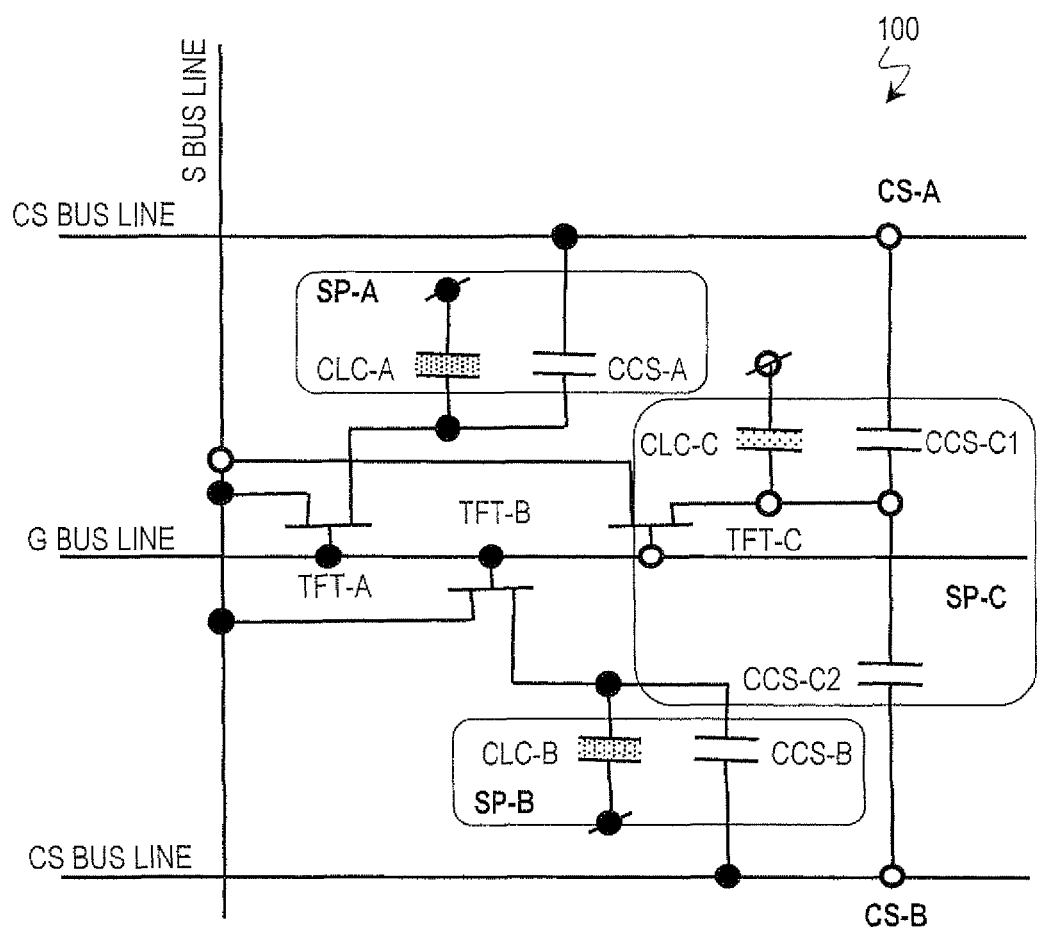
FIG. 1 schematically illustrates an equivalent circuit representing one pixel of a liquid crystal display device 100 as a preferred embodiment of the present invention.

FIG. 1 schematically illustrates an equivalent circuit of one pixel of a liquid crystal display device 100 as a specific preferred embodiment of the present invention. Each pixel of the liquid crystal display device 100 includes three subpixels SP-A, SP-B and SP-C and is associated with three thin-film transistors TFT-A, TFT-B and TFT-C (for the three subpixels SP-A, SP-B and SP-C, respectively), one source bus line (S bus line), one gate bus line (G bus line) and two CS bus lines CS-A and CS-B.

Figure 48:
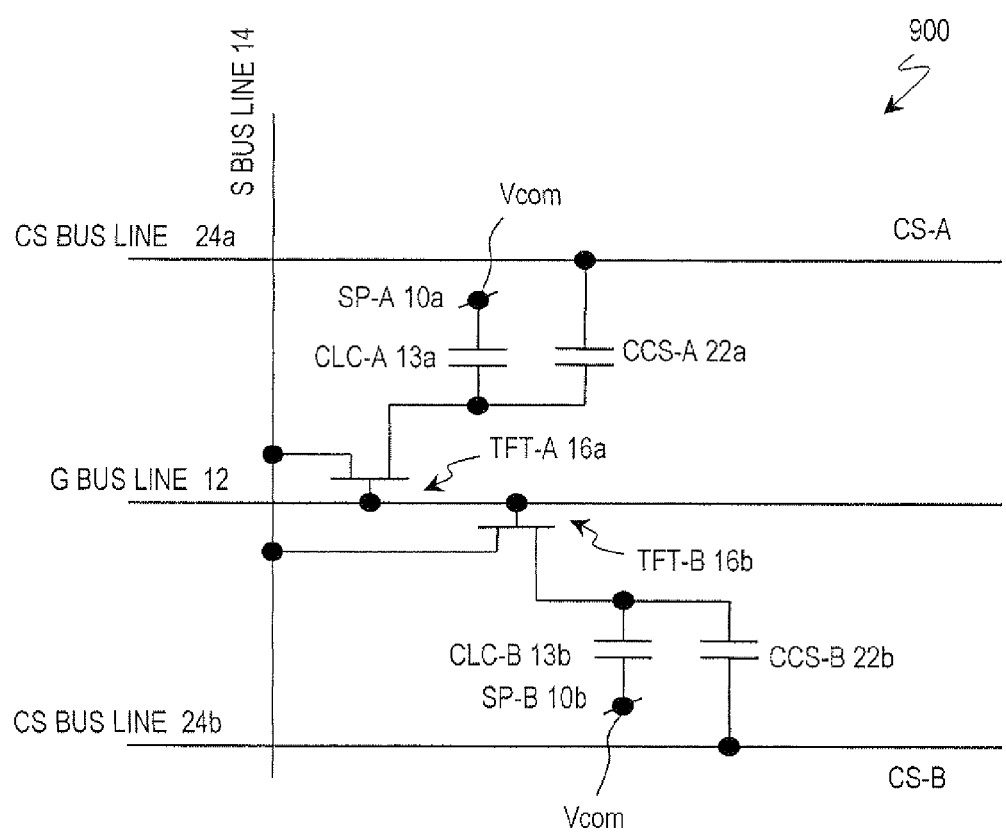
FIG. 48 schematically illustrates an equivalent circuit representing one pixel of the liquid crystal display device 900.

Comparing the liquid crystal display device 100 to the equivalent circuit of the conventional liquid crystal display device 900 shown in FIG. 48, it can be seen easily that each pixel of the liquid crystal display device 100 has three subpixels SP-A, SP-B and SP-C but the rest of the liquid crystal display device 100, other than the pixel, has the same number of G bus line, S bus line and CS bus lines and the same driver (not shown) for supplying signals (or voltages) to these lines as the conventional liquid crystal display device 900. In this manner, the liquid crystal display device 100 realizes a three division structure without complicating the driver of the conventional liquid crystal display device 900 with the two division structure. Consequently, according to this preferred embodiment of the present invention, the display quality (especially in terms of the viewing angle dependence of the γ characteristic) can be improved with the increase in cost reduced.

In the liquid crystal display device 100, the two subpixels SP-A and SP-B are connected to TFT-A, TFT-B, the G bus line, the S bus line and the two electrically independent CS bus lines in quite the same way as in the liquid crystal display device 900, and the description thereof will be omitted herein for the sake of simplicity. The third subpixel SP-C that is an additional subpixel for the liquid crystal display device 900 is connected in the following manner. The subpixel SP-C includes a liquid crystal capacitor CLC-C and two storage capacitors CCS-C1 and CCS-C2. One electrode (i.e., subpixel electrode) of the liquid crystal capacitor CLC-C, one electrode (i.e., the storage capacitor electrode) of the storage capacitor CCS-C1 and one electrode of the storage capacitor CCS-C2 are all connected to the drain electrode of TFT-C. Just like the other thin-film transistors TFT-A and TFT-B, TFT-C also has its gate electrode connected to the common G bus line and has its source electrode connected to the S bus line. The other electrode (i.e., the counter electrode) of the liquid crystal capacitor CLC-C is the counter electrode that is shared in common by the other liquid crystal capacitors CLC-A and CLC-B. On the other hand, the other electrode (i.e., the storage capacitor counter electrode) of the storage capacitor CCS-C1 is connected to the CS bus line CS-A, while the other electrode (i.e., the storage capacitor counter electrode) of the storage capacitor CCS-C2 is connected to the CS bus line CS-B. Consequently, the voltage applied to the liquid crystal capacitor CLC-C is pulled up (or down) by the CS bus line CS-A and pulled down (or up) by the CS bus line CS-B by way of the two storage capacitors CCS-C1 and CCS-C2 to have an intermediate value between the respective effective voltages applied to the liquid crystal capacitors CLC-A and CLC-B.

In this example, the three TFTs are connected in common to the same G bus line. However, the present invention is in no way limited to this specific preferred embodiment. Each pixel may also be associated with a plurality of G bus lines. For example, a single G bus line may be provided for each TFT.

Figure 2:
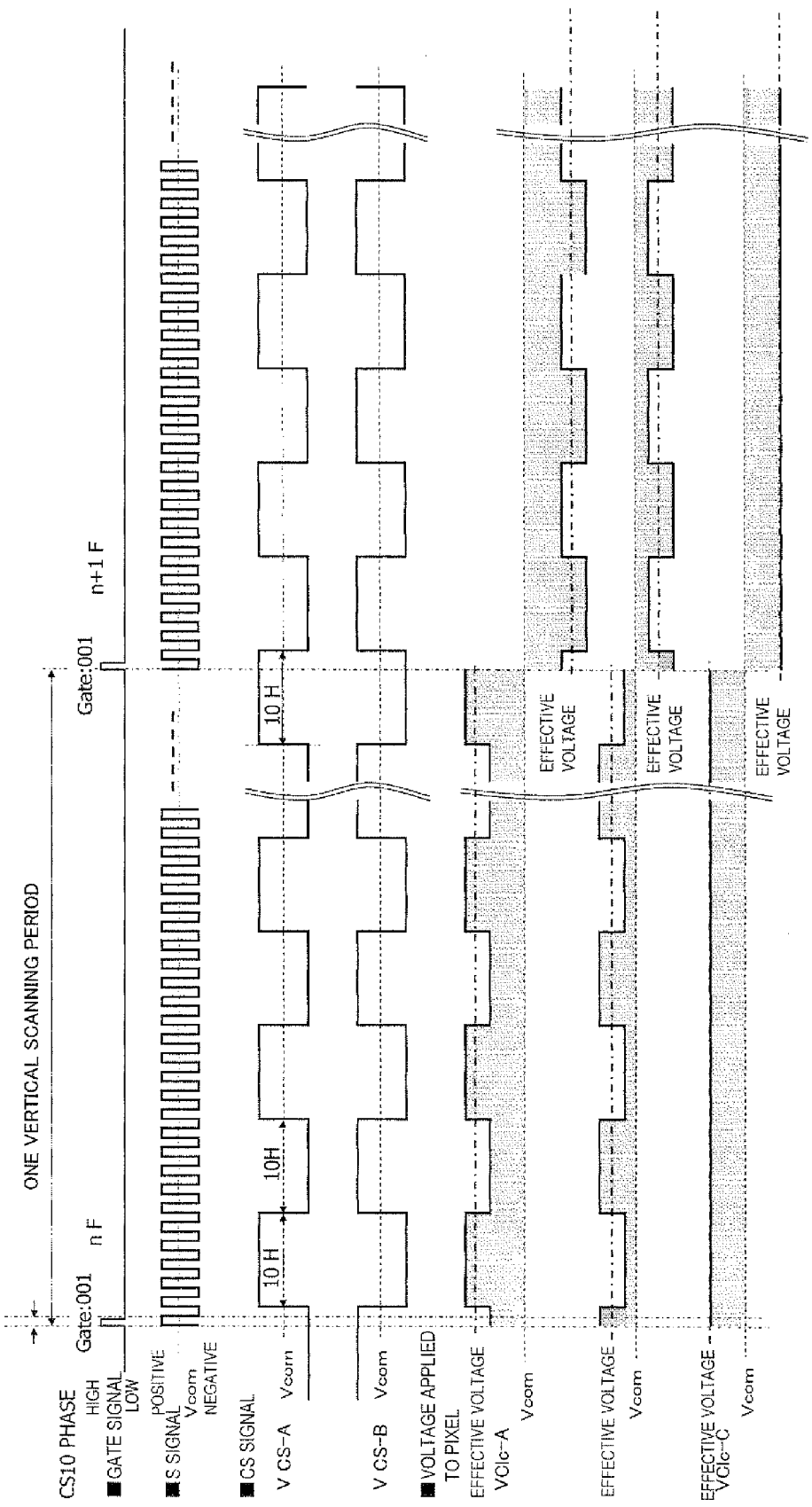
FIG. 2 illustrates how to drive the liquid crystal display device 100 by the waveforms of a Gate signal, a CS signal (storage capacitor counter voltage) and a pixel voltage (i.e., a voltage applied to the liquid crystal capacitor of each subpixel).

FIG. 2 illustrates how to drive the liquid crystal display device 100 by the waveforms of a Gate signal, a CS signal (storage capacitor counter voltage), a signal voltage supplied from the S bus line (i.e., a source signal (S signal)) and a pixel voltage (i.e., a voltage applied to the liquid crystal capacitor of each subpixel=voltage at the subpixel electrode of each subpixel). In FIG. 2, the dashed line indicates the waveform of the voltage COMMON (Vcom) at the counter electrode. When the gate signal goes high from low on a gate bus line (e.g., Gate: 001 in this example), the signal voltage is written on the respective subpixels. And the signal voltage written on the respective subpixels is then pulled up, pulled down, and pulled up and down at the same time as described above. As a result, the voltages at the respective subpixel electrodes come to have the waveforms VClc-A, VClc-B and VClc-C. It should be noted that the feedthrough voltage that could be generated under the influence of the parasitic capacitance of each TFT is not taken into consideration for the sake of simplicity. The one dot chains representing the waveforms of the voltages applied to the pixel indicate the effective voltages at the subpixel electrodes. However, since VClc-C has no waveform variations, its effective voltage becomes identical with the waveform of VClc-C.

Hereinafter, it will be described how to get a dot inversion drive done typically. In such a drive, the signal voltage inverts its polarity every one vertical scanning period (which is as long as one frame period of the input video signal in this example), and the polarities of pixels that are adjacent to each other are inverted in the row and column directions. In this example, a positive voltage is supposed to be written on a pixel in question in the $n^{th}$ frame n F and a negative voltage is supposed to be written on that pixel in the $(n+1)^{th}$ frame n+1 F. In the following description, "one vertical scanning period" is not defined by the input video signal but defined for a liquid crystal display device to be an interval between a point in time when a signal voltage is supplied to a pixel and a point in time when the next signal voltage is supplied to the same pixel again, unless otherwise stated. For example, an NTSC signal has one frame period of 33.3 ms. Normally, in a liquid crystal display device, the signal voltage is supposed to be written on every pixel within one field period of 16.7 ms, which is a half frame period of the NTSC signal. That is to say, 16.7 ms is one vertical scanning period of the liquid crystal display device. If the liquid crystal display device should be driven twice faster in order to improve its response characteristic, for example, one vertical scanning period of the liquid crystal display device should be further halved to 8.3 ms. It should also be noted that the "signal voltage" applied to each pixel is not just a voltage corresponding to the grayscale to display (i.e., grayscale voltage) but could also be an overshoot voltage for improving the response characteristic, a black display voltage for carrying out a pseudo-impulse drive (black insertion drive) or any other voltage applied to the pixel.

Since a positive voltage is written in the $n^{th}$ frame, the effective voltage applied to the liquid crystal capacitor CLC-A, to which the CS signal VCS-A that has its amplitude increased right after the gate signal has fallen is supplied, is pulled up by the CS voltage. As a result, the subpixel SP-A including the liquid crystal capacitor CLC-A becomes a bright subpixel. On the other hand, the effective voltage applied to the liquid crystal capacitor CLC-B, to which the CS signal VCS-B that has its amplitude decreased right after the gate signal has fallen is supplied, is pulled down by the CS voltage. As a result, the subpixel SP-B including the liquid crystal capacitor CLC-B becomes a dark subpixel.

Meanwhile, the effective voltage applied to the liquid crystal capacitor CLC is both pulled up by VCS-A and pulled down by VCS-B at the same time to have an intermediate value between the respective effective voltages applied to the liquid crystal capacitors CLC-A and CLC-B. As a result, the subpixel SP-C including the liquid crystal capacitor CLC-C comes to have a moderate luminance (which will be sometimes referred to herein as a "moderate subpixel"). In this example, the two storage capacitors CCS-C1 and CCS-C2 of the subpixel SP-C are supposed to have the same electrostatic capacitance value. In that case, the effects of VCS-A and VCS-B will cancel each other, and therefore, a voltage that is as high as the signal voltage is eventually applied to the liquid crystal capacitor CLC-C. In a situation where such a voltage that is as high as the signal voltage is applied to the liquid crystal capacitor CLC-C, the subpixel SP-C may have only one storage capacitor that has an on-gate structure. That is to say, if the storage capacitor is designed such that the G bus line is used in place of the CS bus line, the same effect can be achieved without complicating the driver.

However, the present invention is in no way limited to this specific preferred embodiment. By appropriately setting the values of the storage capacitors CCS-C1 and CCS-C2, the luminance of the subpixel SP-C can be brought closer to either that of the subpixel SP-A or that of the subpixel SP-B. Considering the viewing angle dependence of the γ characteristic, however, the luminance of the subpixel SP-C is preferably an intermediate value between the respective luminances of the subpixels SP-A and SP-B, and the subpixels SP-A, SP-B and SP-C preferably have an equal area (see FIG. 17) as will be described later. In this case, if the luminance of the subpixel SP-C is brought closer to that of the bright subpixel, the contrast ratio can be increased. On the other hand, if the luminance of the subpixel SP-C is brought closer to that of the dark subpixel, the viewing angle dependence of the γ characteristic can be reduced at low grayscales, among other things.

Also, as can be seen easily from the foregoing description, if two such subpixels SP-C, each having two storage capacitors, are provided and if the electrostatic capacitance values of those two storage capacitors are appropriately set in each of the two subpixels SP-C, then four subpixels with four different luminances can be obtained. For example, another subpixel SP-D that is electrically equivalent to the subpixel SP-C may be added to FIG. 1. Just like SP-C, SP-D also has a liquid crystal capacitor CLC-D and two storage capacitors CCS-D1 and CCS-D2. In this case, if the electrostatic capacitance values of the storage capacitors CCS-C1 and CCS-C2 are adjusted so that the pull-up (or pull-down) dominates the subpixel SP-C and if the electrostatic capacitance values of the storage capacitors CCS-D1 and CCS-D2 are adjusted so that the pull-down (or pull-up) dominates the subpixel SP-D, subpixels with four different luminances can be obtained. By providing such subpixels with four different luminances in this manner, the viewing angle dependence of the γ characteristic can be further reduced. Nevertheless, in the following example, a liquid crystal display device with a three division structure, which is the most basic embodiment of the present invention, will be described.

Figure 3:
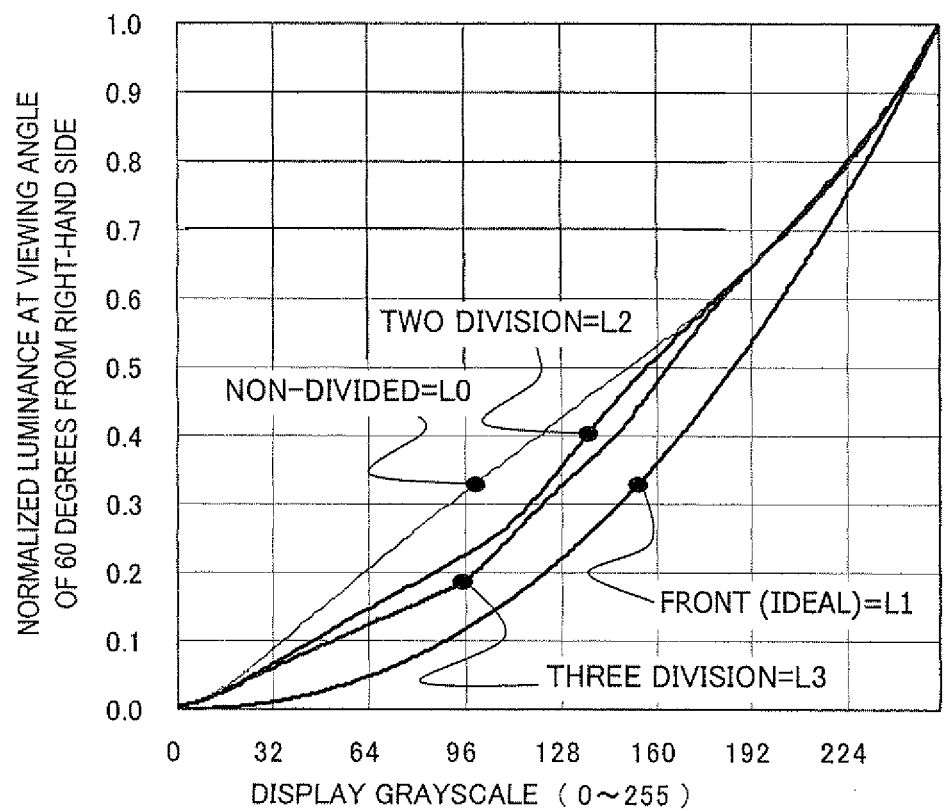
FIG. 3 is a graph showing the γ characteristics of MVA mode liquid crystal display devices.

FIG. 3 is a graph showing the respective γ characteristics of MVA mode liquid crystal display devices that have no multi-subpixel structure (by the curve L0), a two division structure (by the curve L2), and a three division structure (L=3) at a viewing angle of 60 degrees on the right-hand side along with an ideal γ curve (L1). It can be seen that the shift of the γ curve toward higher luminances when the image on an MVA mode liquid crystal display device is viewed at an oblique viewing angle is reduced by the pixel division technique. Also, the γ curve L3 of the three division structure is closer to the ideal γ curve, and would realize a better viewing angle characteristic, than the γ curve L2 of the two division structure. Furthermore, it can also be seen that the γ curve L2 of the two division structure does not vary smoothly around the 100/255 gray-scale but the γ curve L3 of the three division structure does vary smoothly over the entire grayscale range.

It should be noted that the effective voltage applied to the liquid crystal capacitor does not have to be changed for every grayscale voltage. But at the lowest grayscale (corresponding to black display state) and at the highest grayscale (corresponding to white display state), the same voltage could be applied to the respective liquid crystal capacitors and the same luminance (or grayscale) could be displayed. Optionally, the multi-pixel drive may be carried out only in a range where the γ characteristic has particularly heavy viewing angle dependence (i.e., a range under a certain grayscale tone of 100/255 grayscale, for example).

Hereinafter, the pixel division structure and the subpixel arrangement of a liquid crystal display device as a preferred embodiment of the present invention will be described with reference to FIGS. 4 to 7, which schematically illustrate an equivalent circuit of the structure corresponding to one pixel thereof and the arrangement of subpixels. It should be noted that the arrangement of subpixels does not have to be the illustrated one but could be modified in various manners. Although the equivalent circuits illustrated in FIGS. 4 to 7 are drawn with their spatial arrangements also taken into consideration, their electrical connection is still the same as that of the equivalent circuit shown in FIG. 1.

FIGS. 4 to 7 schematically illustrate the structure of one of the pixels that are arranged in rows and columns on the TFT substrate of a liquid crystal display device as a preferred embodiment of the present invention. In FIGS. 4 to 7, that pixel is supposed to be located at the intersection between an $m^{th}$ row and an $n^{th}$ column. In the following description, any pair of components shown in multiple drawings and having substantially the same function will be identified by the same reference numeral. And once such a component has been described, the description of its counterpart will be omitted. As used herein, the "pixel" means the smallest unit of display to be conducted by the liquid crystal display device. In cases of color display devices, the "pixel" is equivalent to a "picture element (or dot)" that represents each color (which is typically R, G or B).

Figure 4:
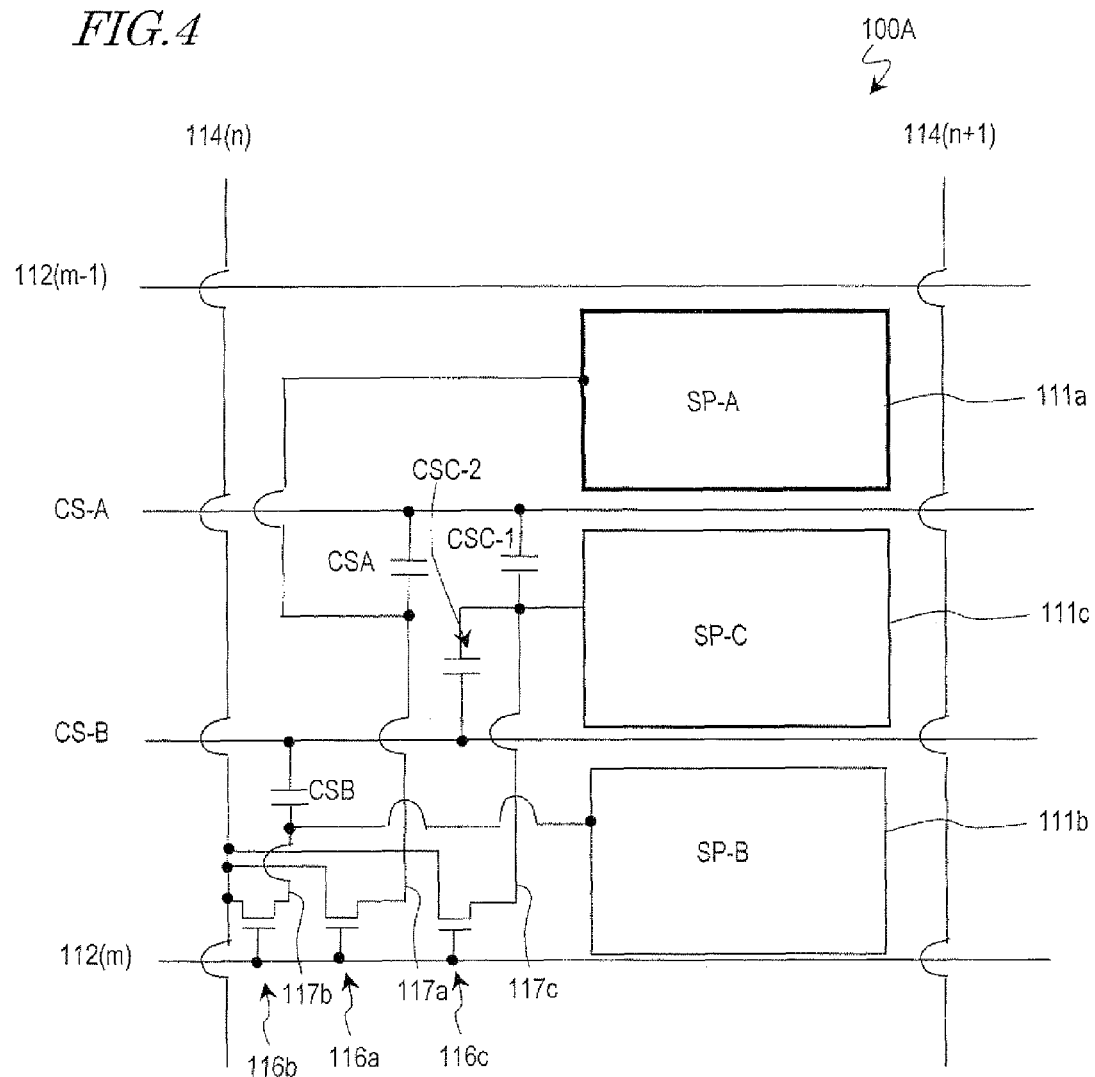
FIG. 4 schematically illustrates the structure of a pixel on the TFT substrate of a liquid crystal display device 100A as another preferred embodiment of the present invention.

In the pixel of the liquid crystal display device 100A shown in FIG. 4, subpixels SP-A, SP-C and SP-B are arranged in the column direction in this order (i.e., according to their luminance ranks and in the descending order downward in this example). In the next frame period, the same luminance ranks (i.e., the luminance ranks of the subpixels within the pixel) will be maintained and the voltages applied to the respective liquid crystal capacitors of the subpixels will invert their polarities, thus preventing the same DC voltage from being applied for a long time. Optionally, the signal waveforms of VCS-A and VCS-B could be adjusted such that the luminance ranks of the subpixels SP-A and SP-B reverse. Even so, those subpixels will still be arranged according to their luminance ranks but in the ascending order downward in that case.

As shown in FIG. 4, the first, second and third subpixels SP-A, SP-B and SP-C are arranged in three different areas defined by first, second and third subpixel electrodes 111a, 111b, 111c, respectively.

This (m, n) pixel is driven by TFTs 116a, 116b and 116c that are connected to a G bus line 112(m) and an S bus line 114(n). The respective drain electrodes of the TFTs 116a, 116b and 116c are connected to the first, second and third subpixel electrodes 111a, 111b and 111c by way of drain extension lines 117a, 117b and 117c, respectively. The subpixel electrodes 111a, 111b and 111c, a liquid crystal layer (not shown) and a counter electrode (not shown, either), which is arranged to face the subpixel electrodes with the liquid crystal layer interposed between them and be shared in common by those subpixel electrodes, together form liquid crystal capacitors. That is to say, the first, second and third subpixel electrodes 111a, 111b and 111c respectively form the liquid crystal capacitors CLC-A, CLC-B and CLC-C shown in FIG. 1. The counter electrode is usually provided in common for a plurality of pixels (and typically for all pixels) but could be divided if necessary.

Two CS bus lines (i.e., storage capacitor lines) CS-A and CS-B pass through each pixel on the $m^{th}$ row. The first subpixel SP-A has a single storage capacitor CSA (corresponding to CCS-A shown in FIG. 1), one of the two electrodes of which (i.e., the storage capacitor counter electrode) is connected to the CS bus line CS-A and the other electrode of which (i.e., the storage capacitor electrode) is connected to the drain extension line 117a. And these two electrodes and an insulating layer arranged between the electrodes (e.g., a gate insulating layer) together form the storage capacitor CSA. Likewise, the second subpixel SP-B has a single storage capacitor CSB (corresponding to CCS-B shown in FIG. 1), one of the two electrodes of which (i.e., the storage capacitor counter electrode) is connected to the CS bus line CS-B and the other electrode of which (i.e., the storage capacitor electrode) is connected to the drain extension line 117b. And these two electrodes and an insulating layer arranged between the electrodes (e.g., a gate insulating layer) together form the storage capacitor CSB. But the third subpixel SP-C has two storage capacitors CSC-1 and CSC-2 (corresponding to CCS-C1 and CCS-C2 shown in FIG. 1). One of the two electrodes of the storage capacitor CSC-1 (i.e., the storage capacitor counter electrode) is connected to the CS bus line CS-A and one of the two electrodes of the storage capacitor CSC-2 (i.e., the storage capacitor counter electrode) is connected to the CS bus line CS-B. The other electrode (storage capacitor electrode) of the storage capacitor CSC-1 and that of the storage capacitor CSC-2 are both connected to the drain extension line 117c. These two pairs of electrodes and the insulating layers (e.g., gate insulating layers) between them together form the storage capacitors CSC-1 and CSC-2.

Hereinafter, the pixel division structure of the liquid crystal display device 100B shown in FIG. 5 will be described.

In each pixel of the liquid crystal display device 100B, two SP-B and SP-C out of the three subpixels SP-A, SP-B and SP-C thereof each have two regions SP-B1, SP-B2 and SP-C1, SP-C2. And those two regions of each split subpixel are arranged so as to interpose the first subpixel SP-A between them. That is to say, in the column direction, SP-B2 (dark subpixel), SP-C2 (moderate subpixel), SP-A (bright subpixel), SP-C1 (moderate subpixel) and SP-B1 (dark subpixel) are arranged in this order. In the next frame period, the same luminance ranks (i.e., the luminance ranks of the subpixels within the pixel) will be maintained and the voltages applied to the respective liquid crystal capacitors of the subpixels will invert their polarities, thus preventing the same DC voltage from being applied for a long time. Optionally, the signal waveforms of VCS-A and VCS-B could be adjusted such that the luminance ranks of the subpixels SP-A, SP-B1 and SP-B2 interchanges.

The two regions SP-B1 and SP-B2 of the second subpixel are provided for two subpixel electrodes 111*b*1 and 111*b*2, respectively, which are connected together with a drain extension line 117*bb* that is further connected to the drain electrode of the TFT 116*b* by way of another drain extension line 117*b*. In the same way, the two regions SP-C1 and SP-C2 of the third subpixel are provided for two subpixel electrodes 111*d*1 and 111*c*2, respectively, which are connected together with a drain extension line 117*cc* that is further connected to the drain electrode of the TFT 116*c* by way of another drain extension line 117*c*.

In the other respects, the liquid crystal display device 100B has the same connection as the liquid crystal display device 100A and the description thereof will be omitted herein. In each pixel of the liquid crystal display device 100B, the two regions SP-B1 and SP-B2 of the second subpixel are not only equivalent to each other but also equivalent to the second subpixel SP-B of the liquid crystal display device 100A as well. Likewise, in each pixel of the liquid crystal display device 100B, the two regions SP-C1 and SP-C2 of the third subpixel are not only equivalent to each other but also equivalent to the third subpixel SP-C of the liquid crystal display device 100A as well.

If the subpixels are further subdivided spatially as in this liquid crystal display device 100B, the number of regions having mutually luminances within one pixel further increases. As a result, the jaggedness of the image can be reduced and the uniformity can be increased instead. Among other things, a liquid crystal display device with a big screen size (of 50 inches or more, for example) has such a large pixel size that the distribution of luminances within a pixel could be sensed as jaggedness with such a multi-pixel structure. Thus, this technique will contribute effectively to eliminating such jaggedness.

Hereinafter, the pixel division structure of the liquid crystal display device 100C shown in FIG. 6 will be described.

Figure 5:
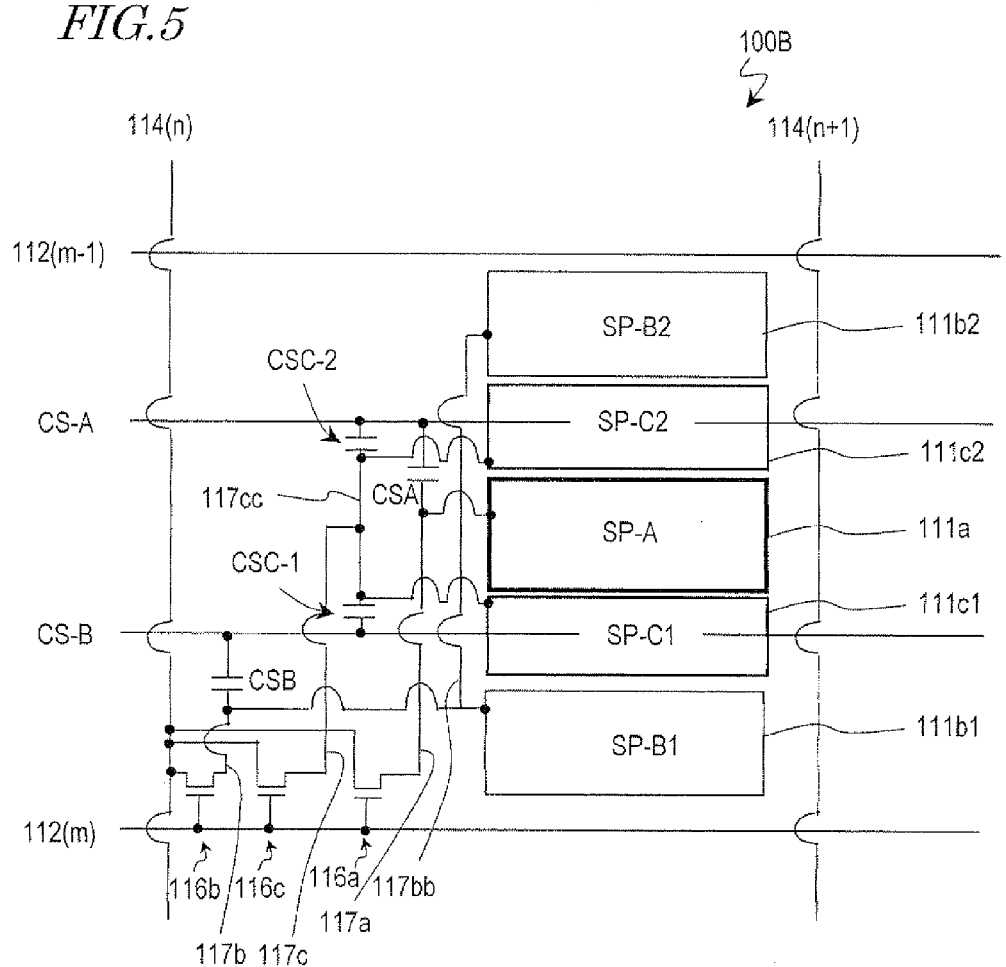
FIG. 5 schematically illustrates the structure of a pixel on the TFT substrate of a liquid crystal display device 100B as still another preferred embodiment of the present invention.

As in the liquid crystal display device 100B shown in FIG. 5, two SP-B and SP-C out of the three subpixels SP-A, SP-B and SP-C each have two regions that are arranged so as to interpose the first subpixel SP-A between them in each pixel of the liquid crystal display device 100C. In the liquid crystal display device 100B, the subpixel electrodes 111*c*1 and 111*c*2 that define the two regions SP-C1 and SP-C2 of the third subpixel are electrically connected together with the drain extension line. On the other hand, in this liquid crystal display device 100C, the third subpixel has a single subpixel electrode 111*c* in a U-shape or a horseshoe shape. In the other respects, however, the liquid crystal display device 100C is identical with the liquid crystal display device 100B and the description thereof will be omitted herein.

Hereinafter, the pixel division structure of the liquid crystal display device 100D shown in FIG. 7 will be described.

Figure 6:
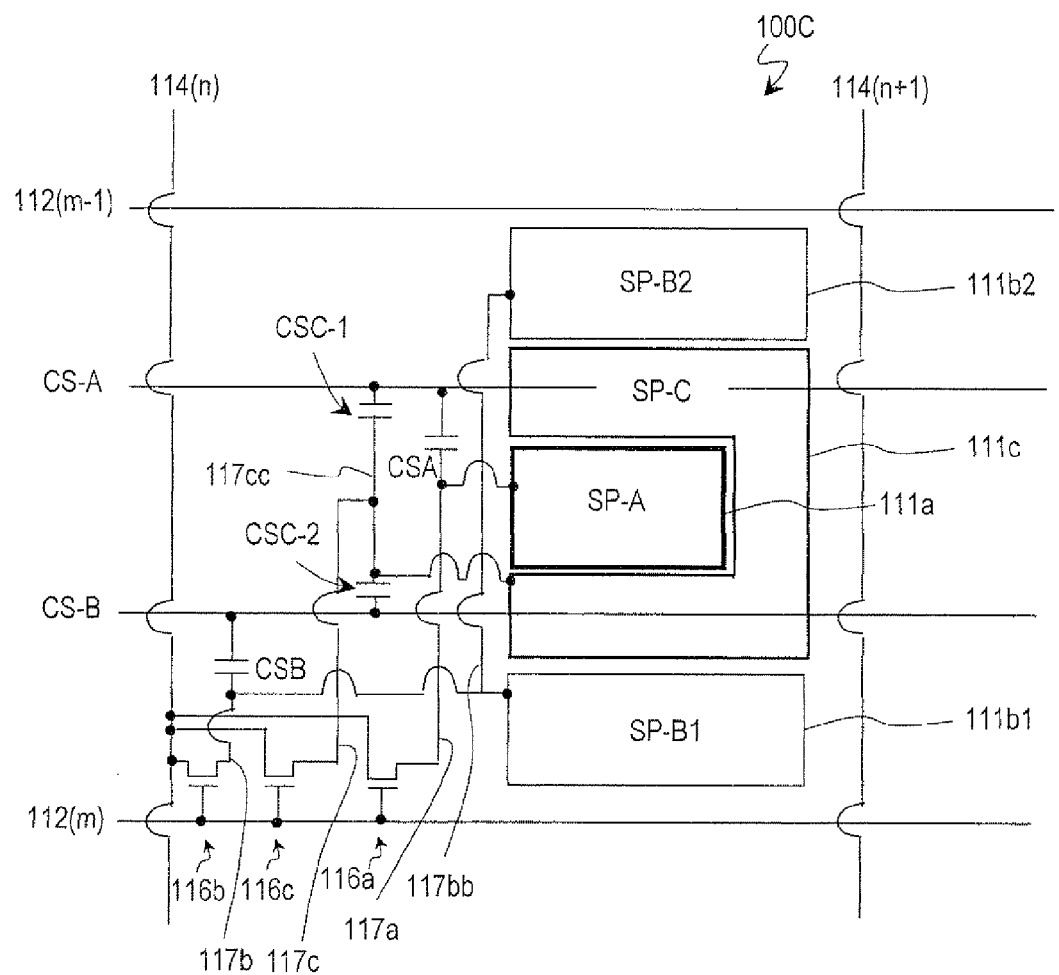
FIG. 6 schematically illustrates the structure of a pixel on the TFT substrate of a liquid crystal display device 100C as yet another preferred embodiment of the present invention.

As in the liquid crystal display devices 100B and 100C shown in FIGS. 5 and 6, two SP-B and SP-C out of the three subpixels SP-A, SP-B and SP-C each have two regions that are arranged so as to interpose the first subpixel SP-A in each pixel of the liquid crystal display device 100D. Also, as in the liquid crystal display device 100C shown in FIG. 6, the third subpixel has a single U-subpixel electrode 111*c* that covers the two regions. In the liquid crystal display device 100C, the subpixel electrodes 111*b*1 and 111*b*2 that define the two regions SP-B1 and SP-B2 of the second subpixel are electrically connected together with the drain extension line. On the other hand, in this liquid crystal display device 100D, the second subpixel too has a single U-subpixel electrode 111*b*. In the other respects, the liquid crystal display device 100D is identical with the liquid crystal display device 100C and the description thereof will be omitted herein.

If a subpixel that has been split into two regions is covered with such a U—subpixel electrode as in the liquid crystal display devices 100C and 100D, then the drain extension line can be laid out more simply. In this example, the second and third subpixel electrodes 111*b* and 111*c* are supposed to have a U-shape. However, the present invention is in no way limited to that specific preferred embodiment. As later described in detail, the second and third subpixel electrodes 111*b* and 111*c* can also have a closed ring shape, which may have either a rectangular outline or any other polygonal outline (i.e., an O-shape with a number of vertices). In any case, if the subpixel electrodes are designed as ring electrodes, then the parasitic capacitance (such as Csd) can be adjusted easily.

Hereinafter, a specific configuration for pixels of a liquid crystal display device according to the present invention will be described with reference to FIGS. 8 through 12, which schematically illustrate the structure of two pixels that are located at the intersection between the $m^{th}$ row and the $n^{th}$ column and at the intersection between the $m^{th}$ row and the $(n+1)^{th}$ column on the TFT substrate. In a situation where a typical dot inversion drive is carried out, while a positive signal voltage, of which the polarity is defined with respect to that of the counter voltage, is written on the pixel at the intersection between the $m^{th}$ row and the $n^{th}$ column (which will be referred to herein as (m, n) pixel), a negative signal voltage is written on the (m, n+1) pixel. In this case, the liquid crystal display device may be driven so that if the subpixels SP-A, SP-B and SP-C of the (m, n) pixel become bright, dark and moderate subpixels, respectively, then the subpixels SP-A, SP-B and SP-C of the (m, n+1) pixel become dark, bright and moderate subpixels, respectively.

Figure 8:
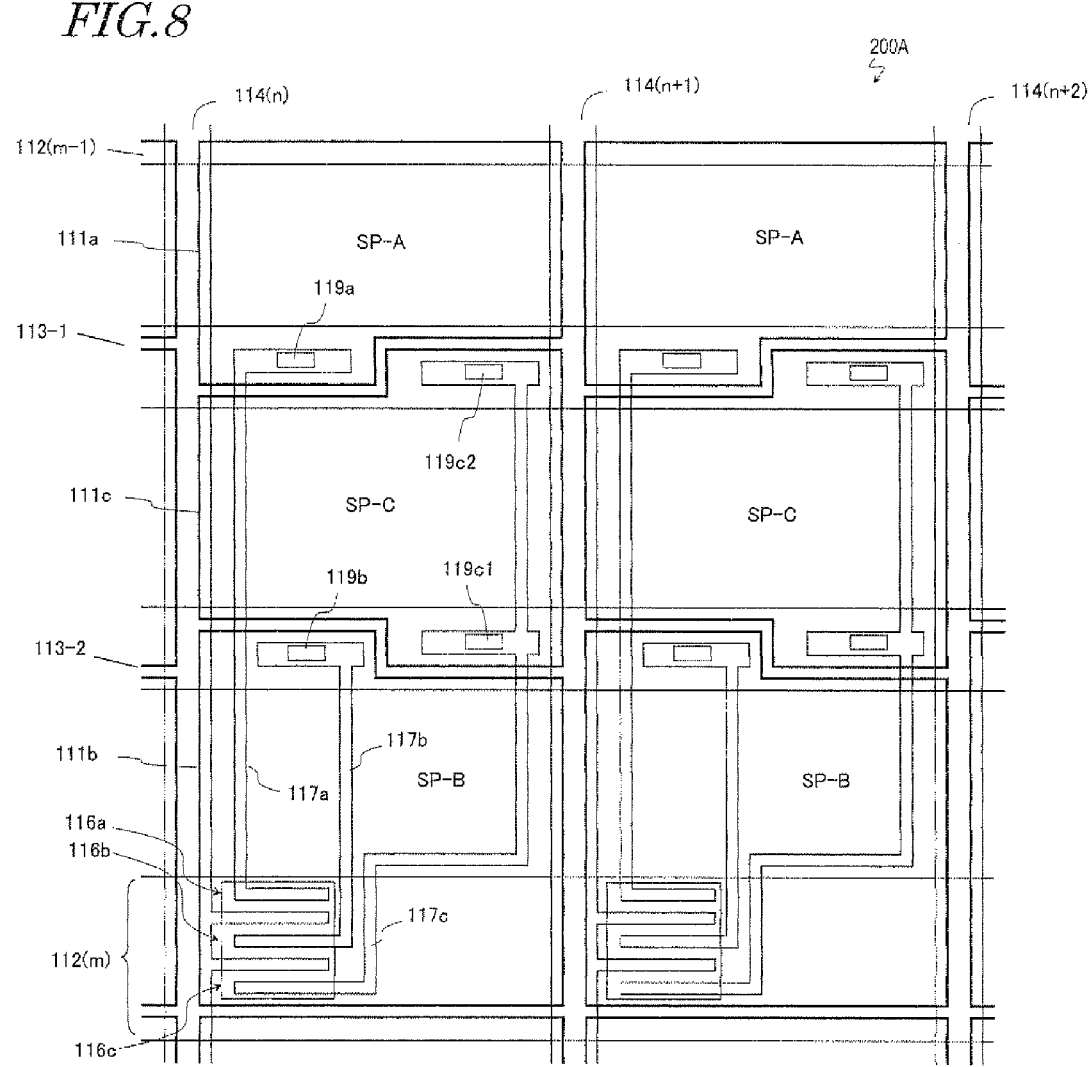
FIG. 8 schematically illustrates the structure of a pixel on the TFT substrate of a liquid crystal display device 200A as yet another preferred embodiment of the present invention.

The liquid crystal display device 200A shown in FIG. 8 is represented by the same equivalent circuit, and has the same arrangement of subpixels, as the liquid crystal display device 100A shown in FIG. 4.

First, look at the (m, n) pixel, which is driven by TFTs 116*a*, 116*b* and 116*c* that are connected to a gate bus line 112(*m*) and a source bus line 114(*n*). The respective drain electrodes of the TFTs 116*a*, 116*b* and 116*c* are connected to the first, second and third subpixel electrodes 111*a*, 111*b* and 111*c* at contact portions 119*a*, 119*b*, and 119*c*1 and 119*c*2 by way of drain extension lines 117*a*, 117*b* and 117*c*, respectively. The subpixel electrodes 111*a*, 111*b* and 111*c*, the liquid crystal layer (not shown) and the counter electrode (not shown, either), which is arranged so as to face the subpixel electrodes with the liquid crystal layer interposed between them, form liquid crystal capacitors CLC-A, CLC-B and CLC-C (see FIG. 1), respectively.

In this case, the source bus line 114(*n*) partially overlaps with the subpixel electrodes 111*a*, 111*b* and 111*c* on the $n^{th}$ column. To sufficiently reduce the parasitic capacitances Csd to be produced between the source bus line 114(*n*) and the subpixel electrodes 111*a*, 111*b* and 111*c*, an interlayer insulating film made of a resin such as an acrylic resin with a thickness of approximately 2.5 μm is provided between them. In other words, by providing the interlayer insulating film, the subpixel electrodes 111*a*, 111*b* and 111*c* can be arranged so as to overlap with the source bus line 114(*n*) and the aperture ratio of the pixel can be increased.

Each of these TFTs 116*a*, 116*b* and 116*c* has a bottom gate structure, and includes a gate electrode that forms an extended portion of the gate bus line 112(*m*), a semiconductor layer deposited on the gate electrode, and source and drain electrodes that have been formed on the source and drain regions of the semiconductor layer. The source electrode forms an extended portion of the source bus line 114(*n*). And the respective drain electrodes of the TFTs 116*a*, 116*b* and 116*c* form integral parts of the drain extension lines 117*a*, 117*b* and 117*c*, respectively. An interlayer insulating film (not shown) has been deposited so as to cover all of these electrodes and layers. And the subpixel electrodes 111*a*, 111*b* and 111*c* have been formed on the interlayer insulating film. At the contact portions 119*a*, 119*b* and 119*c*1 and 119*c*2 inside contact holes that have been cut through the interlayer insulating film, the subpixel electrodes 111*a*, 111*b* and 111*c* are connected to the drain extension lines 117*a*, 117*b* and 117*c*, respectively.

Next, the configurations of the storage capacitors in the (m, n) pixel will be described. Two CS bus lines (storage capacitor lines) 113-1 and 113-2 pass through each pixel on the m$^{th}$ row. The CS bus lines 113-1 and 113-2 correspond to the CS bus lines CS-A and CS-B, respectively, shown in FIG. 4 (or FIG. 1).

The storage capacitor of the subpixel SP-A (i.e., CSA shown in FIG. 4) is arranged in a region where the drain extension line 117*a* overlaps with the CS bus line 113-1 (around the contact portion 119*a*). On the other hand, the storage capacitor of the subpixel SP-B (i.e., CSB shown in FIG. 4) is arranged in a region where the drain extension line 117*b* overlaps with the CS bus line 113-2 (around the contact portion 119*b*).

The subpixel SP-C has two storage capacitors (i.e., CSC-1 and CSC-2 shown in FIG. 4). The storage capacitor CSC-1 is arranged in a region where the drain extension line 117*c* overlaps with the CS bus line 113-1 (around the contact portion 119*c*2). On the other hand, the storage capacitor CSC-2 is arranged in a region where the drain extension line 117*c* overlaps with the CS bus line 113-2 (around the contact portion 119*c*1). Both of these CS bus lines 113-1 and 113-2 are made of the same conductive layer as the gate bus line 112(*m*) and are covered with the gate insulating film (not shown). The dielectric layers of the storage capacitors CSC-1 and CSC-2 are both gate insulating films and the capacitance values of the storage capacitors CSC-1 and CSC-2 are proportional to the areas of their electrodes. In this example, the capacitance values of the storage capacitors CSC-1 and CSC-2 are approximately equal to each other as shown in FIG. 8.

Figure 9:
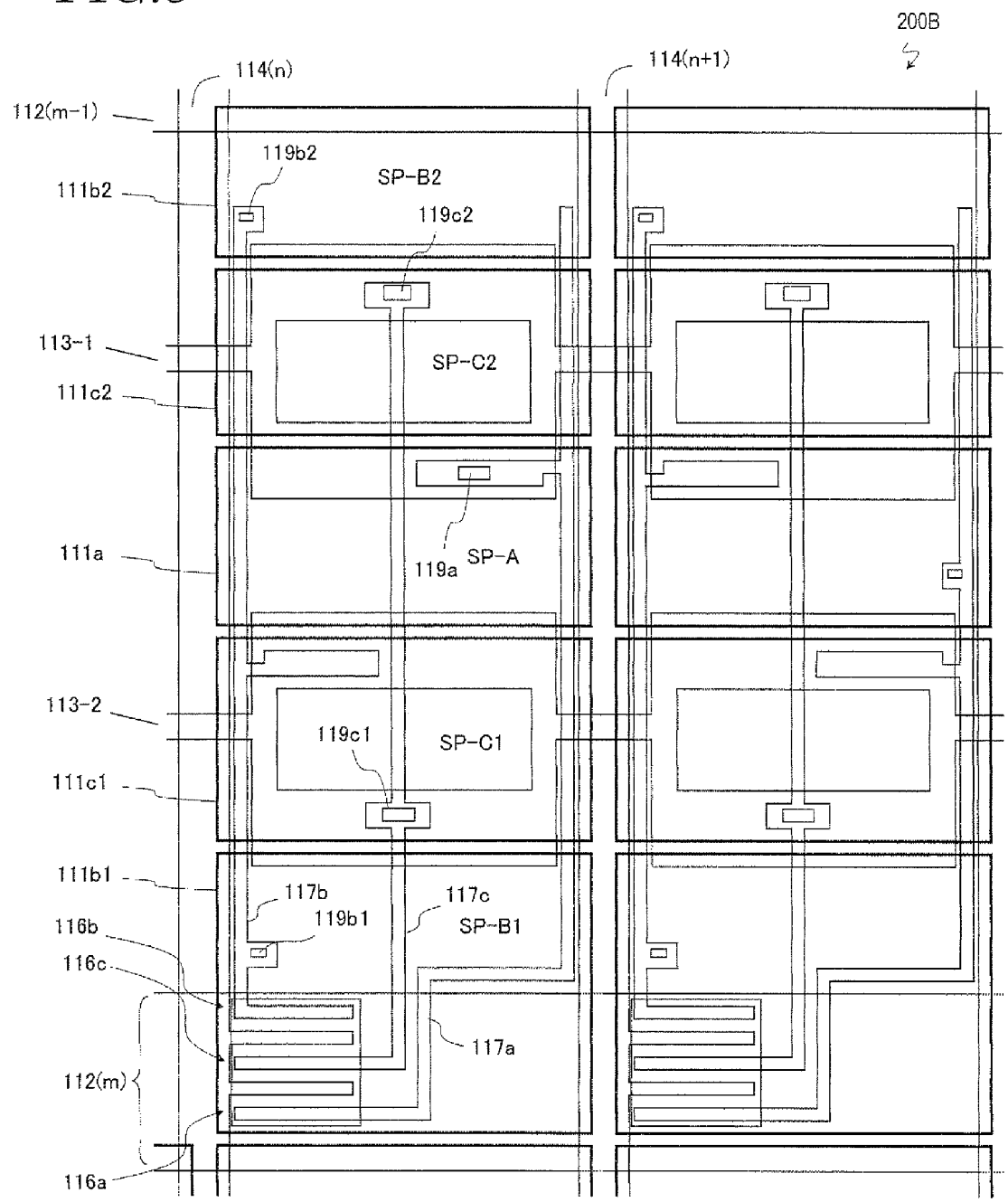
FIG. 9 schematically illustrates the structure of a pixel on the TFT substrate of a liquid crystal display device 200B as yet another preferred embodiment of the present invention.

The liquid crystal display device 200B shown in FIG. 9 is represented by the same equivalent circuit, and has the same arrangement of subpixels, as the liquid crystal display device 100B shown in FIG. 5. In each pixel of the liquid crystal display device 200B, two SP-B and SP-C out of the three subpixels SP-A, SP-B and SP-C each have two regions SP-B1, SP-B2 and SP-C1, SP-C2, which are arranged so as to interpose the first subpixel SP-A between them. Hereinafter, the configuration of the second and third subpixels SP-B and SP-C that is different from the liquid crystal display device 200A will be described.

The two regions SP-B1 and SP-82 of the second subpixel are defined for the two subpixel electrodes 111*b*1 and 111*b*2, which are connected to the drain extension line 117*b* at the contact portions 119*b*1 and 119*b*2, respectively. Likewise, the two regions SP-C1 and SP-C2 of the third subpixel are defined for the two subpixel electrodes 111*d*1 and 111*c*2, which are connected to the drain extension line 117*c* at the contact portions 119*c*1 and 119*c*2, respectively.

Also, each of these two CS bus lines 113-1 and 113-2 has a ringlike portion and a non-ringlike portion. The ringlike portions of the CS bus lines 113-1 and 113-2 are arranged between the source bus lines 114(*n*) and 114(*n*+1) so as not to overlap with the source bus lines 114(*n*) and 114(*n*+1). The non-ringlike portion of each of these CS bus lines 113-1 and 113-2 crosses the source bus line between the pixels that are adjacent to each other in the row direction and couples together the ringlike portions that are adjacent in the row direction. A portion of the subpixel electrode 111*c*1 that is located inside the ringlike portion of the CS bus line 113-2 contributes to the display operation being conducted by the subpixel SP-C1. On the other hand, a portion of the subpixel electrode 111*c*2 that is located inside the ringlike portion of the CS bus line 113-1 contributes to the display operation being conducted by the subpixel SP-C2. The ringlike portions of these two CS bus lines 113-1 and 113-2 are also present between adjacent subpixels and also perform the function of shielding those gaps from incoming light.

The storage capacitor of the subpixel SP-A has been formed in a region where the ringlike portion of the bus line 113-1 overlaps with the drain extension line 117*a* (in the vicinity of the contact portion 119*a*). Meanwhile, the storage capacitor of the subpixel SP-B has been formed in a region where the ringlike portion of the bus line 113-2 overlaps with the drain extension line 117*b*. Looking at the (m, n+1) pixel, however, it can be seen that the storage capacitor of the subpixel SP-A has been formed in a region where the ringlike portion of the bus line 113-2 overlaps with the drain extension line 117*a* and the storage capacitor of the subpixel SP-B (that is a single storage capacitor provided in common for SP-B1 and SP-B2) has been formed in a region where the ringlike portion of the bus line 113-1 overlaps with the drain extension line 117*b*. By adopting such an arrangement, even when a dot inversion drive is performed, the subpixels of the (m, n) and (m, n+1) pixels can have the same luminance ranking. This means that if SP-A of the (m, n) pixel is a bright subpixel, SP-A of the (m, n+1) pixel can also be a bright subpixel. That is why in a situation where the image looks jaggy because the locations of relatively easily recognizable bright subpixels change one pixel into another, such jaggedness can be minimized.

Also, the drain extension lines 117*a* and 117*b* are arranged so as to cross the non-ringlike portions of the two CS bus lines 113-1 and 113-2 the same number of times, thereby canceling the contribution of the capacitance to the regions other than where the storage capacitors should be formed. One of the two storage capacitors of the subpixel SP-C is arranged in a region where the CS bus line 113-1 overlaps with the drain extension line 117*c* (i.e., in the vicinity of the contact portion 119*c*2), while the other storage capacitor thereof is arranged in a region where the CS bus line 113-2 overlaps with the drain extension line 117*c* (i.e., in the vicinity of the contact portion 119*c*1). In this example, the two storage capacitors of the subpixel SP-C also have substantially equal electrostatic capacitance values.

Figure 10:
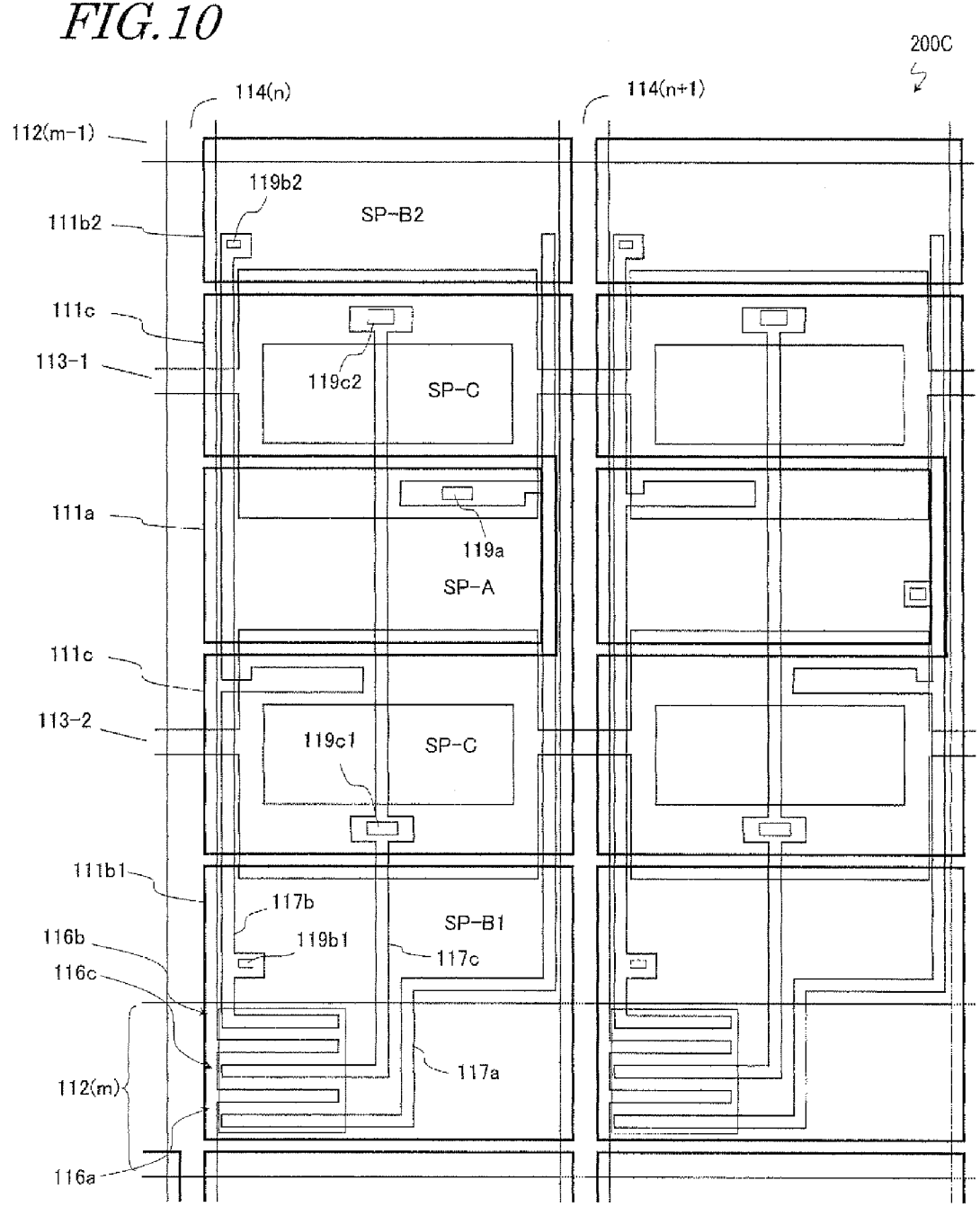
FIG. 10 schematically illustrates the structure of a pixel on the TFT substrate of a liquid crystal display device 200C as yet another preferred embodiment of the present invention.

The liquid crystal display device 200C shown in FIG. 10 is represented by the same equivalent circuit, and has the same arrangement of subpixels, as the liquid crystal display device 100C shown in FIG. 6. In the liquid crystal display device 200B shown in FIG. 9, the subpixel electrodes 111*c*1 and 111*c*2 that define the two regions SP-C1 and SP-C2 of the third subpixel SP-C are electrically connected together with the drain extension line 117*c*. On the other hand, in this liquid crystal display device 200C, those two regions are covered with a single subpixel electrode 111c in a U- or horseshoe shape. Also, this device is designed such that the gap between the coupling portion that couples together the two regions of the U-subpixel electrode 111c and the subpixel electrode 111a is shielded from incoming light by the drain extension line 117a.

Figure 11:
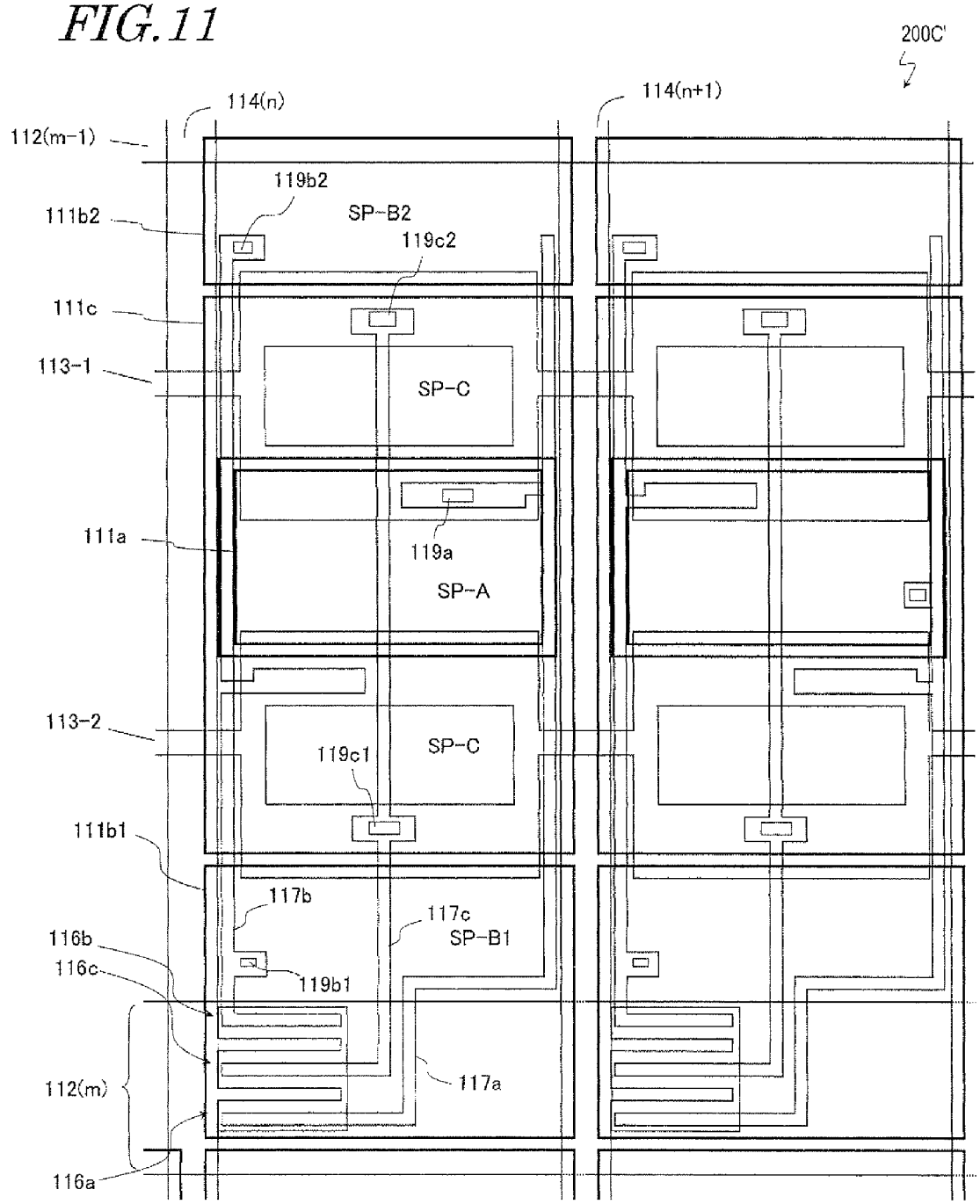
FIG. 11 schematically illustrates the structure of a pixel on the TFT substrate of a liquid crystal display device 200C' as yet another preferred embodiment of the present invention.

The liquid crystal display device 200C' shown in FIG. 11 is different from the liquid crystal display device 200C shown in FIG. 10 in that the U-subpixel electrode 111c of the latter device is modified into a ringlike (which may have either rectangular shape or O-shape with vertices) subpixel electrode 111c. This device 200C' is designed such that the gap between the ringlike subpixel electrode 111c and the subpixel electrode 111a that is arranged inside its opening is shielded from incoming light by the drain extension lines 117a and 117b. With such a ringlike subpixel electrode 111c, the parasitic capacitance Csd between the drain and sources can be adjusted more easily rather than using the U-subpixel electrode 111c.

Figure 7:
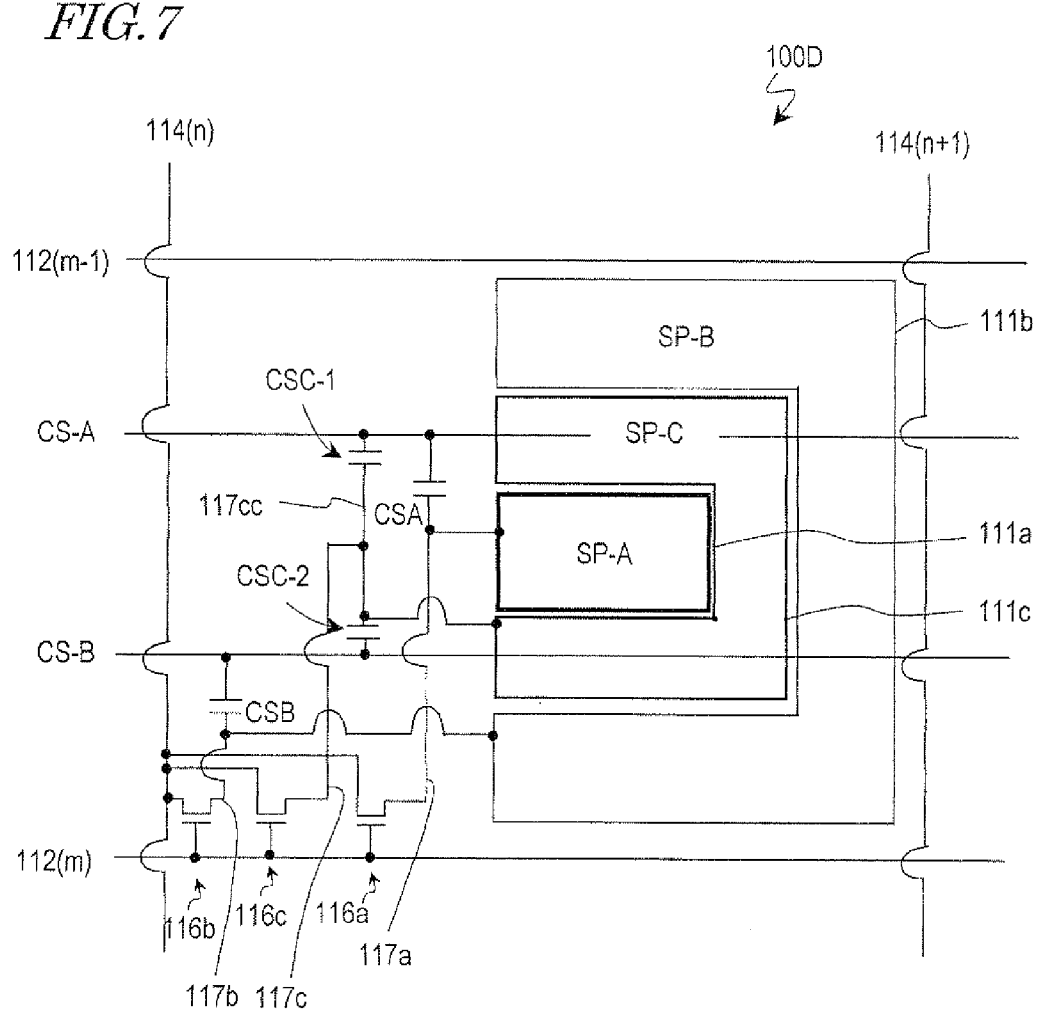
FIG. 7 schematically illustrates the structure of a pixel on the TFT substrate of a liquid crystal display device 100D as yet another preferred embodiment of the present invention.
Figure 12:
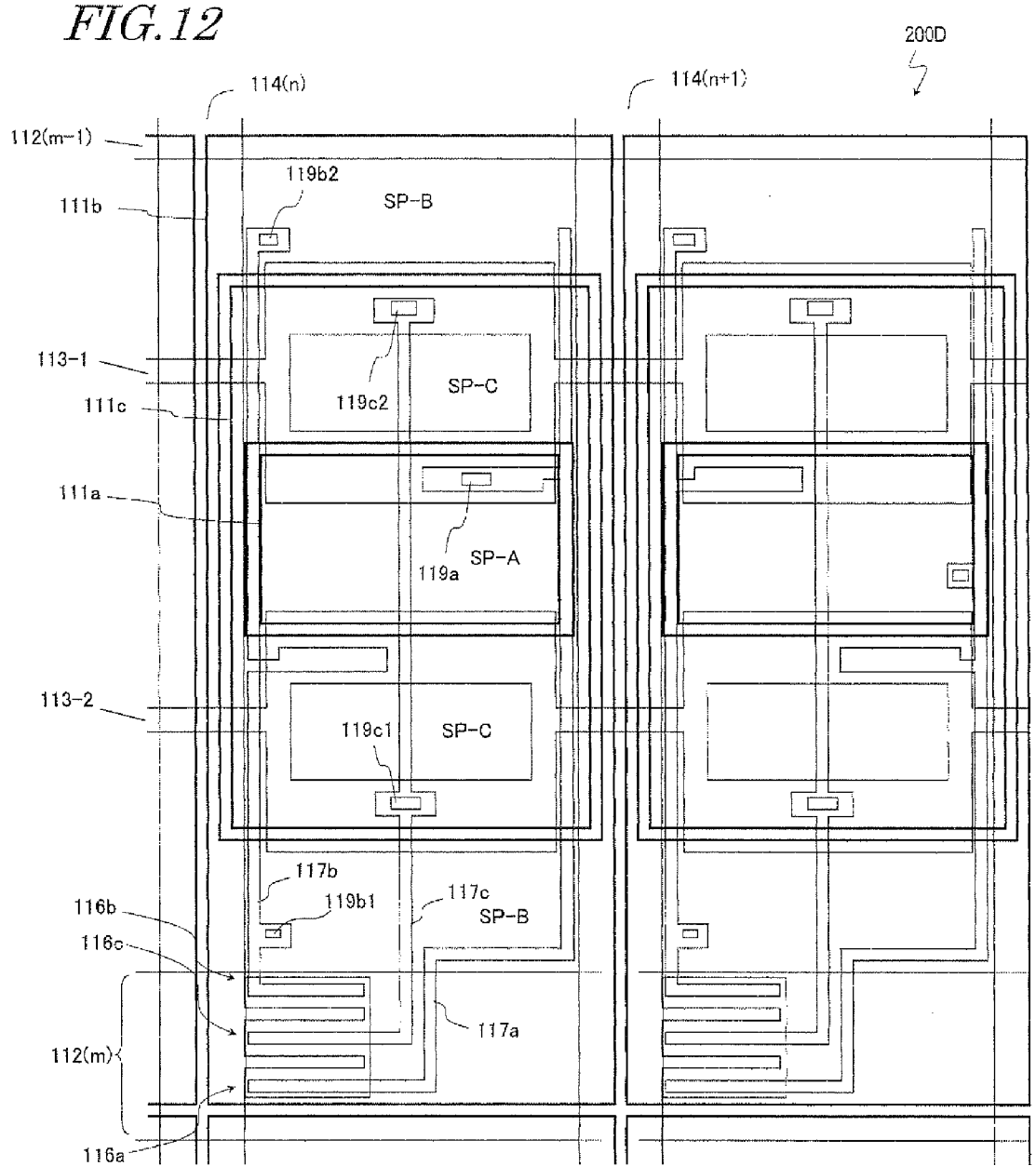
FIG. 12 schematically illustrates the structure of a pixel on the TFT substrate of a liquid crystal display device 200D as yet another preferred embodiment of the present invention.

The liquid crystal display device 200D shown in FIG. 12 is a modified example of the liquid crystal display device 100D shown in FIG. 7 and also modifies the U-subpixel SP-C of the liquid crystal display device 100D into a ringlike one. In the liquid crystal display device 200C' shown in FIG. 11, the subpixel electrodes 111b1 and 111b2 that define the two regions SP-B1 and SP-B2 of the second subpixel SP-B are electrically connected together with the drain extension line 117b. On the other hand, in this liquid crystal display device 200D, those two regions are covered with a single ringlike subpixel electrode 111b. Also, this device is designed such that the gap between the subpixel electrodes 111b and 111c is shielded from incoming light by the source bus lines 114(n) and 114(n+1).

Hereinafter, a specific configuration for an MVA mode liquid crystal display device as a preferred embodiment of the present invention will be described with reference to FIGS. 13 and 14. As is well known in the art, an MVA mode liquid crystal display device operates in a vertical aligned mode that uses a nematic liquid crystal material with negative dielectric anisotropy. Each pixel has four domains (quadruple domains) in which liquid crystal molecules are aligned in four different directions (any two of which are different from each other by a multiple of approximately 90 degrees) upon the application of a voltage. And the device conducts a display operation in normally black mode. If the multi-pixel structure is applied to such an MVA mode liquid crystal display device, each subpixel preferably has four domains considering the viewing angle characteristic.

Figure 13:
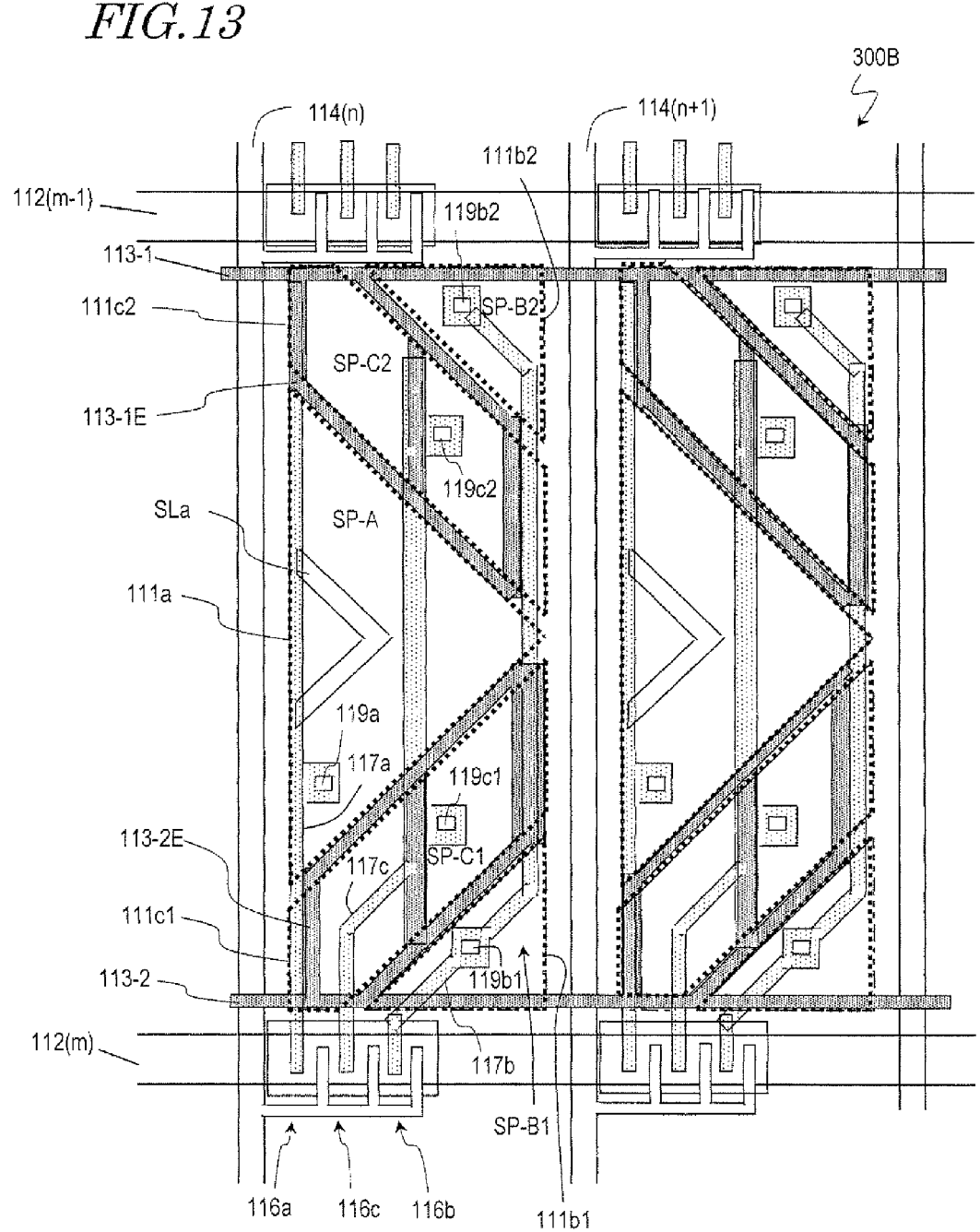
FIG. 13 schematically illustrates the structure of a pixel on the TFT substrate of an MVA mode liquid crystal display device 300B as yet another preferred embodiment of the present invention.

The liquid crystal display device 300B shown in FIG. 13 is represented by the same equivalent circuit, and has the same arrangement of subpixels, as the liquid crystal display devices 100B and 200B shown in FIGS. 5 and 9. Thus, the description of common features between this liquid crystal display device 300B and its counterpart 200B will be omitted herein.

A slit SLa that has been cut through the subpixel electrode 111a, the gap between the subpixel electrodes 111a, 111c1 and 111c2, the gap between the subpixel electrode 111c1 and 111b1, and the gap between the subpixel electrodes 111c2 and 111b2 generate oblique electric fields and function as an alignment regulating means (i.e., slits running through a pixel electrode) that forms a multi-domain structure. The slit SLa and these gaps between the adjacent subpixel electrodes run in two directions so as to cross the column direction of the matrix at approximately 45 degrees and to intersect with each other at substantially right angles. The axes of polarization (or the axes of transmission) of two polarizers that are arranged as crossed Nicols so as to sandwich the liquid crystal panel between them are either perpendicular or parallel to the column and row directions. And the slit and the gaps between the subpixel electrodes that are arranged as described above work so as to regulate the alignment direction of the liquid crystal molecules to be approximately 45 degrees with respect to the axes of polarization upon the application of a voltage. On the other hand, the counter substrate is also provided with an alignment regulating means, which is located either in the interval between the slit and a subpixel electrode gap that are adjacent and parallel to each other or in the interval between two subpixel electrode gaps that are adjacent and parallel to each other, so as to split their interval substantially equally. The alignment regulating means on the counter substrate may be a slit on the counter electrode or a protrusion of a dielectric material (i.e., a rib) that is arranged on the counter electrode to face the liquid crystal layer. It should be noted that the dielectric protrusion preferably has a lower dielectric constant than the liquid crystal layer.

In this liquid crystal display device 300B, each of its storage capacitors is formed in a region where an extended portion of CS bus line and a drain extension line overlap with each other. For example, the CS bus line 113-1 has a ring-like extended portion 113-1E, and one of the two storage capacitors of the subpixel SP-C is located in a region where the central bridge portion of the ringlike extended portion 113-1E overlaps with the drain extension line 117c. Likewise, the CS bus line 113-2 also has a ringlike extended portion 113-2E, and the other storage capacitor of the subpixel SP-C is located in a region where the central bridge portion of the ringlike extended portion 113-2E overlaps with the drain extension line 117c. Furthermore, the ring portions of the ringlike extended portions 113-1E and 113-2E are arranged so as to shield the gaps between adjacent subpixel electrodes from incoming light. The storage capacitor of the subpixel SP-A is formed where the CS bus line 113-1 and the drain extension line 117a overlap with each other (i.e., under the subpixel electrode 111c2). And the storage capacitor of the subpixel SP-B is formed where the CS bus line 113-2 and the drain extension line 117b overlap with each other (i.e., under the subpixel electrode 111c1).

Figure 14:
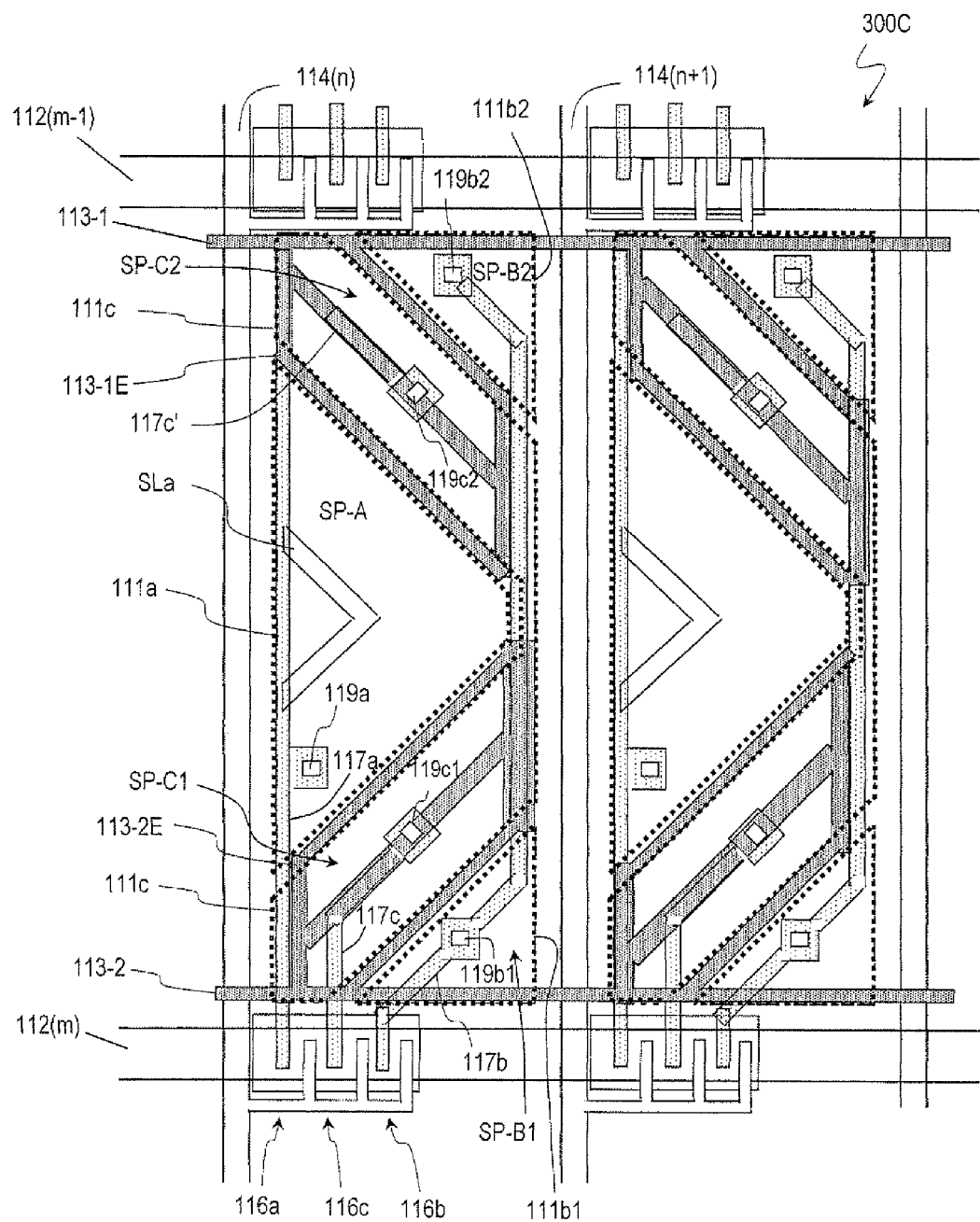
FIG. 14 schematically illustrates the structure of a pixel on the TFT substrate of an MVA mode liquid crystal display device 300C as yet another preferred embodiment of the present invention.

The liquid crystal display device 300C shown in FIG. 14 is represented by the same equivalent circuit, and has the same arrangement of subpixels, as the liquid crystal display devices 100C and 200C shown in FIGS. 6 and 10. In the liquid crystal display device 300B shown in FIG. 13, the subpixel electrodes 111c1 and 111c2 are electrically connected together with the drain extension line 117c. In this liquid crystal display device 300C, on the other hand, the subpixel electrodes are combined into a single subpixel electrode 111c in a U- or horseshoe shape. Also, this device 300C is designed such that the gap between the coupling portion of the U-subpixel electrode 111c that couples the two regions together and the subpixel electrode 111a is shielded with the drain extension line 117a.

Furthermore, in this liquid crystal display device 300C, one SP-C2 of the two regions of the third subpixel has a drain island 117c', which is made of the same conductive layer as the drain extension lines. The drain island 117c' is connected to the subpixel electrode 111c at a contact portion 119c2. One of the two storage capacitors of the subpixel SP-C is located in a region where the drain island 117c' overlaps with a part of the ringlike extended portion 113-1E of the CS bus line. The other storage capacitor of the subpixel SP-C is located in a region where the drain extension line 117c overlaps with the ringlike extended portion 113-2E of the CS bus line 113-2.

In this preferred embodiment, the storage capacitors are arranged parallel to the gaps between the adjacent subpixel electrodes in order to minimize the leakage of light by overlapping the storage capacitors with the alignment regulating means (such as electrode slits or dielectric protrusions) that is provided on the counter substrate to obtain a multi-domain structure.

Hereinafter, it will be described what type of arrangement of subpixels within a pixel is preferred from the standpoint of γ characteristic.

First of all, the viewing angle dependence of the γ characteristic of a two division structure will be described with reference to FIGS. 15(a) and 15(b). In this example, the bright subpixel SP-A is supposed to be split into two regions SP-A1 and SP-A2 and the dark subpixel SP-B is supposed to be split into two regions SP-B1 and SP-B2. However, as long as such a two division structure is adopted, the γ characteristic will remain the same even if each subpixel is divided into three or more regions. Nevertheless, if each subpixel is split into two regions as shown in FIG. 15(a), the checkerboard pattern formed by bright and dark subpixels will not be sensed easily as jaggedness on the screen even when a grayscale tone is displayed on a liquid crystal display device with a huge screen size of 52 inches (with pixel arrangement pitches of 200 μm in the row direction and 600 μm in the column direction) or more.

The viewing angle dependence of the γ characteristic of such a two division structure (which is also called a "2VT structure" because it realizes superposition of two VT characteristics) is shown in FIG. 15(b), of which the abscissa represents the grayscale when the viewer is located in front of the panel and the ordinate represents the grayscale in the horizontal direction (that is either parallel or perpendicular to the axes of polarization) at an oblique viewing angle of 45 degrees with respect to a normal to the display screen. As shown in FIG. 15(b), according to the two division structure, the curves are depressed around the 100/255 grayscale and do not vary smoothly. To reduce such a viewing angle dependence of the γ characteristic, the division number needs to be three or more.

Next, it will be described with reference to FIGS. 16 and 17 what types of arrangement of subpixels is preferred and how the viewing angle dependence of the γ characteristic will change if a three division structure (which is also called a "3VT structure") is adopted.

FIG. 16(b) shows the viewing angle dependence of the γ characteristic in a situation where a bright subpixel SP-A, a dark subpixel SP-B and moderate subpixels SP-C (including SP-C1 and SP-C2) has an area ratio of one to one to two as shown in FIG. 16(a). Comparing FIG. 16(b) to FIG. 15(b), it can be seen easily that the smoothness has increased in the vicinity of the 100/255 grayscale.

Also, if the bright, dark and moderate subpixels SP-A, SP-B and SP-C (including SP-C1 and SP-C2) have an area ratio of one to one to one as shown in FIG. 17(a), the smoothness will further increase in the vicinity of the 100/255 grayscale as shown in FIG. 17(b). That is why to reduce the viewing angle dependence of the γ characteristic as much as possible, the bright, moderate and dark subpixels preferably have an area ratio of one to one to one.

Meanwhile, to reduce the jaggedness on the display screen as much as possible, it is preferred that the bright subpixel be arranged at the center of a pixel. Also, considering that the luminance ranking between the subpixels could have to be reversed when a dot inversion drive is adopted, for example, the bright and dark subpixels are preferably interchanged with each other. For that reason, at least the bright and dark subpixels preferably have an equal area. Furthermore, to further reduce the jaggedness on the display screen, it is preferred that the bright and dark subpixels be arranged close to each other at the center of pixel. In the liquid crystal display device shown in FIG. 5, for example, the moderate and dark subpixels can be easily interchanged within a pixel.

Furthermore, considering the wavelength dependence of the γ characteristic, the blue pixel preferably has a smaller cell gap (i.e., the thickness of the liquid crystal layer) than any other color pixel (which is typically a green pixel or a red pixel).

FIG. 17(b) shows the viewing angle dependences of the γ characteristics for red (R), green (G) and blue (B), respectively. As can be seen from FIG. 17(b), the viewing angle dependence of blue (B) is heavier than that of red (R) or green (G) due to the wavelength dispersion of the retardation (or birefringence) of the liquid crystal layer. The grayscale characteristics shown in FIG. 17(b) were obtained when all of the R, G and B pixels had a cell gap (i.e., the thickness of the liquid crystal layer) of 3.4 μm. However, if only the B pixel has its cell gap decreased to 3.0 μm, then the γ characteristic of the B pixel would be closer to those of the other color pixels. As a result, the viewing angle dependence of the γ characteristic can be reduced overall.

Optionally, the G bus line could also be used to form the storage capacitors as described above.

Figure 18:
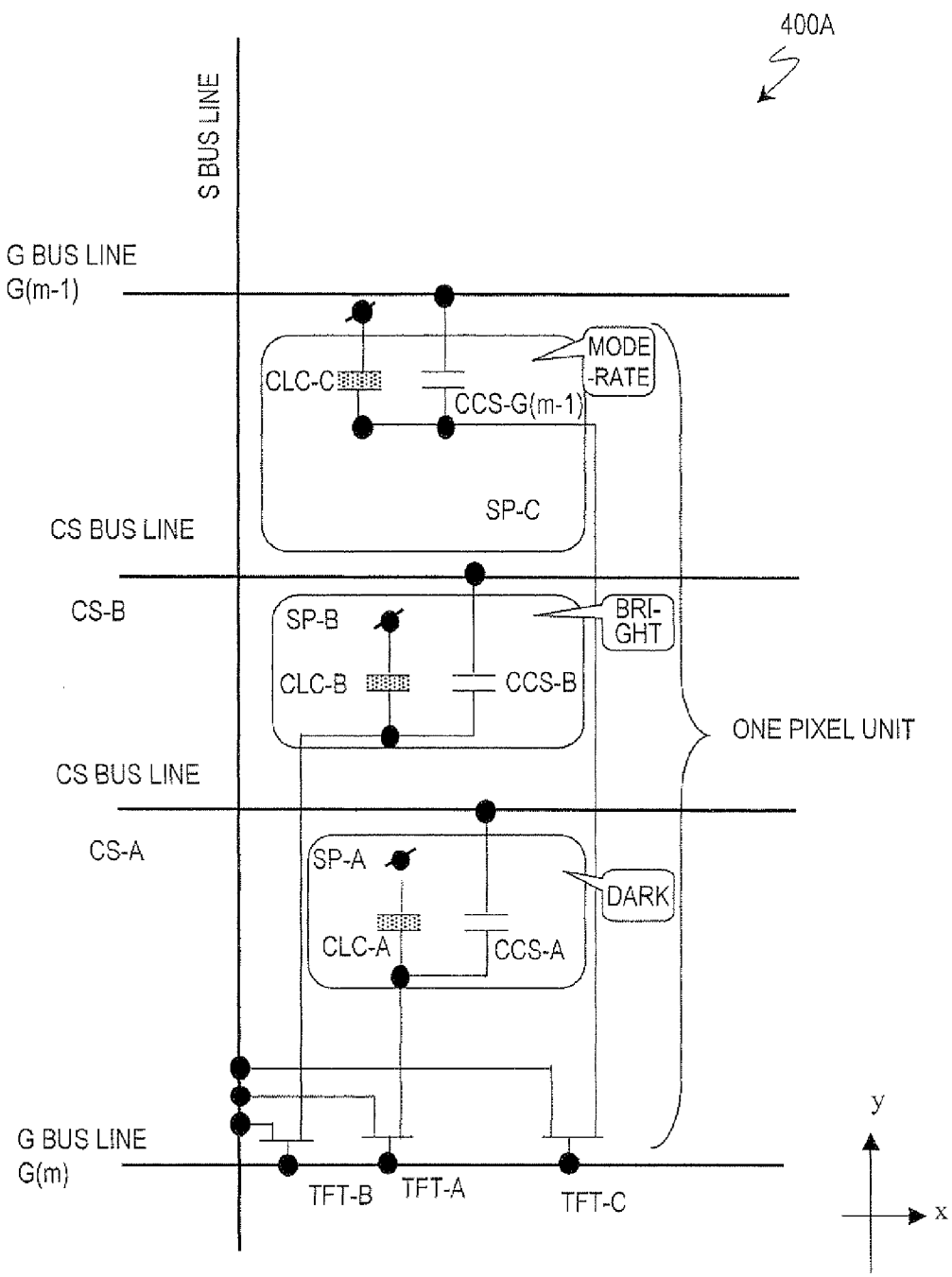
FIG. 18 schematically illustrates an equivalent circuit of a liquid crystal display device 400A as yet another preferred embodiment of the present invention.

FIG. 18 schematically illustrates an equivalent circuit of a liquid crystal display device 400A as another preferred embodiment of the present invention. In the liquid crystal display device 400A, each pixel has first, second and third subpixels SP-A, SP-B and SP-C. The first, second and third subpixels SP-A, SP-B and SP-C and two CS bus lines CS-A and CS-B are arranged between two adjacent G bus lines. In this liquid crystal display device 400A, the number of G bus lines agrees with that of rows of pixels. However, each G bus line is not only used to select a pixel but also connected to the storage capacitor of the third subpixel SP-C of another pixel that is adjacent to the given pixel in the column direction. That is why each pixel is associated with two G bus lines.

FIG. 18 illustrates a pixel on an $m^{th}$ row and the G bus lines associated with the $(m-1)^{th}$ and $m^{th}$ rows are identified by G(m−1) and G(m), respectively. The gate electrodes of the respective thin-film transistors TFT-A, TFT-B and TFT-C of the first, second and third subpixels SP-A, SP-B and SP-C are connected to the G bus line G(m). Likewise, although not shown in FIG. 18, the gate electrodes of the respective TFTs of the three subpixels on the $(m-1)^{th}$ row are connected to the G bus line G(m−1).

In this liquid crystal display device 400A, the connection between the two subpixels SP-A, SP-B and TFT-A, TFT-B, the G bus lines, the S bus lines and the two electrically independent CS bus lines is basically the same as in the liquid crystal display device 100A shown in FIG. 4, and the description thereof will be omitted herein for the sake of simplicity. The third subpixel SP-C is connected in the following manner.

The third subpixel SP-C includes a liquid crystal capacitor CLC-C and a storage capacitor CCS-G(m−1). One electrode (i.e., the subpixel electrode) of the liquid crystal capacitor CLC-C is connected to the drain electrode of TFT-C, so is one electrode of the storage capacitor CCS-G(m−1). Meanwhile, the other electrode of the liquid crystal capacitor CLC-C is the counter electrode that is also shared by the other liquid crystal capacitors CLC-A and CLC-B. And the other electrode (i.e., storage capacitor counter electrode) of the storage capacitor CCS-G(m−1) is connected to the G bus line G(m−1).

The liquid crystal capacitor CLC-A of the first subpixel SP-A is subjected to voltage pull-up (or pull-down) by the CS bus line CS-A by way of the storage capacitor CCS-A, while the liquid crystal capacitor CLC-B of the second subpixel SP-B is subjected to voltage pull-down (or pull-up) by the CS bus line CS-B by way of the storage capacitor CCS-B. Meanwhile, the G bus line G(m) is selected after the G bus line G(m−1) has been turned OFF. And the G bus line G(m−1) will be kept OFF until just before the G bus line G(m) is selected next time. Strictly speaking, the liquid crystal capacitor CLC-C of the third subpixel SP-C is subjected to the voltage pull-up when the G bus line G(m−1) is selected. Nevertheless, the G bus line G(m−1) will be selected just before one vertical scanning period passes since the G bus line G(m) was selected. The G bus line G(m) is selected just after having its voltage pulled up due to the selection of the G bus line G(m−1). That is to say, the period during which the G bus line G(m−1) is selected is much shorter than one vertical scanning period. Consequently, it can be said that the liquid crystal capacitor CLC-C of the third subpixel SP-C is hardly affected by the G bus line G(m−1). As a result, the effective voltage applied to the liquid crystal capacitor CLC-C becomes an intermediate value between the effective voltages applied to the liquid crystal capacitors CLC-A and CLC-B. Therefore, when the first subpixel SP-A becomes a dark subpixel, the second subpixel SP-B becomes a bright subpixel and the third subpixel becomes a moderate subpixel. In this manner, the 3VT structure is realized without increasing the number of CS bus lines per pixel.

Also, the drain extension line has a storage capacitor electrode that is connected to the subpixel electrode of the third subpixel at a contact portion and that overlaps with a gate bus line. In this liquid crystal display device 400A, the third subpixel is arranged beside the gate bus line that is used to select an adjacent pixel in the column direction, and therefore, the distance between the contact portion of the drain extension line and the storage capacitor electrode can be shortened and the layout of the drain extension line can be simplified. In addition, since the bright subpixel can be arranged at the center of a pixel, the impression of jaggedness can be reduced significantly.

In the liquid crystal display devices described above, each CS bus line is supposed to be connected to the storage capacitor(s) of at least one subpixel within a single pixel. However, the present invention is in no way limited to those specific preferred embodiments. Each CS bus line may also be connected to the storage capacitors of multiple subpixels belonging to two pixels that are adjacent to each other in the column direction.

Figure 19:
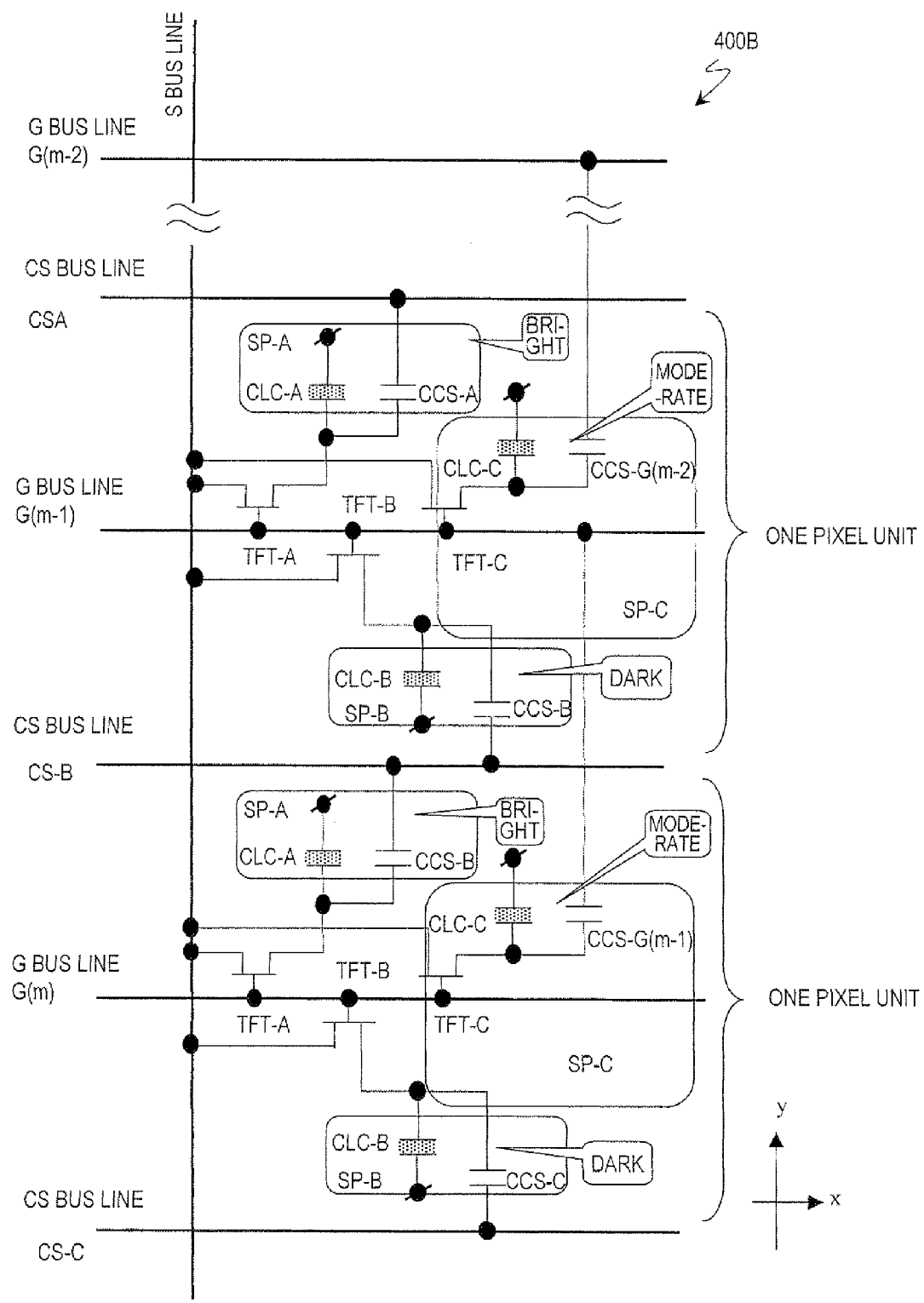
FIG. 19 schematically illustrates an equivalent circuit of a liquid crystal display device 400B as yet another preferred embodiment of the present invention.

FIG. 19 schematically illustrates an equivalent circuit of a liquid crystal display device 400B as another preferred embodiment of the present invention. In this liquid crystal display device 400B, the number of CS bus lines (or CS lines) agrees with that of rows of pixels. However, each single CS bus line causes either voltage pull-up or pull-down in the liquid crystal capacitors of subpixels belonging to two pixels that are adjacent to each other in the column direction. That is why each pixel is associated with two CS bus lines. Consequently, the liquid crystal display device 400B has fewer CS bus lines than the liquid crystal display device 400A shown in FIG. 18. The liquid crystal display device 400B has a so-called "center gate structure" in which a gate bus line is arranged at the center of a pixel.

Now look at a pixel on the (m−1)$^{th}$ row. The first, second and third subpixels SP-A, SP-B and SP-C of that pixel on the (m−1)$^{th}$ row are arranged between two adjacent CS bus lines CS-A and CS-B. The third subpixel SP-C has a liquid crystal capacitor CLC-C and a storage capacitor CCS-G(m−2). One electrode (i.e., the subpixel electrode) of the liquid crystal capacitor CLC-C is connected to the drain electrode of TFT-C, so is one electrode of the storage capacitor CCS-G(m−2). Meanwhile, the other electrode of the liquid crystal capacitor CLC-C is the counter electrode that is also shared by the other liquid crystal capacitors CLC-A and CLC-B. And the other electrode (i.e., storage capacitor counter electrode) of the storage capacitor CCS-G(m−2) is connected to the G bus line G(m−2).

The liquid crystal capacitor CLC-A of the first subpixel SP-A is subjected to a voltage pull-up (or pull-down) by the CS bus line CS-A by way of the storage capacitor CCS-A, while the liquid crystal capacitor CLC-B of the second subpixel SP-B is subjected to a voltage pull-down (or pull-up) by the CS bus line CS-B by way of the storage capacitor CCS-B. Meanwhile, the G bus line G(m−1) is selected after the G bus line G(m−2) has been turned OFF. And the G bus line G(m−2) will be kept OFF until just before the G bus line G(m−1) is selected next time. As a result, the effective voltage applied to the liquid crystal capacitor CLC-C of the third subpixel SP-C is hardly affected by the voltage pull-up or pull-down and becomes an intermediate value between the effective voltages applied to the liquid crystal capacitors CLC-A and CLC-B. Therefore, when the first subpixel SP-A becomes a bright subpixel, the second subpixel SP-B becomes a dark subpixel and the third subpixel SP-C becomes a moderate subpixel.

Next, look at the pixel on the m$^{th}$ row. The first, second and third subpixels SP-A, SP-B and SP-C of that pixel on the m$^{th}$ row are arranged between two adjacent CS bus lines CS-B and CS-C. The liquid crystal capacitor CLC-A of the first subpixel SP-A is subjected to a voltage pull-down (or pull-up) by the CS bus line CS-B by way of the storage capacitor CCS-B, while the liquid crystal capacitor CLC-B of the second subpixel SP-B is subjected to a voltage pull-up (or pull-down) by the CS bus line CS-C by way of the storage capacitor CCS-C. Meanwhile, the G bus line G(m) is selected after the G bus line G(m−1) has been turned OFF. And the G bus line G(m−1) will be kept OFF until just before the G bus line G(m) is selected next time. As a result, the effective voltage applied to the liquid crystal capacitor CLC-C of the third subpixel SP-C is hardly affected by the voltage pull-up or pull-down and becomes an intermediate value between the effective voltages applied to the liquid crystal capacitors CLC-A and CLC-B. Therefore, when the first subpixel SP-A becomes a bright subpixel, the second subpixel SP-B becomes a dark subpixel and the third subpixel SP-C becomes a moderate subpixel.

The liquid crystal capacitor CLC-B of the second subpixel SP-B of the pixel on the (m−1)$^{th}$ row and the liquid crystal capacitor CLC-A of the first subpixel SP-A of the pixel on the m$^{th}$ row are both subjected to a voltage pull-down (or pull-up) by the CS bus line CS-B. However, as the liquid crystal display device 400B performs a dot inversion drive, the polarity of a source signal supplied to the S bus line when the G bus line G(m−1) is selected is inverse of that of the source signal supplied to the S bus line when the G bus line G(m) is selected. Consequently, when the second subpixel SP-B of the pixel on the (m−1)$^{th}$ row becomes a dark subpixel, the first subpixel SP-A of the pixel on the m$^{th}$ row becomes a bright subpixel.

In the liquid crystal display device 400B with the center gate structure shown in FIG. 19, the storage capacitor of the third subpixel is connected to the G bus line. However, the present invention is in no way limited to that specific preferred embodiment. The storage capacitor of the third subpixel may also be connected to two CS bus lines.

Figure 20:
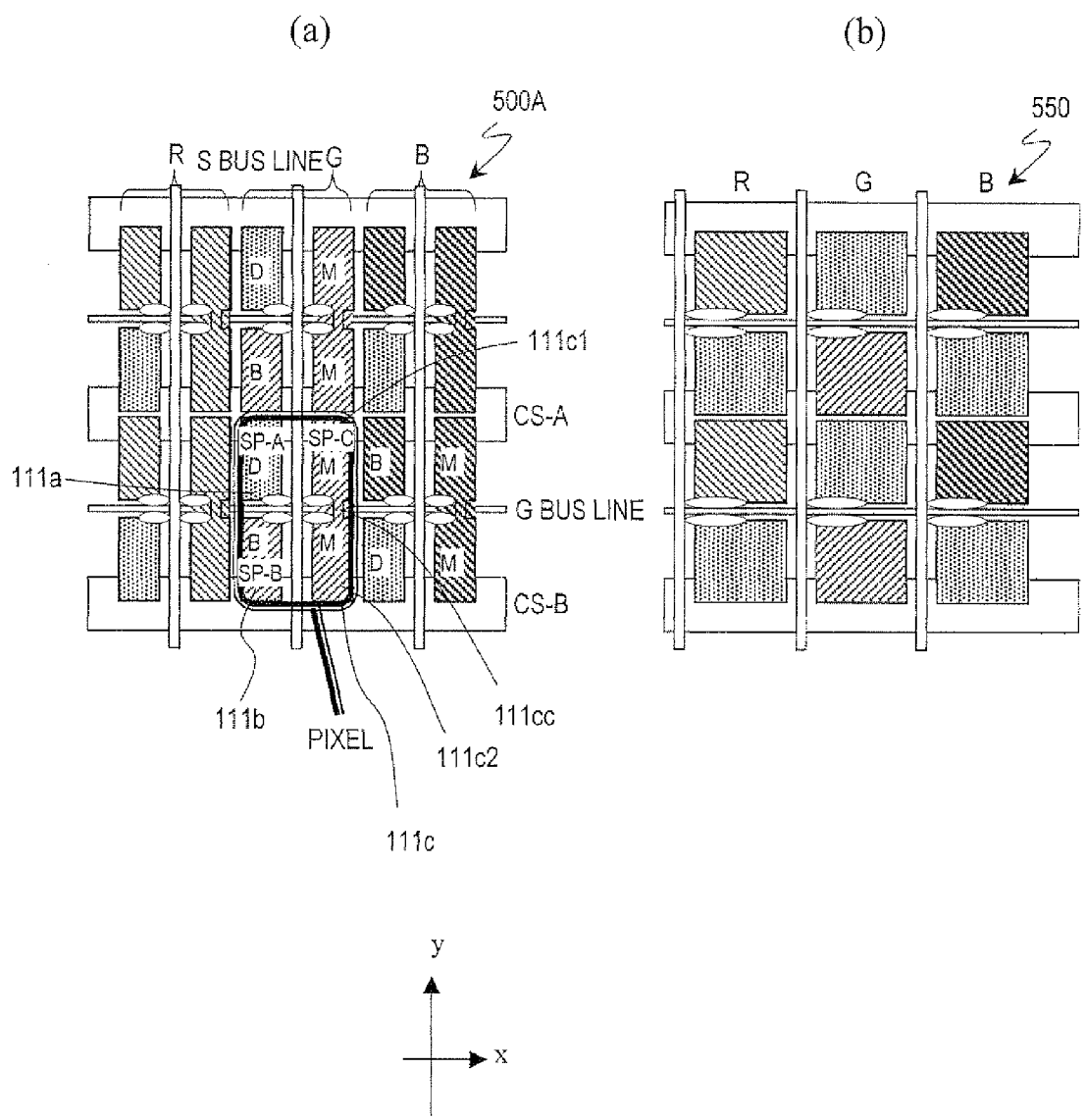
FIG. 20(a) is a schematic plan view of the TFT substrate of a liquid crystal display device 500A as another preferred embodiment of the present invention and FIG. 20(b) is a schematic plan view of the TFT substrate of a liquid crystal display device 550 with a two division structure.

FIG. 20(*a*) is schematic plan view illustrating the TFT substrate of a liquid crystal display device 500A as a preferred embodiment of the present invention. The liquid crystal display device 500A has a three division structure. For the purpose of comparison, the TFT substrate of a liquid crystal display device 550 with the two division structure is illustrated in the schematic plan view of FIG. 20(*b*).

In this liquid crystal display device 500A, the number of CS bus lines (or CS lines) agrees with that of rows of pixels. However, each single CS bus line forms the storage capacitors of multiple subpixels belonging to two adjacent pixels in the column direction and each pixel is associated with two CS bus lines. Also, in this liquid crystal display device 500A, a source bus line runs in the column direction, and a gate bus line runs in the row direction, both through the center of a pixel. That is to say, this liquid crystal display device 500A has a so-called "center gate structure".

In this liquid crystal display device 500A, each pixel includes first, second and third subpixels SP-A, SP-B and SP-C. The first and second subpixels SP-A and SP-B are arranged in the column direction.

The third subpixel SP-C is defined by a subpixel electrode 111*c*, which straddles the G bus line and which includes an electrode 111*c*1 arranged in the +y direction with respect to the G bus line, an electrode 111*c*2 arranged in the −y direction with respect to the G bus line, and a coupling portion 111*cc* that couples these electrodes 111*c*1 and 111*c*2 together. The electrodes 111*c*1 and 111*c*2 are arranged so as to be adjacent to the subpixel electrodes 111*a* and 111*b* of the first and second subpixels SP-A and SP-B, respectively, in the row direction. It should be noted that when measured in the row direction (i.e., x direction), the electrodes 111*c*1 and 111*c*2 are approximately as long as the subpixel electrodes 111*a* and 111*b*. The coupling portion 111*cc* has a much smaller area than the electrodes 111*c*1 and 111*c*2. Thus, unless the area of the coupling portion 111*cc* is taken into account, the first, second and third subpixels SP-A, SP-B and SP-C have an area ratio of approximately one to one to two.

The liquid crystal capacitor of the first subpixel SP-A is subjected to a voltage pull-up (or pull-down) by the CS bus line CS-A, while the liquid crystal capacitor of the second subpixel SP-B is subjected to a voltage pull-down (or pull-up) by the CS bus line CS-B. On the other hand, the liquid crystal capacitor of the third subpixel SP-C is subjected to both a voltage pull-up (or pull-down) by the CS bus line CS-A and a voltage pull-down (or pull-up) by the CS bus line CS-B. The voltage applied to the liquid crystal capacitor of the third subpixel SP-C is lower than one of the voltages applied to the respective liquid crystal capacitors of the first and second subpixels SP-A and SP-B but higher than the other. Consequently, the third subpixel becomes a moderate subpixel and the bright, moderate and dark subpixels come to have an area ratio of approximately one to two to one.

The CS bus line CS-A causes a voltage pull-up (or pull-down) in not just the liquid crystal capacitor of the first subpixel SP-A of the pixel on the $m^{th}$ row but also the liquid crystal capacitor of the second subpixel SP-B of the pixel on the $(m-1)^{th}$ row. However, if the liquid crystal display device 500A performs a dot inversion drive, one of the first subpixel SP-A of the pixel on the $m^{th}$ row and the second subpixel SP-B of the pixel on the $(m-1)^{th}$ row becomes a bright subpixel and the other subpixel becomes a dark subpixel. As a result, as viewed in the column direction, the first and second subpixels will be an alternate arrangement of dark and bright subpixels.

In this liquid crystal display device 500A, the S bus line is arranged so as to run through the center of a pixel in the row direction, and therefore, the drain extension line that connects the drain electrode of a TFT arranged in the vicinity of the S bus line to the subpixel electrode can be short enough to avoid crossing any other line. The pixel structure of the liquid crystal display device 500A is as simple as that of the liquid crystal display device 550 with the two division structure shown in FIG. 20(*b*), and can achieve a higher yield while maintaining a high transmittance. Also, although the liquid crystal display device 550 with the dual subpixel structure could produce some jaggedness, the liquid crystal display device 500A would hardly produce such jaggedness because the third subpixel SP-C covers almost the entire pixel in the column direction.

Furthermore, if the liquid crystal display device 100A shown in FIG. 4 is driven at high speeds, a horizontal shadow could be produced. Hereinafter, it will be described with reference to FIG. 21 why such a horizontal shadow is produced in a normally black mode liquid crystal display device. In the liquid crystal display device 100A, each CS bus line is connected to the storage capacitors of multiple subpixels in a single pixel. When the liquid crystal display device 100A presents at high speeds a background display portion with low luminance (and at a grayscale tone), and a window portion having two regions with approximately as low a luminance as the background display portion and a high-luminance region sandwiched between those two regions, horizontal shadows that have a higher luminance than what should be presented there could be produced on the right- and left-hand sides of the window portion as shown in FIG. 21(*a*).

In a situation where a positive write voltage is applied to a pixel electrode, as the pixel potential rises, the gate-drain potential falls and the ON-state resistance of the TFT rises gradually. On the other hand, if a negative write voltage is applied to the pixel electrode, the gate-drain potential is constant in spite of the fall of the potential at the pixel electrode. In this manner, the ON-state resistance of the TFT varies according to the polarity of the write voltage. That is to say, the ON-state resistance is high when a positive voltage is written but low when a negative voltage is written. As a result, the pixel is charged at a lower rate when a positive voltage is written than when a negative voltage is written.

Furthermore, while a pixel is being charged, the potential at the pixel electrode varies. As a result, a ripple voltage is superposed on a CS signal voltage. The ripple voltage varies with the ON-state resistance of a TFT and has its polarity inverted according to the polarity of the write voltage. If a dot inversion drive is carried out, write voltages with mutually different polarities are applied to adjacent pixels. As described above, according to the polarity of the write voltage, the ON-state resistance of a TFT changes and the potential at the pixel electrode varies at different rates. Consequently, a positive ripple voltage is superposed on the CS signal voltage.

Figure 21:
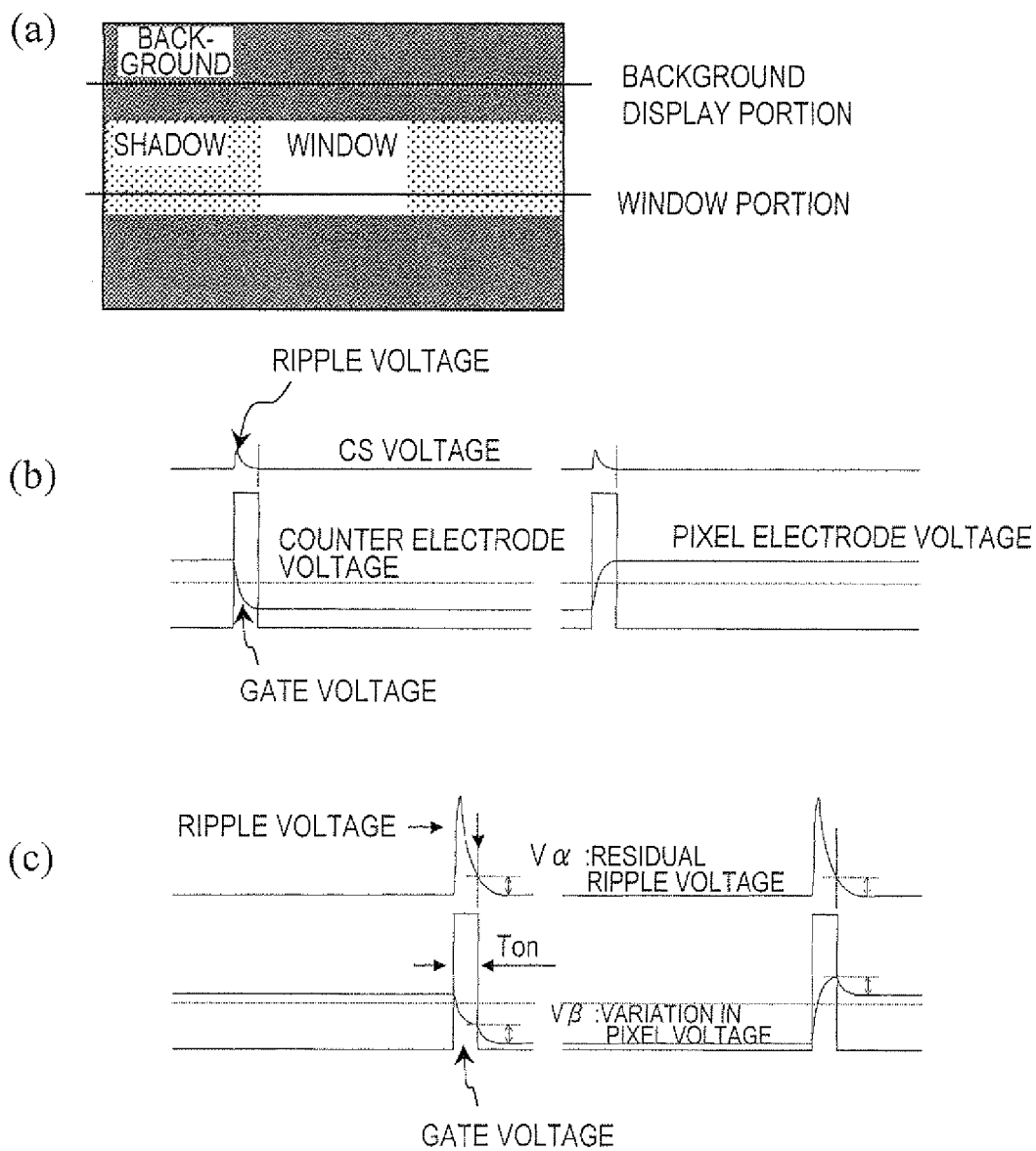
FIGS. 21(a) through 21(c) are schematic representations showing how horizontal shadows are produced.

FIG. 21(*b*) shows how the ripple voltage superposed on the CS voltage applied to a pixel in the background display portion, a counter electrode voltage, a subpixel electrode voltage, and a gate voltage change with time. Even though the CS voltage actually varies with time, the ripple voltage is shown in FIG. 21(*b*) with respect to the CS voltage. The ripple voltage that has been superposed on the CS voltage attenuates with time and will go almost zero when the gate voltage falls. For that reason, the ripple voltage has virtually no influence on the pixel electrode voltage. On the other hand, as shown in FIG. 21(*c*), the positive and negative voltages written on a pixel in the window portion have greater amplitude than in the background display portion because this device operates in normally black mode. That is why the ripple voltage increases at a pixel in the window portion compared to the background display portion. Consequently, when the gate voltage falls, the ripple voltage superposed on the CS signal has not sufficiently attenuated yet. Instead, even after the gate voltage has fallen, the ripple voltage continues to attenuate. As a result, the pixel electrode voltage to be affected by the CS voltage will vary by approximately Vβ due to the residual ripple voltage Vα. In this manner, horizontal shadows are produced in the window portion.

On the other hand, in the liquid crystal display device 500A shown in FIG. 20, each CS bus line is connected to the storage capacitors of subpixels belonging to two pixels that are adjacent to each other in the column direction. That is why while one of the two pixels is being charged, the other pixel will function as a smoothing capacitor to reduce the ripple voltage. Consequently, the occurrence of horizontal shadows can be prevented.

In the liquid crystal display device 500A, the bright, moderate and dark subpixels have an area ratio of one to two to one. However, the present invention is in no way limited to that specific preferred embodiment. As already described with reference to FIGS. 16 and 17, the bright, moderate and dark subpixels should rather have an area ratio of one to one to one from the standpoint of the viewing angle dependence of the γ characteristic.

Figure 22:
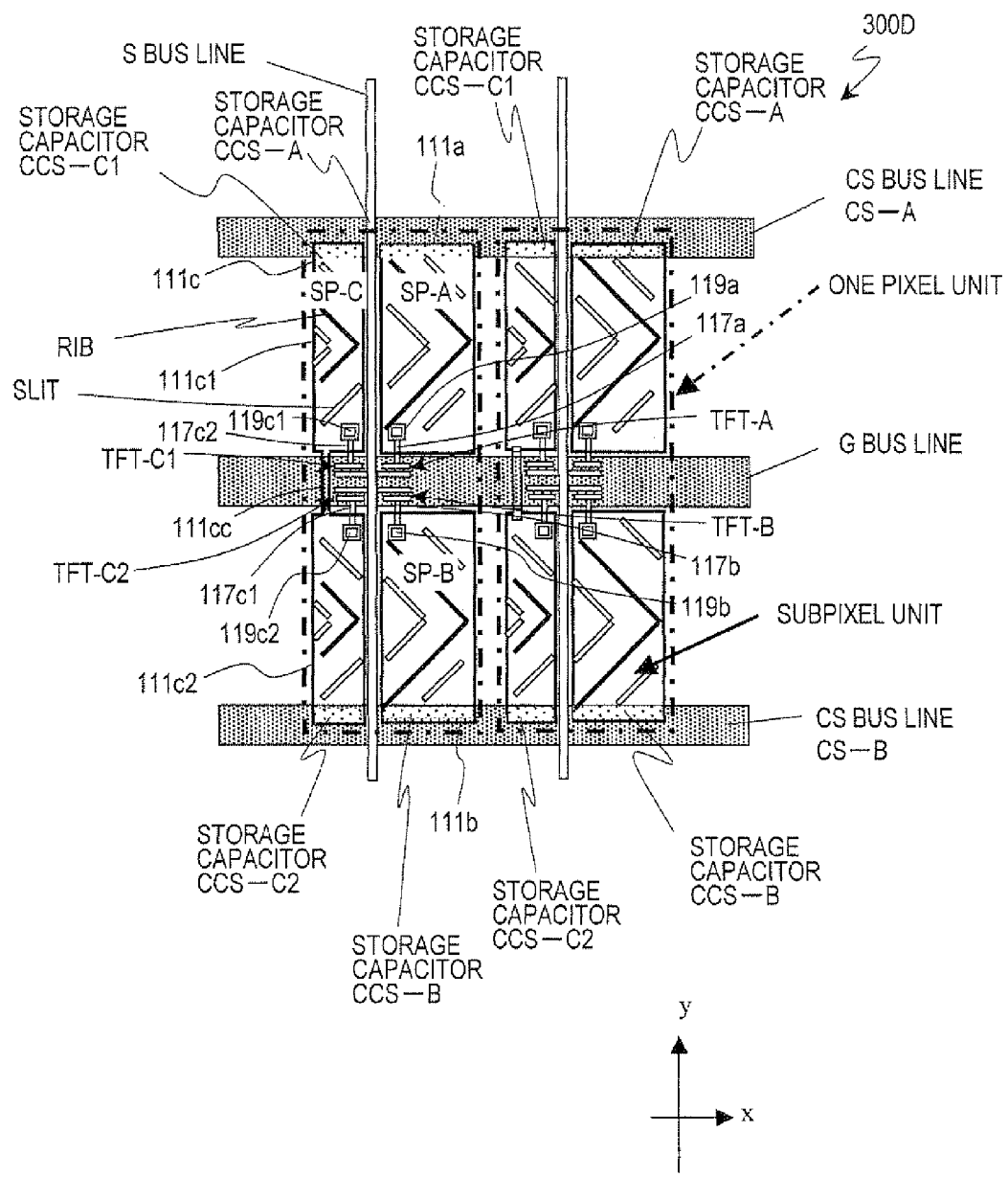
FIG. 22 is a schematic plan view illustrating a liquid crystal display device 300D as another preferred embodiment of the present invention.

FIG. 22 is a schematic plan view illustrating a liquid crystal display device 300D as another preferred embodiment of the present invention. In this liquid crystal display device 300D, the subpixel electrodes on the TFT substrate have slits, while the counter electrode on the counter substrate has ribs. Those slits and ribs are arranged so as to align the liquid crystal molecules in four different directions.

The first and second subpixels SP-A and SP-B are defined by subpixel electrodes 111a and 111b, respectively, and are arranged in the column direction (i.e., y direction). The subpixel electrode 111c of the third subpixel SP-C includes electrodes 111c1, 111c2 and a coupling portion 111c that couples these electrodes 111d1 and 111c2 together. The electrodes 111c1 and 111c2 are arranged so as to be adjacent to the subpixel electrodes 111a and 111b of the first and second subpixels SP-A and SP-B, respectively, in the row direction (i.e., x direction). When measured in the row direction (i.e., x direction), the electrodes 111c1 and 111c2 are approximately a half as long as the subpixel electrodes 111a and 111b. Although the electrodes 111c1 and 111c2 are electrically connected together with the coupling portion 111cc, the coupling portion 111cc has a relatively small area. Thus, the first, second and third subpixels SP-A, SP-B and SP-C have an area ratio of approximately one to one to one.

The first and second subpixels SP-A and SP-B include TFT-A and TFT-B, respectively, while the third subpixel SP-C includes TFT-C1 and TFT-C2 associated with the electrodes 111c1 and 111c2. The gate electrodes of TFT-C1 and TFT-C2, as well as those of TFT-A and TFT-B, are connected to the G bus line, and the third subpixel SP-C is a redundant structure. That is why even if one of the two contact holes to make contact portions 119c1 and 119c2 between the subpixel electrode 111c of the third subpixel SP-C and the drain extension lines 117c1 and 117c2 has not been formed as intended, the decrease in yield can still be suppressed. Or even if one of TFT-C1 and TFT-C2 has caused an operating failure, the decrease in yield can also be suppressed by isolating the malfunctioning transistor and using only the other transistor that operates normally. Also, as for TFT-A, TFT-B, TFT-C1, and TFT-C2, the source electrode extends in the x direction from the source bus line that runs in the y direction, and the drain electrode is arranged so as to face the source electrode.

The storage capacitor of a subpixel is mostly produced by an overlap between a subpixel electrode and a CS bus line. That is why there is no need to extend any drain extension line and there is no concern about a decrease in aperture ratio or the disconnection of the drain extension line, either. Also, such a storage capacitor structure is effective when there is only a relatively thin interlayer insulating film with a thickness of several micrometers between the CS bus line and the pixel electrode. This is because a desired electrostatic capacitance value can be achieved easily in that case. When measured in the row direction (i.e., the x direction), the subpixel electrode 111a of the first subpixel SP-A is as long as the subpixel electrode 111b of the second subpixel SP-B. And the width of overlap between the subpixel electrode 111a and the CS bus line CS-A is approximately equal to the one between the subpixel electrode 111b and the CS bus line CS-B. Consequently, the storage capacitor CCS-A of the first subpixel SP-A is approximately equal to the storage capacitor CCS-B of the second subpixel SP-B.

Also, when measured in the row direction (i.e., the x direction), the electrodes 111c1 and 111c2 of the third subpixel SP-C are approximately a half as long as the subpixel electrode 111a of the first subpixel SP-A. And the storage capacitors CCS-C1 and CCS-C2 of the third subpixel SP-C are approximately a half of the storage capacitor CCS-A of the first subpixel SP-A. Since the storage capacitors CCS-C1 and CCS-C2 are connected in parallel to each other, the sum of the storage capacitors CCS-C1 and CCS-C2 of the third subpixel SP-C is approximately equal to that of the storage capacitors CCS-A and CCS-B of the first and second subpixels SP-A and SP-B.

In the preferred embodiment described above, the electrodes 111c1 and 111c2 of the third subpixel SP-C are directly coupled together by the coupling portion 111cc. However, the present invention is in no way limited to that specific preferred embodiment. The electrodes 111c1 and 111c2 may also be electrically connected together by the drain electrode of a TFT.

Figure 23:
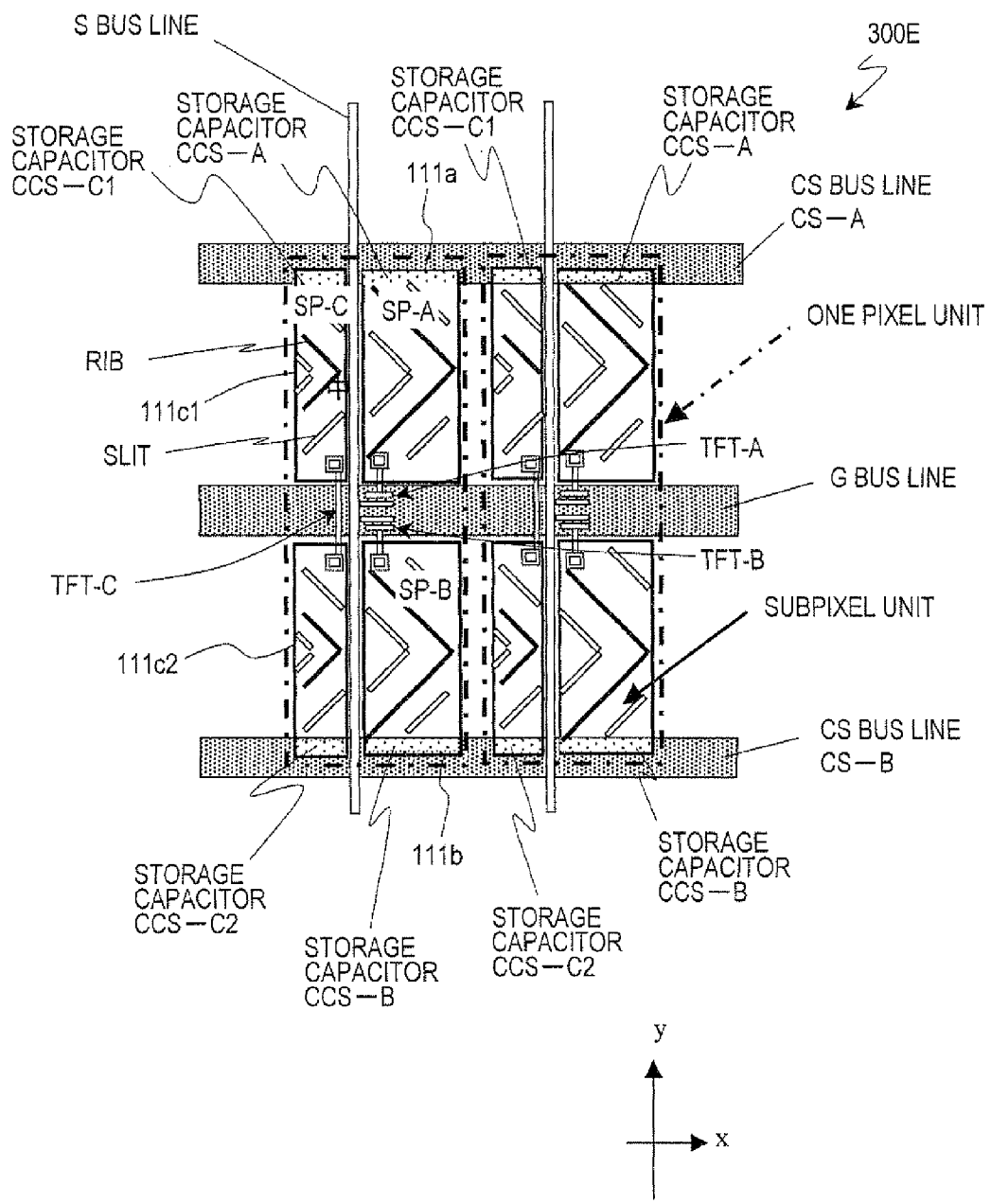
FIG. 23 is a schematic plan view illustrating a liquid crystal display device 300E as another preferred embodiment of the present invention.

FIG. 23 schematically illustrates a plan view of a liquid crystal display device 300E as another preferred embodiment of the present invention. In this liquid crystal display device 300E, the subpixel electrode 111c of the third subpixel SP-C includes electrodes 111c1 and 111c2, which are not directly coupled together. That is why a single pixel has four subpixel electrodes 111a, 111b, 111c1 and 111c2, which are separated from each other.

The drain electrode of TFT-C of the third subpixel SP-C is arranged parallel to the S bus line that runs in the y direction. The electrodes 111c1 and 111c2 are electrically connected to the same drain electrode in common and have an equal potential. Although this drain electrode overlaps with the G bus line, the drain electrode is relatively short in the row direction (i.e., in the x direction), and therefore, the increase in parasitic capacitance Cgd can be suppressed.

Figure 24:
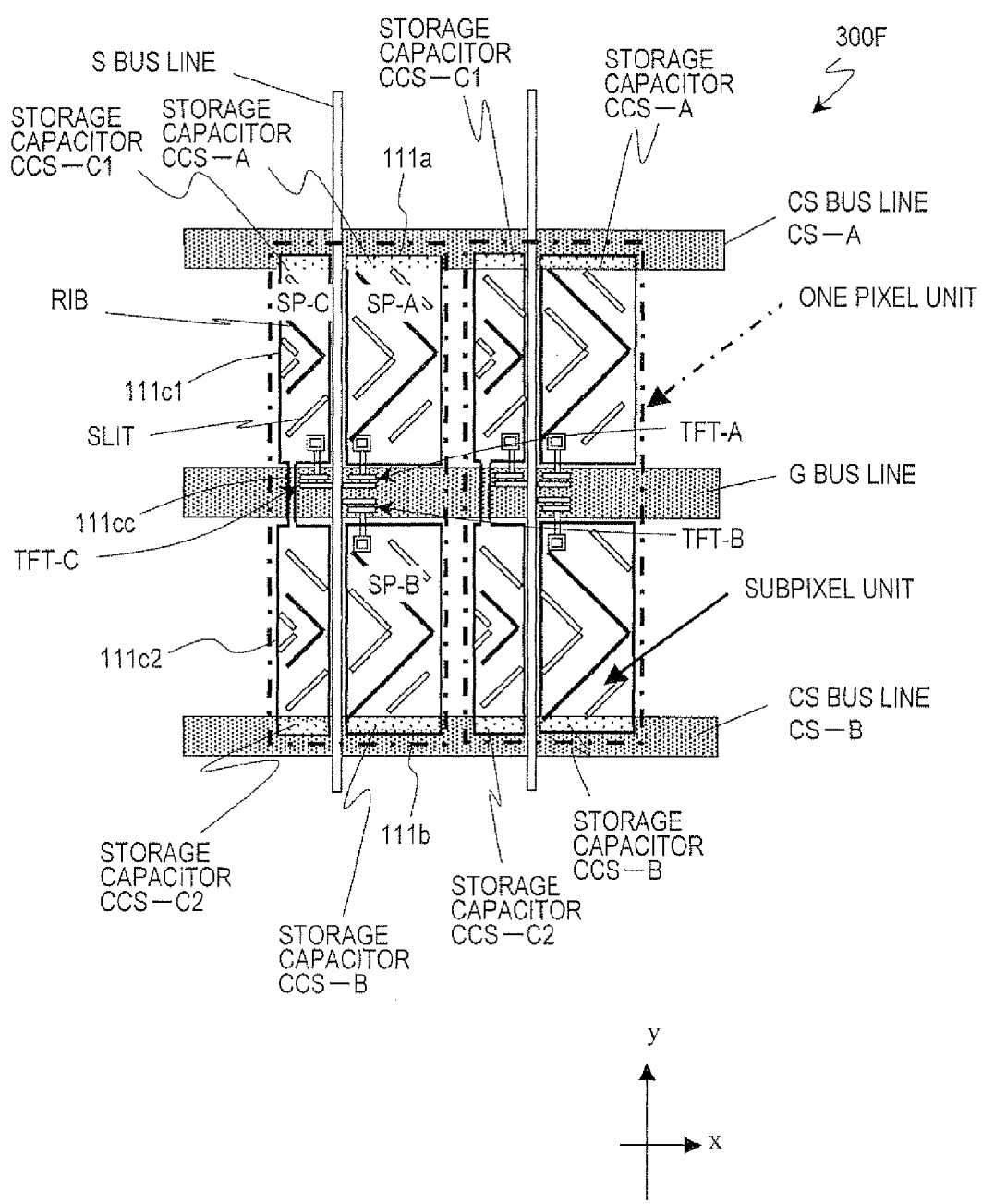
FIG. 24 is a schematic plan view illustrating a liquid crystal display device 300F as another preferred embodiment of the present invention.

FIG. 24 schematically illustrates a plan view of a liquid crystal display device 300F as another preferred embodiment of the present invention. In this liquid crystal display device 300F, the subpixel electrode 111c of the third subpixel SP-C includes electrodes 111c1 and 111c2 and a coupling portion 111cc that couples these electrodes 111c1 and 111c2 together. Although this coupling portion 111cc overlaps with the G bus line, the area of the coupling portion 111cc is so smaller than those of the electrodes 111c1 and 111c2 that the increase in the parasitic capacitance Cgd of the third subpixel SP-C can be suppressed.

Strictly speaking, however, the parasitic capacitance Cgd of the third subpixel SP-C has increased due to the overlap of the coupling portion 111cc with the G bus line. In this liquid crystal display device 300F, although TFT-C is provided for the electrode 111c1, no TFTs are provided for the electrode 111c2 and the drain electrode of TFT-C has a smaller area than those of TFT-A and TFT-B. As a result, the increase in the parasitic capacitance Cgd of the third subpixel SP-C has been suppressed. The Cgd ratio is represented as the ratio of the parasitic capacitance Cgd to a subpixel capacitance, which consists essentially of a liquid crystal capacitor Clc and a storage capacitor CCS. If the first, second and third subpixels SP-A, SP-B and SP-C have significantly different Cgd ratios, the feedthrough voltage will also vary significantly according to the Cgd ratio, thus producing a flicker. In this liquid crystal display device 300F, the Cgd ratio of the first, second and third subpixels SP-A, SP-B and SP-C is substantially even with the parasitic capacitance Cgd of the third subpixel SP-C suppressed, thereby minimizing the occurrence of a flicker.

Figure 25:
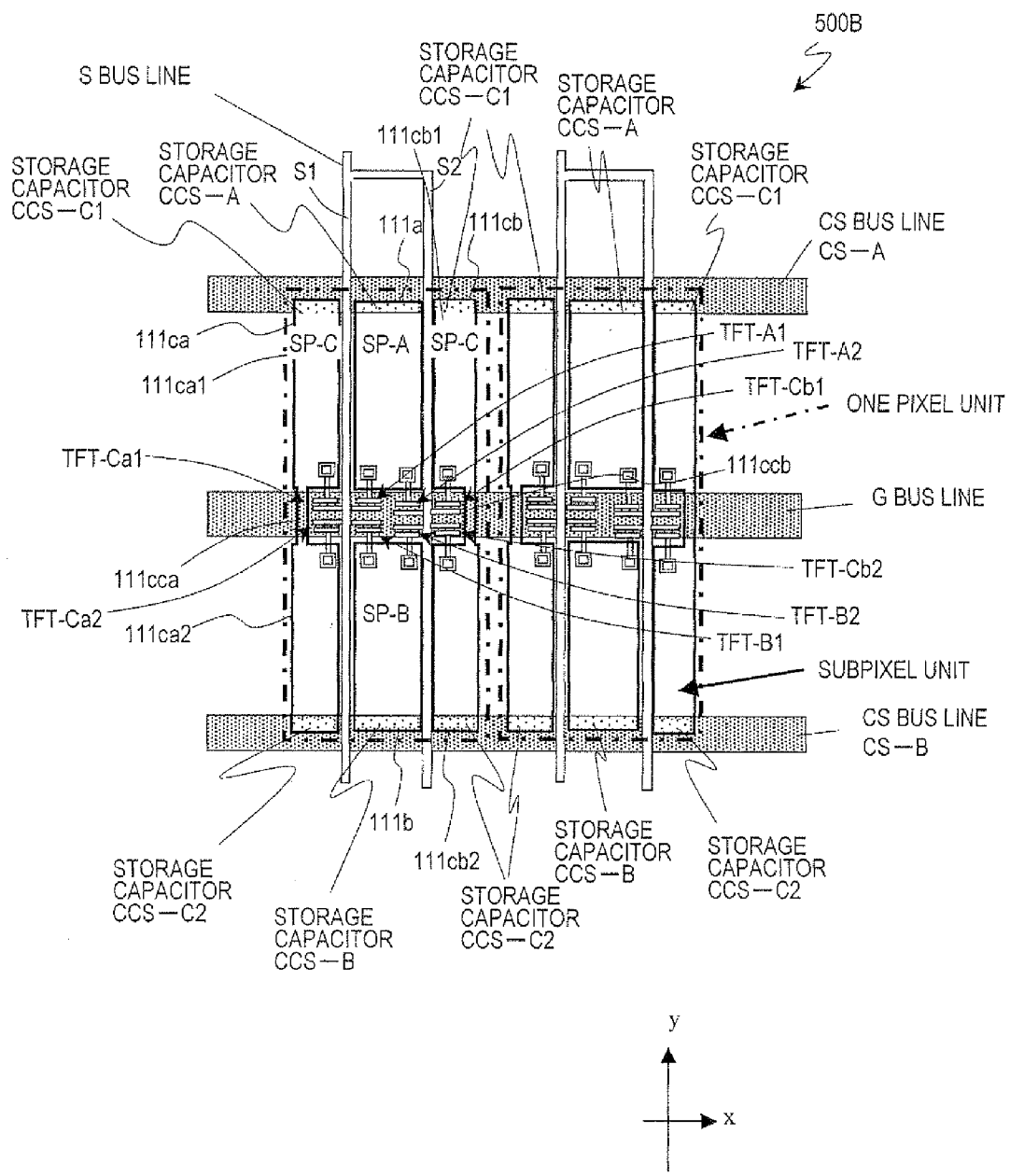
FIG. 25 is a schematic plan view illustrating the TFT substrate of a liquid crystal display device 500B as another preferred embodiment of the present invention.

FIG. 25 schematically illustrates a plan view of the TFT substrate of a liquid crystal display device 500B as another preferred embodiment of the present invention.

The S bus line includes a first source line S1 and a second source line S2 branched from the first source line S1. In this manner, an S bus line associated with each pixel is branched into these lines S1 and S2. The first subpixel SP-A includes TFT-A1 and TFT-A2, of which the source electrodes are connected to the first and second source lines S1 and S2, respectively. Likewise, the second subpixel SP-B includes TFT-B1 and TFT-B2, of which the source electrodes are also connected to the first and second source lines S1 and S2, respectively. Thus, the first and second subpixels SP-A and SP-B have redundant structures. Also, since one of the first and second subpixels SP-A and SP-B becomes a bright subpixel that contributes to the display operation significantly, the decrease in yield can be suppressed if the first and second subpixels SP-A and SP-B have redundant structures.

The third subpixel SP-C has first and second regions that are arranged so as to interpose the first and second subpixels SP-A and SP-B between them. The first source line S1 is arranged between the first and second subpixels SP-A and SP-B and the first region of the third subpixel SP-C. And the second source line S2 is arranged between the first and second subpixels SP-A and SP-B and the second region of the third subpixel SP-C.

The third subpixel SP-C includes subpixel electrodes 111ca and 111cb, which are provided for the first and second regions, respectively. Between these subpixel electrodes 111ca and 111cb of the third subpixel SP-A, arranged are the subpixel electrodes 111a and 111b of the first and second subpixels SP-A and SP-B. The subpixel electrode 111ca includes electrodes 111ca1 and 111ca2 and a coupling portion 111cca that couples these electrodes 111ca1 and 111ca2 together. Likewise, the subpixel electrode 111cb includes electrodes 111cb1 and 111cb2 and a coupling portion 111ccb that couples these electrodes 111cb1 and 111cb2 together.

When measured in the row direction (i.e., x direction), the electrodes 111ca1, 111ca2, 111cb1 and 111cb2 of the third subpixel SP-C are approximately a quarter as long as the subpixel electrodes 111a and 111b of the first and second subpixels SP-A and SP-B. On the other hand, when measured in the column direction (i.e., y direction), the electrodes 111ca1, 111ca2, 111cb1 and 111cb2 are approximately twice as long as the subpixel electrodes 111a and 111b. As a result, the area of the subpixel electrodes 111ca and 111cb is a half of the area of the subpixel electrodes 111a and 111b, and the first, second and third subpixels have an area ratio of approximately one to one to one.

TFT-Ca1, TFT-Ca2, TFT-Cb1, and TFT-Cb2 are respectively provided for the electrodes 111ca1, 111ca2, 111cb1 and 111cb2 of the third subpixel SP-C. That is to say, each of the subpixel electrodes 111ca and 111cb has two TFTs and has a redundant structure. Thus, in this liquid crystal display device 500B, each of the subpixel electrodes 111a, 111b, 111ca and 111cb that are separated from each other has a redundant structure.

Also, in the liquid crystal display device 500B, the subpixel electrodes 111ca and 111cb of the respective third subpixels of two different pixels are arranged between two S bus lines that are adjacent to each other in the column direction in which different source signals are supplied, thereby preventing the S bus lines from being short-circuited with each other. In the example illustrated in FIG. 25, the source lines are branched in the liquid crystal display device 500B to make this arrangement understandable more easily. Alternatively, equivalent source signals could be supplied through the two source lines, too.

Figure 26:
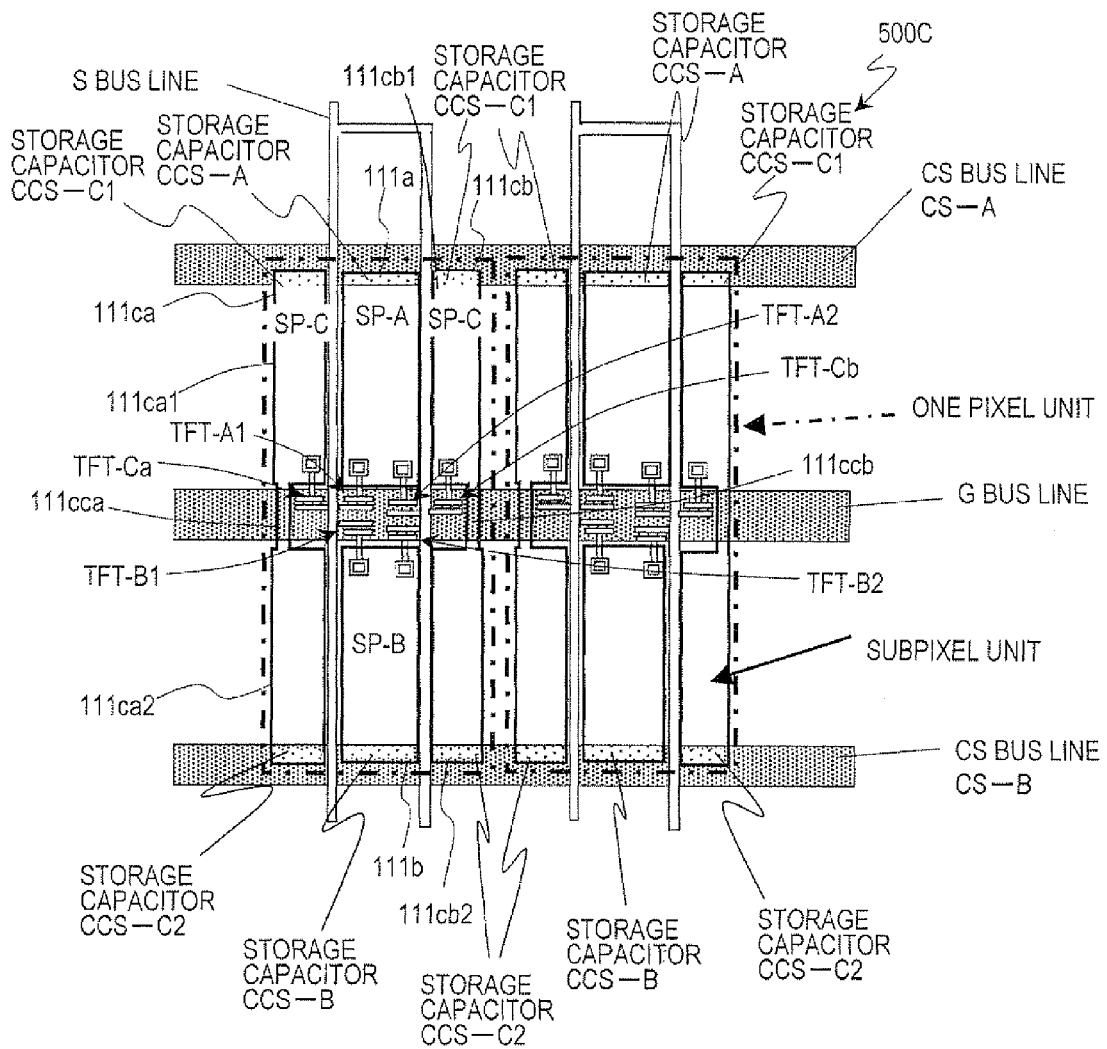
FIG. 26 is a schematic plan view illustrating the TFT substrate of a liquid crystal display device 500C as another preferred embodiment of the present invention.

FIG. 26 schematically illustrates a plan view of the TFT substrate of a liquid crystal display device 500C as another preferred embodiment of the present invention. The coupling portion 111cca that couples together the electrodes 111ca1 and 111ca2 of the subpixel electrode 111ca overlaps with the G bus line. That is why the parasitic capacitances Cgd of the subpixel electrodes 111ca and 111cb are increased. In this liquid crystal display device 500C, TFT-Ca and TFT-Cb are provided for the electrodes 111ca1 and 111cb1 of the subpixel electrodes 111ca and 111cb but no TFTs are provided for the electrodes 111ca2 and 111cb2. In this manner, in the liquid crystal display device 500C, the number of TFTs provided for the subpixel electrodes 111ca and 111cb of the third subpixel SP-C is reduced, and the area of the drain electrode of TFT-Ca, TFT-Cb associated with the subpixel electrode 111ca, 111cb is made to be smaller than the total area of the drain electrodes of the TFTs associated with the subpixel electrode 111a or 111b, thereby offsetting the increase in parasitic capacitances Cgd due to the overlap between the coupling portions 111cca and 111ccb and the G bus line. If the Cgd ratio of the subpixel electrodes 111a, 111b, 111ca and 111cb were quite different from one to one to one to one, then a feedthrough voltage would vary significantly due to the difference in Cgd ratio, thus producing a flicker. In this liquid crystal display device 500C, however, the parasitic capacitances Cgd of the subpixel electrodes 111ca and 111cb is minimized, thereby making the Cgd ratio of the subpixel electrodes 111a, 111b, 111ca and 111cb approximately one to one to one to one and suppressing the occurrence of a flicker.

In the liquid crystal display devices 500B and 500C shown in FIGS. 25 and 26, the S bus line is branched. In the liquid crystal display devices 300D, 300E and 300F shown in FIGS. 22, 23 and 24, on the other hand, the S bus line is not branched. That is why the liquid crystal display devices 300D, 300E and 300F can have a higher aperture ratio than the liquid crystal display devices 500B and 500C.

In the preferred embodiments described above, at least two of multiple subpixels (or at least some of them) are arranged in the row direction (i.e., in the x direction). However, the present invention is in no way limited to those specific preferred embodiments. Every subpixel of a pixel could be arranged in the column direction (i.e., y direction), too.

Figure 27:
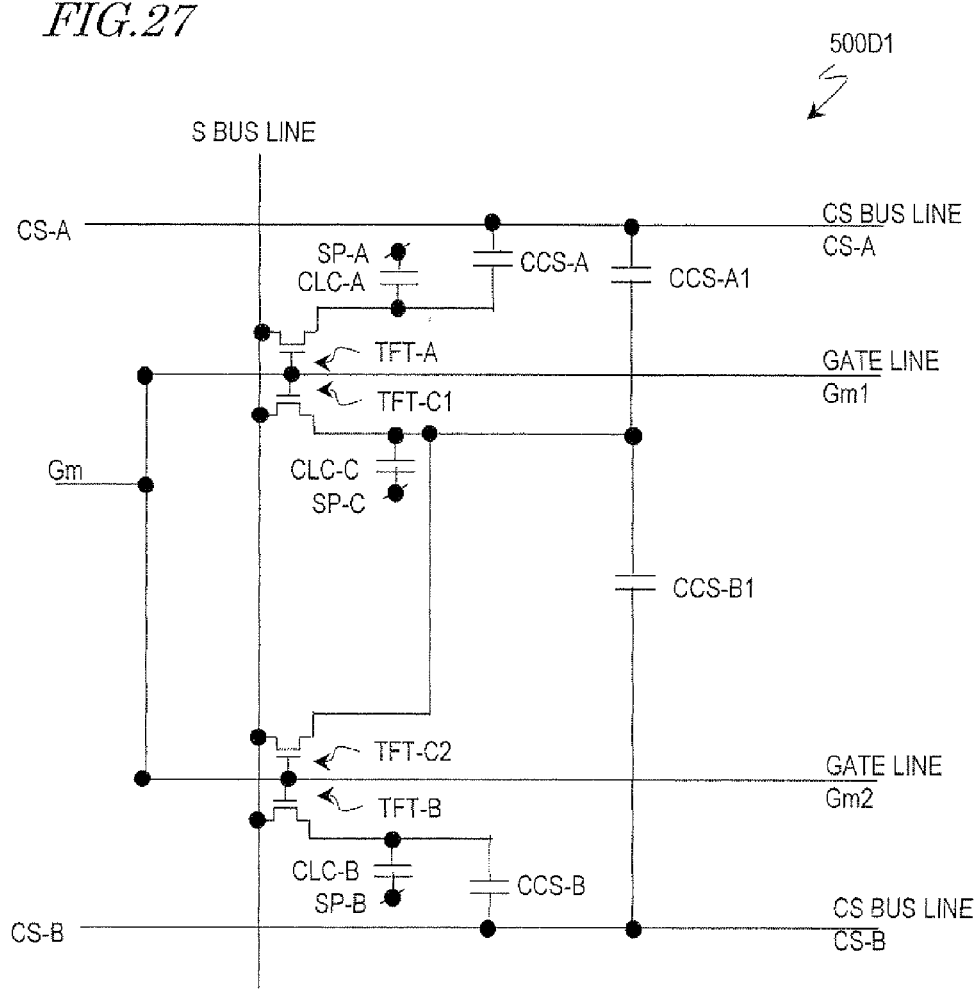
FIG. 27 schematically illustrates an equivalent circuit representing one pixel of a liquid crystal display device 500D1 as yet another preferred embodiment of the present invention.

FIG. 27 schematically illustrates an equivalent circuit of a single pixel of a liquid crystal display device 500D1. In this liquid crystal display device 500D1, each pixel includes first, second and third subpixels SP-A, SP-B and SP-C. The first and second subpixels SP-A and SP-B have TFT-A and TFT-B, respectively, while the third subpixel SP-C has two thin-film transistors TFT-C1 and TFT-C2.

The equivalent circuit illustrated in FIG. 27 is one of the pixels that form an $m^{th}$ row. The gate bus line Gm associated with the $m^{th}$ row consists of two gate lines Gm1 and Gm2, which are connected together in the liquid crystal display device. The gate line Gm1 is connected to the respective gate electrodes of TFT-A of the first subpixel. SP-A and TFT-C1 of the third subpixel SP-C. On the other hand, the gate line Gm2 is connected to the respective gate electrodes of TFT-B of the second subpixel SP-B and TFT-C2 of the third subpixel SP-C. The two thin-film transistors TFT-C1 and TFT-C2 of the third subpixel SP-C are connected to the two gate lines Gm1 and Gm2, to which equivalent gate signals are supplied, and the third subpixel SP-C has a redundant structure.

The first subpixel SP-A has a liquid crystal capacitor CLC-A, and a storage capacitor CCS-A. The second subpixel SP-B has a liquid crystal capacitor CLC-B and a storage capacitor CCS-B. And the third subpixel SP-C has a liquid crystal capacitor CLC-C and storage capacitors CCS-A1 and CCS-B1. In this case, the electrostatic capacitance value of the storage capacitor CCS-A1 is approximately equal to that of the storage capacitor CCS-B1.

Figure 28:
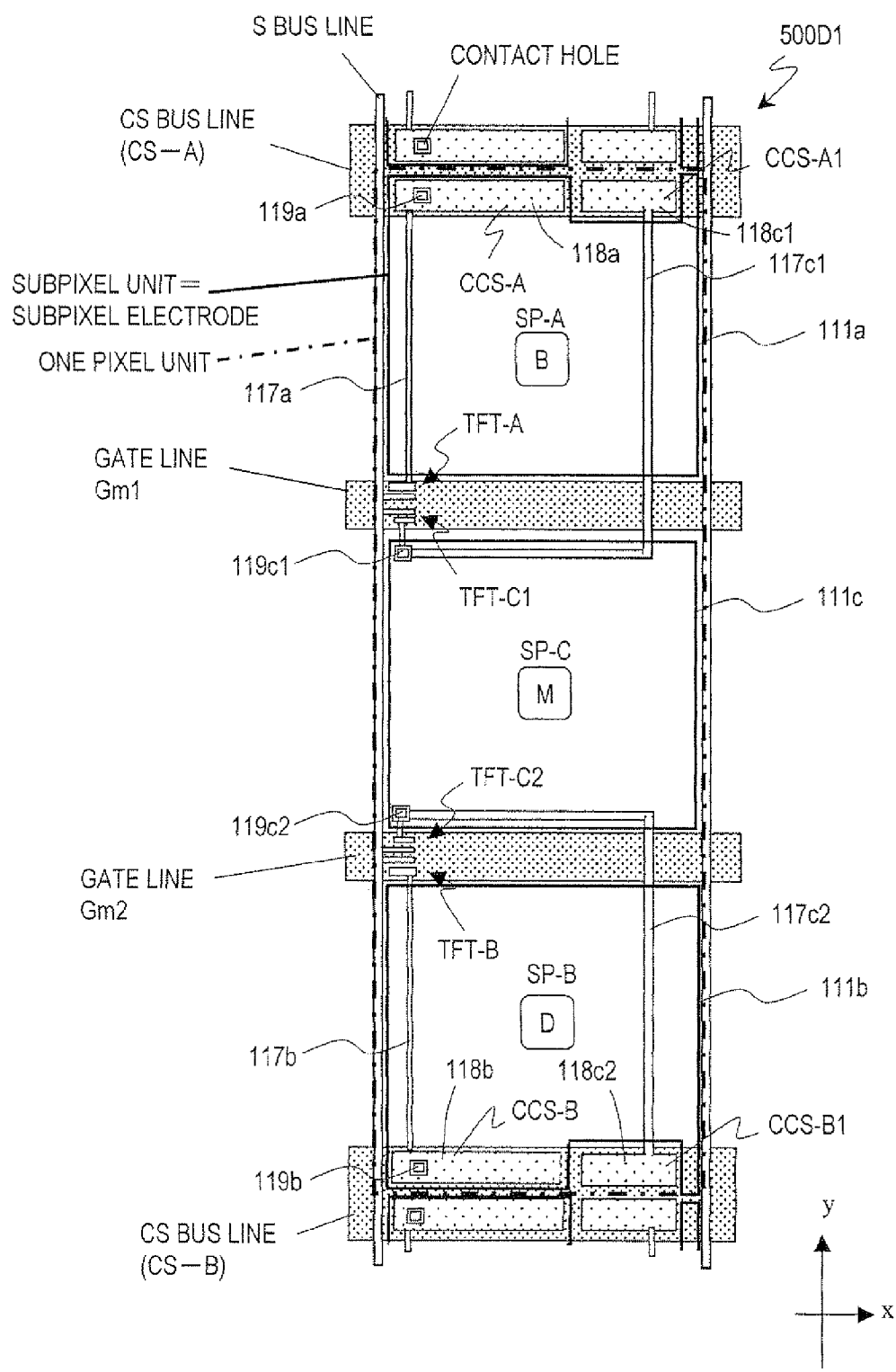
FIG. 28 schematically illustrates the structure of a pixel on the TFT substrate of a liquid crystal display device 500D1 as the preferred embodiment of the present invention.

FIG. 28 schematically illustrates a plan view of the TFT substrate of the liquid crystal display device 500D1. In this liquid crystal display device 500D1, the third subpixel SP-C is arranged between the first and second subpixels SP-A and SP-B, and the first, second and third subpixels SP-A, SP-B and SP-C are arranged in the column direction between two adjacent CS bus lines CS-A and CS-B. The first, second and third subpixels SP-A, SP-B and SP-C have an area ratio of one to one to one.

Two gate lines Gm1 and Gm2 are illustrated in FIG. 28. As shown in FIG. 27, equivalent gate signals are supplied to the gate lines Gm1 and Gm2. Also, although the number of CS bus lines (or CS lines) agrees with the number of rows of pixels, a single CS bus line causes a voltage pull-up or pull-down in the respective liquid crystal capacitors of subpixels belonging to two pixels that are adjacent to each other in the column direction. And each pixel is associated with two CS bus lines.

The drain electrodes of the two thin-film transistors TFT-C1 and TFT-C2 of the third subpixel SP-C are electrically connected to the drain extension lines 117c1 and 117c2, which run from the drain electrodes of TFT-C1 and TFT-C2 through the storage capacitor electrodes by way of contact portions 119c1 and 119c2. The drain extension lines 117c1 and 117c2 are connected to the subpixel electrode 111c at the contact portions 119c1 and 119c2. And the storage capacitor electrodes of the drain extension lines 117c1 and 117c2 and the storage capacitor counter electrodes of the CS bus lines CS-A and CS-B form respective storage capacitors. The drain extension lines 117c1 and 117c2 run in the row direction (i.e., in x direction) parallel to the G bus line, and then in the column direction (i.e., in y direction) toward the CS bus lines CS-A and CS-B, thereby shortening the drain extension lines 117c1 and 117c2 and increasing the aperture ratio of the third subpixel SP-C.

The drain extension lines 117a and 117b of the first and second subpixels SP-A and SP-B do not intersect with the G bus line, but the drain extension lines 117c1 and 117c2 of the third subpixel SP-C do intersect with the G bus line, where the parasitic capacitance Cgd of the third subpixel SP-C becomes greater than that of the first and second subpixels SP-A and SP-B. In this liquid crystal display device 500D1, however, to offset the increase in the parasitic capacitance Cgd of the third subpixel SP-C, the area of the drain electrode of TFT-A, TFT-B of the first, second subpixels SP-A, SP-B is defined to be greater than that of the drain electrode of TFT-C1, TFT-C2. As a result, the first, second and third subpixels SP-A, SP-B and SP-C can have a substantially even Cgd ratio and the feedthrough voltages of the drain voltages can be substantially equalized with each other among the subpixels, thus minimizing the decrease in display quality.

The drain extension lines 117c1 and 117c2 of the third subpixel SP-C partially overlap with the subpixel electrodes 111a and 111b of the first and second subpixels SP-A and SP-B. However, the storage capacitor electrodes that have a large area on the drain extension lines 117c1 and 117c2 are arranged so as not to overlap with the subpixel electrodes 111a and 111b. As a result, it is possible to prevent the voltages at the liquid crystal capacitors of the first and second subpixels SP-A and SP-B from varying under the influence of the third subpixel SP-C.

Parasitic capacitances Csd are produced between subpixel electrodes and S bus lines that are adjacent to each other. When a dot inversion drive is carried out, source signals with mutually different polarities are supplied to two adjacent S bus lines. In that case, by ensuring that two sides running in the column direction (i.e., in the y direction) of each of the subpixel electrodes 111a, 111b and 111c are substantially equal, the parasitic capacitances Csd between the two S bus lines and each of the subpixel electrodes can be substantially equalized. As a result, the influence of the two parasitic capacitances Csd on the voltages at the liquid crystal capacitors can be offset and the decrease in display quality can be minimized.

The storage capacitor CCS-A of the first subpixel SP-A is formed by the CS line CS-A and the storage capacitor electrode 118a. The storage capacitor CCS-B of the second subpixel SP-B is formed by the CS line CS-B and the storage capacitor electrode 118b. The storage capacitor CCS-A1 of the third subpixel SP-C is formed by the CS line CS-A and the storage capacitor electrode 118c1. And the storage capacitor CCS-B1 is formed by the CS line CS-B and the storage capacitor electrode 118c2. The storage capacitor electrodes 118a, 118b, 118c1 and 118c2 are arranged so as to overlap with the CS lines CS-A and CS-B. Also, the electrostatic capacitance value of a storage capacitor is defined by the area of its storage capacitor electrode. In this case, the storage capacitor electrodes 118a and 118b have an equal area and the storage capacitor electrodes 118c1 and 118c2 also have an equal area.

Also, in this liquid crystal display device 500D1, the two gate lines are passed between the two CS bus lines CS-A and CS-B, thereby realizing a three division structure. Furthermore, in this liquid crystal display device 500D1, each CS bus line is connected to the storage capacitors of multiple subpixels belonging to two pixels that are adjacent to each other in the column direction. And when pixels are charged, the capacitance of those adjacent pixels in the column direction will function as a smoothing capacitance. As a result, a rise in ripple voltage can be reduced, and therefore, the occurrence of a horizontal shadow can be minimized.

Figure 29:
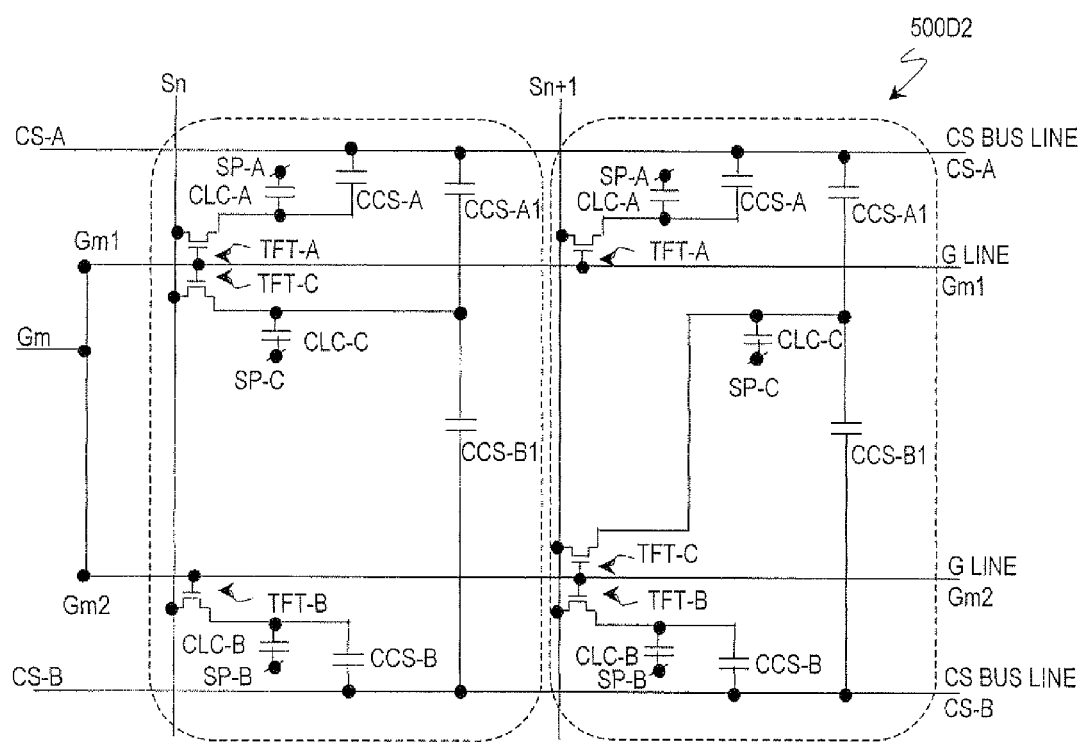
FIG. 29 schematically illustrates an equivalent circuit representing one pixel of a liquid crystal display device 500D2 as yet another preferred embodiment of the present invention.

FIG. 29 schematically illustrates an equivalent circuit of a single pixel of a liquid crystal display device 500D2. In this liquid crystal display device 500D2, each pixel has first, second and third subpixels SP-A, SP-B and SP-C, which have TFT-A, TFT-B and TFT-C, respectively.

The equivalent circuit illustrated in FIG. 29 represents a pixel at the intersection between the $m^{th}$ row and $n^{th}$ column and a pixel at the intersection between the $m^{th}$ row and $(n+1)^{th}$ column. A gate bus line Gm associated with the $m^{th}$ row includes gate lines Gm1 and Gm2, which are connected together in this liquid crystal display device. As for the pixel at the intersection between the $m^{th}$ row and $n^{th}$ column, the gate line Gm1 is connected to the respective gate electrodes of TFT-A of the first subpixel SP-A and TFT-C of the third subpixel SP-C, while the gate line Gm2 is connected to the gate electrode of TFT-B of the second subpixel SP-B. As for the pixel at the intersection between the $m^{th}$ row and $(n+1)^{th}$ column, the gate line Gm1 is connected to TFT-A of the first subpixel SP-A, while the gate line Gm2 is connected to the respective gate electrodes of TFT-B of the second subpixel SP-B and TFT-C of the third subpixel SP-C.

In each of the pixel at the intersection between the $m^{th}$ row and $n^{th}$ column and the pixel at the intersection between the $m^{th}$ row and $(n+1)^{th}$ column, the first subpixel SP-A has a liquid crystal capacitor CLC-A and a storage capacitor CCS-A, the second subpixel SP-B has a liquid crystal capacitor CLC-B and a storage capacitor CCS-B, and the third subpixel SP-C has a liquid crystal capacitor CLC-C and storage capacitors CCS-A1 and CCS-B1. In this case, the electrostatic capacitance value of the storage capacitor CCS-A1 is approximately equal to that of the storage capacitor CCS-B1.

Figure 30:
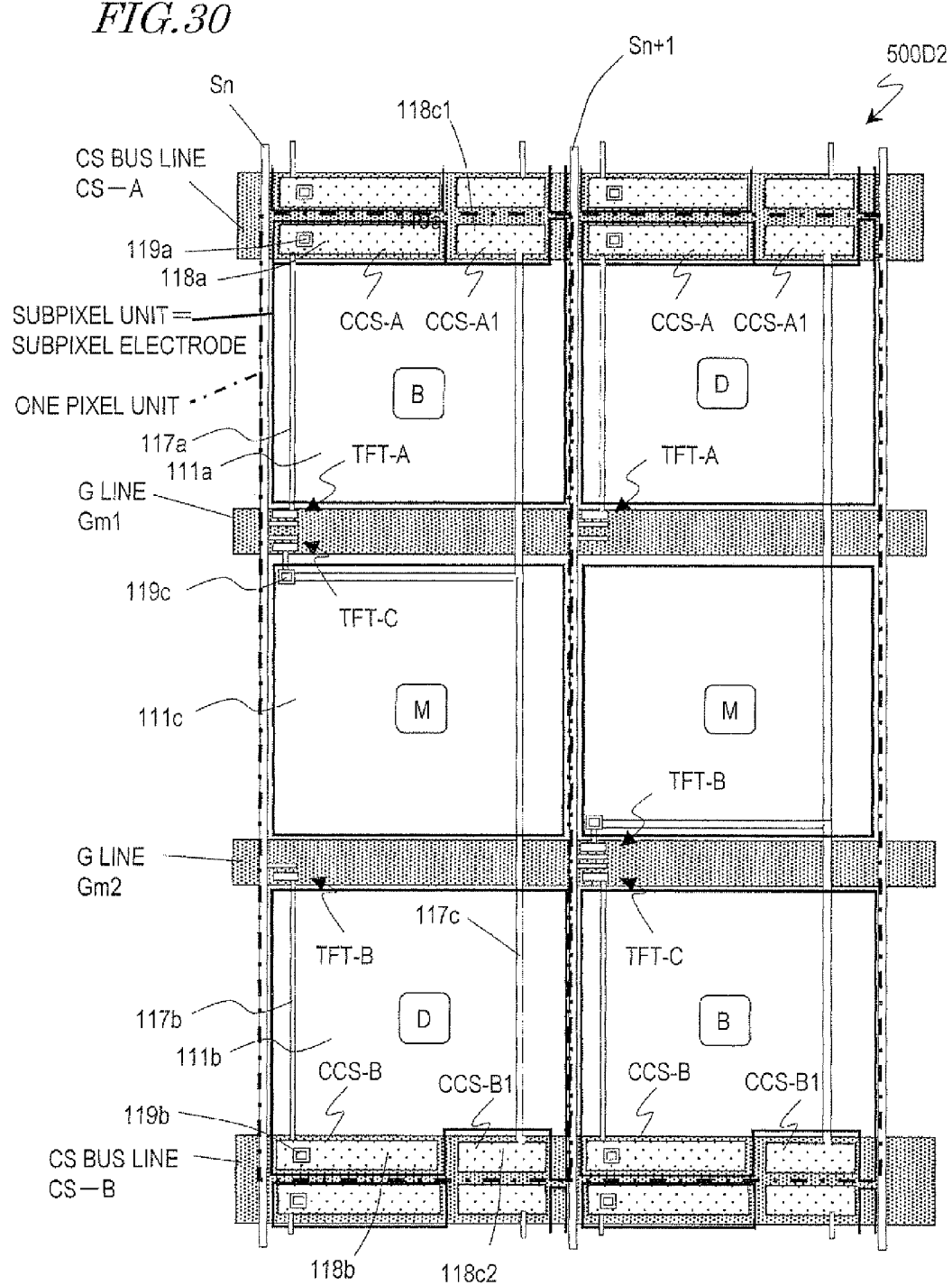
FIG. 30 schematically illustrates the structure of a pixel on the TFT substrate of the liquid crystal display device 500D2 as the preferred embodiment of the present invention.

FIG. 30 schematically illustrates a plan view of the TFT substrate of the liquid crystal display device 500D2. In this liquid crystal display device 500D2, the third subpixel SP-C is arranged between the first and second subpixels SP-A and SP-B, and the first, second and third subpixels SP-A, SP-B and SP-C are arranged in the column direction between two adjacent CS bus lines CS-A and CS-B. The first, second and third subpixels SP-A, SP-B and SP-C have an area ratio of one to one to one.

Two gate lines Gm1 and Gm2 are illustrated in FIG. 30. As shown in FIG. 29, equivalent gate signals are supplied to the gate lines Gm1 and Gm2. Also, although the number of CS bus lines (or CS lines) agrees with the number of rows of pixels, a single CS bus line causes a voltage pull-up or pull-down in the respective liquid crystal capacitors of subpixels belonging to two pixels that are adjacent to each other in the column direction. And each pixel is associated with two CS bus lines.

The drain electrode of TFT-C of the third subpixel SP-C is electrically connected to the drain extension line 117c, which runs from the drain electrodes of TFT-C through the storage capacitor electrode by way of the contact portion 119c. The drain extension line 117c is connected to the subpixel electrode 111c at the contact portion 119c. And the storage capacitor electrodes of the drain extension line 117c and the storage capacitor counter electrodes of the CS bus lines CS-A and CS-B form respective storage capacitors. The drain extension line 117c runs in the row direction (i.e., in x direction) parallel to the G bus line, and then in the column direction (i.e., in y direction) toward the CS bus lines CS-A and CS-B.

The drain extension lines 117a and 117b of the first and second subpixels SP-A and SP-B do not intersect with the gate line Gm1 or Gm2, but the drain extension line 117c of the third subpixel SP-C does intersect with the gate lines Gm1 and Gm2. The drain extension line 117c of the third subpixel SP-C partially overlaps with the subpixel electrodes 111a and 111b of the first and second subpixels SP-A and SP-B. However, the storage capacitor electrode that has a large area on the drain extension line 117c is arranged so as not to overlap with the subpixel electrodes 111a and 111b. As a result, it is possible to prevent the voltages at the liquid crystal capacitors of the first and second subpixels SP-A and SP-B from varying under the influence of the third subpixel SP-C.

Parasitic capacitances Csd are produced between subpixel electrodes and S bus lines that are adjacent to each other.

When a dot inversion drive is carried out, source signals with mutually different polarities are supplied to two adjacent S bus lines. In that case, by ensuring that two sides running in the column direction (i.e., in the y direction) of each of the subpixel electrodes 111a, 111b and 111c are substantially equal, the parasitic capacitances Csd between the two S bus lines and each of the subpixel electrodes can be substantially equalized. As a result, the influence of the two parasitic capacitances Csd on the voltages at the liquid crystal capacitors can be offset and the decrease in display quality can be minimized.

The storage capacitor CCS-A of the first subpixel SP-A is formed by the CS line CS-A and the storage capacitor electrode 118a. The storage capacitor CCS-B of the second subpixel SP-B is formed by the CS line CS-B and the storage capacitor electrode 118b. The storage capacitor CCS-A1 of the third subpixel SP-C is formed by the CS line CS-A and the storage capacitor electrode 118c1. And the storage capacitor CCS-B1 is formed by the CS line CS-B and the storage capacitor electrode 118c2. The storage capacitor electrodes 118a, 118b, 118c1 and 118c2 are arranged so as to overlap with the CS lines CS-A and CS-B. Also, the electrostatic capacitance value of a storage capacitor is defined by the area of its storage capacitor electrode. In this case, the storage capacitor electrodes 118a and 118b have an equal area and the storage capacitor electrodes 118c1 and 118c2 also have an equal area.

In each pixel, the first, third and second subpixels SP-A, SP-C and SP-B are arranged in this order in the column direction. If a dot inversion drive is carried out and if the first, third and second subpixels SP-A, SP-C and SP-B of a pixel at the intersection between the $m^{th}$ row and $n^{th}$ column are a bright subpixel, a moderate subpixel and a dark subpixel, respectively, then the first, third and second subpixels SP-A, SP-C and SP-B of a pixel at the intersection between the $m^{th}$ row and $(n+1)^{th}$ column are a dark subpixel, a moderate subpixel and a bright subpixel, respectively.

Unlike the liquid crystal display device 500D1 shown in FIGS. 27 and 28, the third subpixel SP-C has only one TFT-C in this liquid crystal display device 500D2, thus reducing the load on the G bus line. In the pixel at the intersection between the mth row and nth column, the gate electrode of TFT-C is connected to the gate line Gm1. In the pixel at the intersection between the mth row and (n+1)th column, on the other hand, the gate electrode of TFT-C is connected to the gate line Gm2. In this manner, if the gate lines to which the gate electrodes of TFTs-C of the respective third subpixels are connected are changed alternately every adjacent pixel in the row direction, the loads on the gate lines Gm1 and Gm2 can be substantially equalized with each other. However, the gate lines to which the gate electrodes of TFTs-C of the respective third subpixels are connected do not have to be changed every adjacent pixel in the row direction. Alternatively, the same number of TFTs-C of the respective third subpixels may be connected to one of the two gate lines Gm1 and Gm2 after another every predetermined number of pixels that are adjacent to each other in the row direction. However, if the predetermined number of pixels, of which the gate electrodes of TFTs-C of the respective third subpixels are connected to the same gate line, were huge (e.g., several hundred), then pulses of the gate signal would lose its sharpness and the pixels could be charged at significantly different rates.

Also, in the liquid crystal display devices 500D1 and 500D2, the two gate lines are passed between the two CS bus lines CS-A and CS-B, thereby realizing a three division structure. Furthermore, in the liquid crystal display devices 500D1 and 500D2, each CS bus line is connected to the storage capacitors of multiple subpixels belonging to two pixels that are adjacent to each other in the column direction. And when pixels are charged, the capacitance of those adjacent pixels in the column direction will function as a smoothing capacitance. As a result, a rise in ripple voltage can be reduced, and therefore, the occurrence of a horizontal shadow can be minimized.

In the liquid crystal display devices 500D1 and 500D2 shown in FIGS. 27 through 30, two gate lines pass through each pixel. However, the present invention is in no way limited to those specific preferred embodiments. Only one gate line may pass through each pixel.

Figure 31:
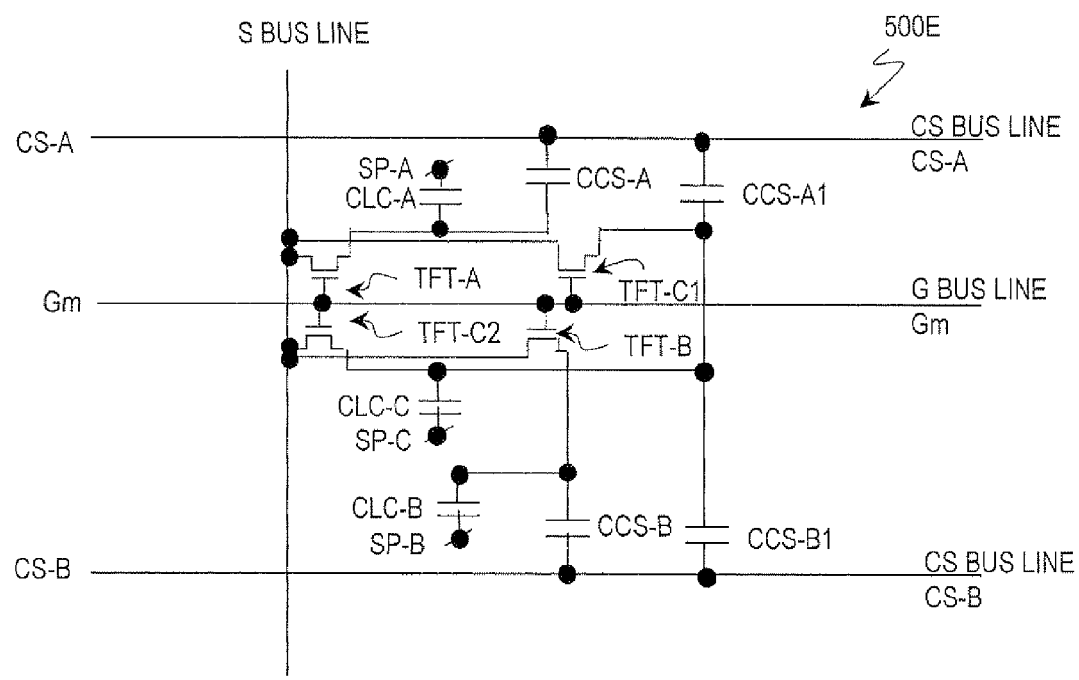
FIG. 31 schematically illustrates an equivalent circuit representing one pixel of a liquid crystal display device 500E as yet another preferred embodiment of the present invention.
Figure 32:
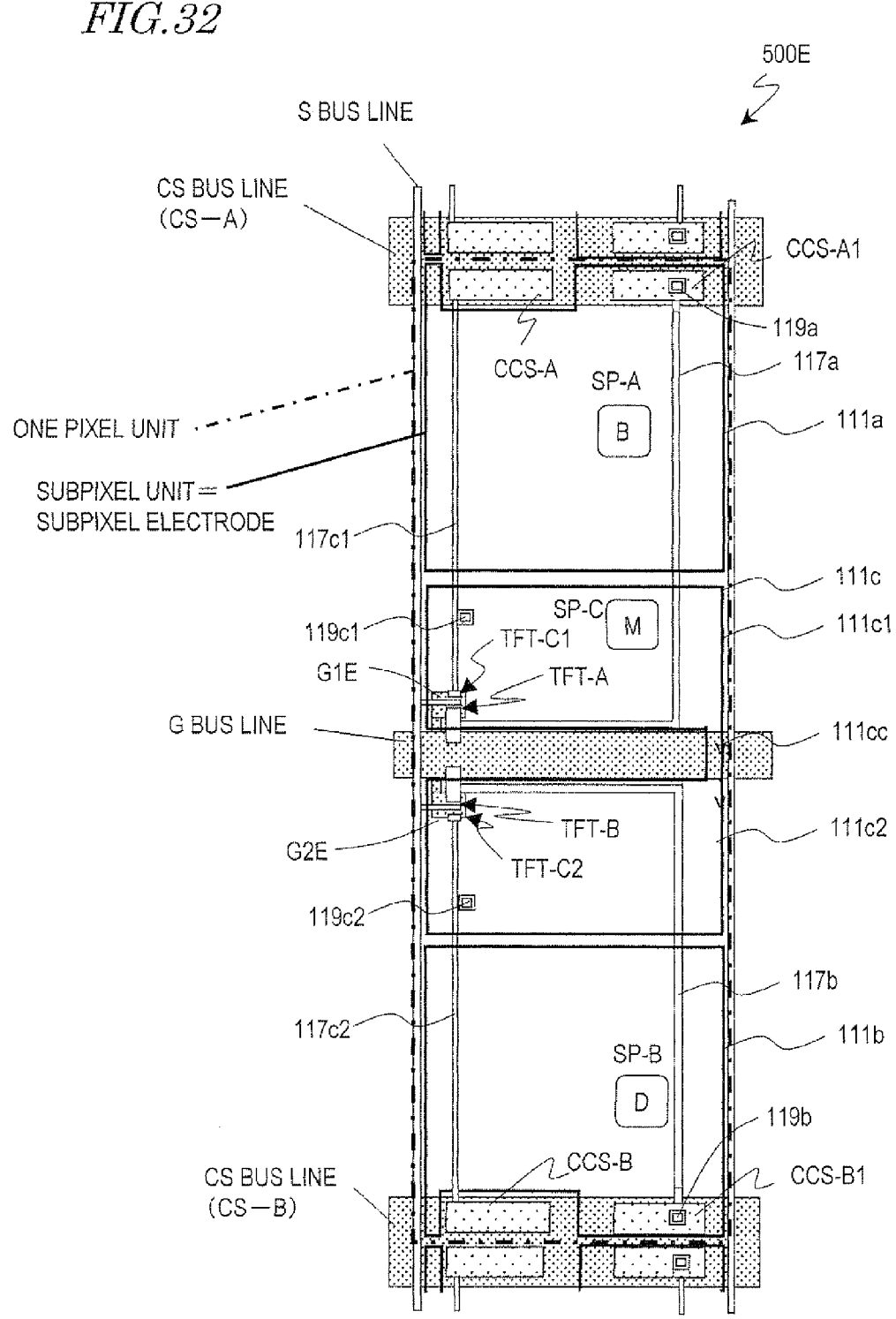
FIG. 32 schematically illustrates the structure of a pixel on the TFT substrate of a liquid crystal display device 500E as the preferred embodiment of the present invention.

FIGS. 31 and 32 schematically illustrate a plan view of the TFT substrate of a liquid crystal display device 500E. In this liquid crystal display device 500E, each pixel also has first, second and third subpixels SP-A, SP-B and SP-C, which have an area ratio of approximately one to one to one.

The first, second and third subpixels SP-A, SP-B and SP-C are arranged in the column direction (i.e., y direction) between the two CS bus lines CS-A and CS-B. Also, each CS bus line CS-A, CS-B is connected to the storage capacitors of multiple subpixels belonging to two pixels that are adjacent to each other in the column direction. As a result, the occurrence of a horizontal shadow can be minimized.

The first and second subpixels SP-A and SP-B include TFT-A and TFT-B, respectively, while the third subpixel SP-C includes TFT-C1 and TFT-C2. The gate electrodes of TFT-A, TFT-B, TFT-C1 and TFT-C2 are connected to the G bus line, and the third subpixel SP-C has a redundant structure.

The respective gate electrodes of TFT-A and TFT-C1 are integrated together to form a gate electrode section G1E. Likewise, the respective gate electrodes of TFT-B and TFT-C2 are also integrated together to form a gate electrode section G2E. These gate electrode sections G1E and G2E are arranged in L shape and connected to a G bus line running in the row direction (i.e., x direction). The respective drain electrodes of TFT-A and TFT-B overlap with not only the gate electrode sections G1E and G2E but also the G bus line. That is why even if the drain electrodes of TFT-A and TFT-B have been misaligned to a certain degree in the column direction (i.e., y direction) with respect to the gate electrode sections G1E and G2E, the variation in parasitic capacitance Cgd can still be minimized.

The third subpixel SP-C straddles the G bus line that runs in the row direction (i.e., in x direction). The subpixel electrode 111c of the third subpixel SP-C includes an electrode 111c1 that is arranged in the +y direction with respect to the G bus line, an electrode 111c2 that is arranged in the −y direction with respect to the G bus line, and a coupling portion 111cc that couples these two electrodes 111c1 and 111c2 together. When measured in the row direction (i.e., x direction), the coupling portion 111cc is shorter than the electrodes 111c1 and 111c2. As a result, the increase in parasitic capacitance Cgd can be suppressed.

The subpixel electrodes 111a and 111b of the first and second subpixels SP-A and SP-B and the drain extension lines 117a and 117b do not overlap with the G bus line, but the coupling portion 111cc of the subpixel electrode 111c of the third subpixel SP-C does overlap with the G bus line. Thus, the parasitic capacitance Cgd of the third subpixel SP-C has increased. That is why the drain electrode of TFT-A and TFT-B of the first and second subpixels SP-A and SP-B is designed to have a greater area than that of TFT-C1 and TFT-C2 of the third subpixel SP-C. Also, the respective drain electrodes of TFT-A and TFT-B of the first and second subpixels SP-A and SP-B are arranged so as to overlap with not only the gate electrode sections G1E and G2E but also the G bus line, thereby increasing the parasitic capacitances Cgd of the first and second subpixels SP-A and SP-B. As a result, the Cgd ratio of the first, second and third subpixels SP-A, SP-B and SP-C can be adjusted easily, the feedthrough voltages of the drain voltages can be substantially equalized with each other, and the decrease in display quality can be minimized.

The drain extension lines 117c1 and 117c2 electrically connect the respective drain electrodes of TFT-C1 and TFT-C2 of the third subpixel to the subpixel electrode 111c at the contact portions 119c1 and 119c2, respectively. Also, the storage capacitor electrodes of the drain extension lines 117c1 and 117c2 and the CS bus line CS-A and CS-B together form two storage capacitors. The subpixel electrodes 111a and 111b of the first and second subpixels SP-A and SP-B are arranged so as not to overlap with a region where the drain extension lines 117c1 and 117c2 overlap with the CS bus lines CS-A and CS-B. As a result, it is possible to prevent the voltages at the liquid crystal capacitors of the first and second subpixels SP-A and SP-B from being affected by the third subpixel SP-C.

The coupling portion 111cc of the subpixel electrode 111c overlaps with the G bus line. To prevent these members from being short-circuited with each other, an interlayer insulating film of an organic material with a thickness of approximately 2-3 μm is provided between them. By providing such a relatively thick interlayer insulating film, the increase in parasitic capacitance Cgd can be suppressed. It is naturally possible to provide a thick interlayer insulating film made of an inorganic material such as $SiN_x$. However, an organic film could be formed by a coating process thicker than an inorganic film to be easily formed by a vapor phase epitaxy, for example.

The S bus line runs in the column direction (i.e., y direction) and two sides of the subpixel electrodes 111a and 111b have an equal length as measured in the column direction (y direction). As a result, the influence of the parasitic capacitances Csd produced between each of the subpixel electrodes 111a, 111b and the S bus lines on the liquid crystal capacitors of the first and second subpixels SP-A and SP-E can be offset and the decrease in display quality can be minimized as described above. In the example illustrated in FIG. 32, the coupling portion 111cc of the subpixel electrode 111c is arranged in the vicinity of one of the two adjacent S bus lines. However, the coupling portion 111cc could be arranged at an intermediate position between the two S bus lines, too. In that case, since there is a longer distance from the coupling portion 111c to each S bus line, the increase in the storage capacitances Csd produced by the coupling portion 111cc and the S bus lines can be suppressed and the parasitic capacitances Csd of the S bus lines and the subpixel SP-C can be substantially equalized with each other.

In the liquid crystal display devices of the preferred embodiments described above, each G bus line consists of only one gate line and each CS bus line consists of only one CS line. However, the present invention is in no way limited to those specific preferred embodiments.

Figure 33:
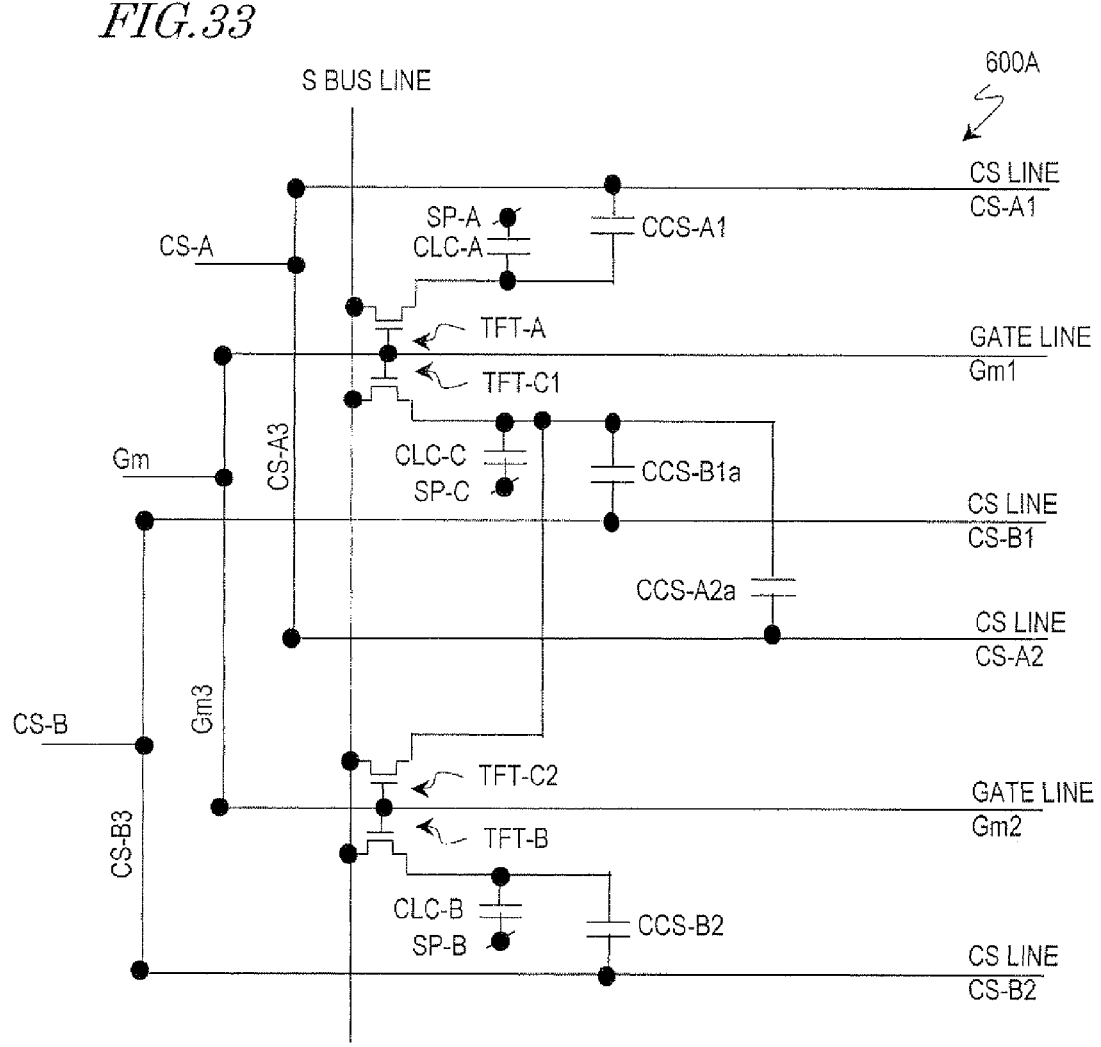
FIG. 33 schematically illustrates an equivalent circuit representing one pixel of a liquid crystal display device 600A as yet another preferred embodiment of the present invention.

FIG. 33 schematically illustrates an equivalent circuit of a single pixel of a liquid crystal display device 600A as another preferred embodiment of the present invention. Each pixel of the liquid crystal display device 600A includes first, second and third subpixels SP-A, SP-B and SP-C and is associated with one G bus line, one S bus line and two CS bus lines.

One of the pixels that form an $m^{th}$ row is illustrated in FIG. 33. The G bus line Gm associated with the $m^{th}$ row includes gate lines Gm1, Gm2 and an interconnect Gm3 that is connected to these gate lines Gm1 and Gm2. Equivalent gate signals are supplied to these gate lines Gm1 and Gm2.

The CS bus line CS-A includes CS lines CS-A1, CS-A2 and an interconnect CS-A3 that is connected to these CS lines CS-A1 and CS-A2. Equivalent CS signals are supplied to these CS lines CS-A1 and CS-A2. Likewise, the CS bus line CS-B includes CS lines CS-131, CS-B2 and an interconnect CS-B3 that is connected to these CS lines CS-B1 and CS-B2. Equivalent CS signals are supplied to these CS lines CS-B1 and CS-B2.

The first and second subpixels SP-A and SP-B include TFT-A and TFT-B, respectively, while the third subpixel SP-C includes TFT-C1 and TFT-C2. The gate electrodes of TFT-C1 and TFT-C2 are connected to the gate lines Gm1 and Gm2 to which the gate signal is supplied, and the third subpixel SP-C has a redundant structure.

The first subpixel SP-A has a liquid crystal capacitor CLC-A and a storage capacitor CCS-A1. The second subpixel SP-B has a liquid crystal capacitor CLC-B and a storage capacitor CCS-B2. And the third subpixel SP-C has a liquid crystal capacitor CLC-C and storage capacitors CCS-A2*a* and CCS-B1*a*. In this case, the electrostatic capacitance value of the storage capacitor CCS-A2*a* is approximately equal to that of the storage capacitor CCS-B1*a*.

The liquid crystal capacitor CLC-A of the first subpixel SP-A is subjected to a voltage pull-up (or pull-down) by the CS line CS-A1. The liquid crystal capacitor CLC-B of the second subpixel SP-B is subjected to a voltage pull-down (or pull-up) by the CS line CS-B2. And the liquid crystal capacitor CLC-C of the third subpixel SP-C is subjected to both a voltage pull-up (or pull-down) by the CS line CS-A2 and a voltage pull-down (or pull-up) by the CS line CS-B1. As a result, if the first subpixel becomes a bright subpixel, the second and third subpixels become a dark subpixel and a moderate subpixel, respectively.

Figure 34:
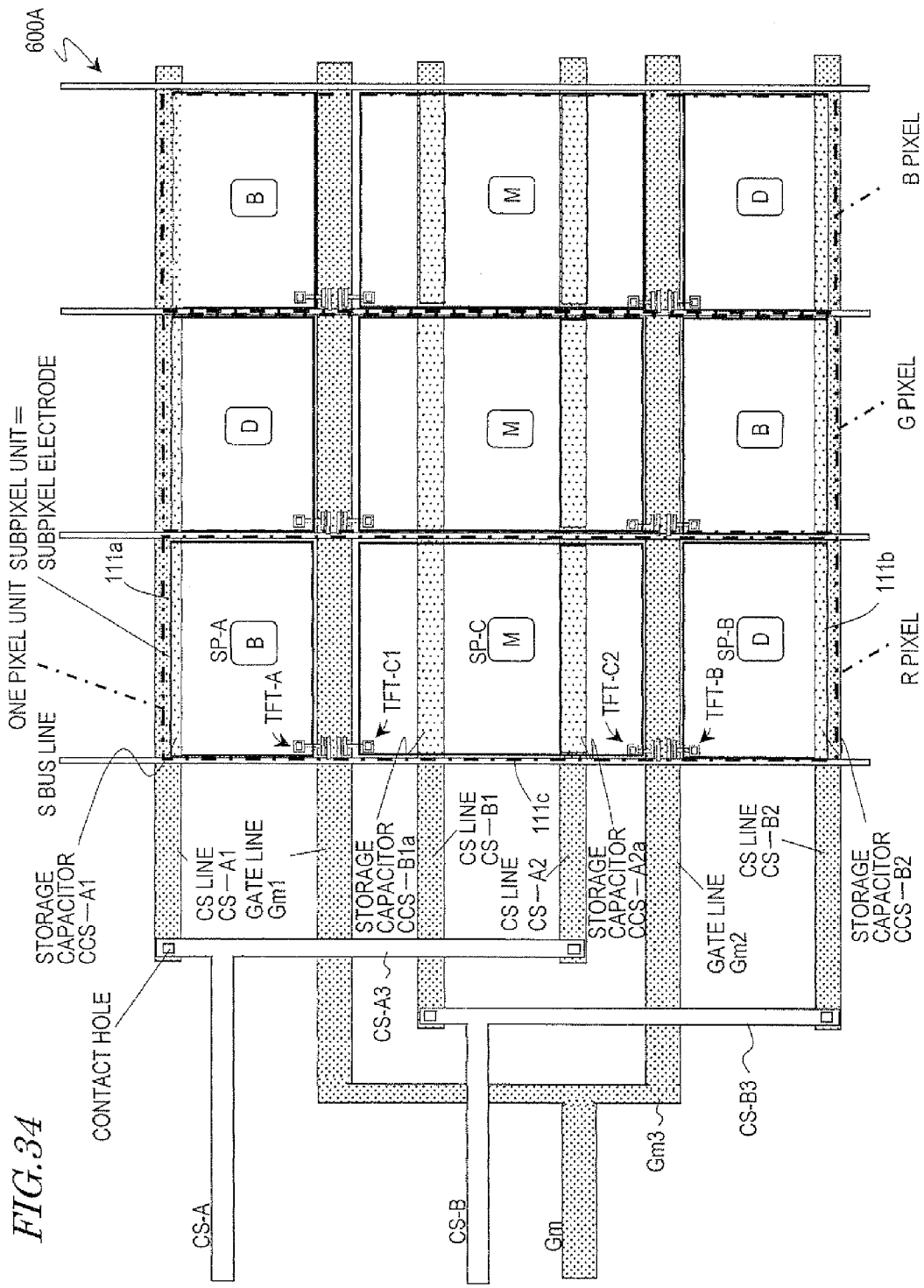
FIG. 34 schematically illustrates the structure on the TFT substrate of the liquid crystal, display device 600A as yet another preferred embodiment of the present invention.

FIG. 34 schematically illustrates a plan view of the TFT substrate of a liquid crystal display device 600A. In FIG. 34, illustrated are R, G and B pixels that represent the colors red, green and blue, respectively, and that are arranged in the row direction (i.e., x direction).

The CS lines CS-A1, CS-A2, CS-B1 and CS-B2 are formed in the same manufacturing process step as the G bus lines. Thus, the G bus lines and the CS lines CS-A1, CS-A2, CS-B1 and CS-B2 will be collectively referred to herein as "gate metal" or "gate layer". Meanwhile, the interconnects CS-A3 and CS-B3 are formed in the same manufacturing process step as the S bus lines. Thus, the S bus lines and the interconnects CS-A3 and CS-B3 will be collectively referred to herein as "source metal (source layer)". An insulating layer is interposed between the gate metal and the source metal. The interconnect CS-A3 connects together the CS lines CS-A1 and CS-A2 through a contact hole, while the interconnect CS-B3 connects together the CS lines CS-B1 and CS-B2 through a contact hole.

Look at the gate layer, and it can be seen that in the column direction (y direction), the CS line CS-A1, gate line Gm1, CS lines CS-B1, CS-A2, gate line Gm2, and CS line CS-B2 are arranged in this order. The CS lines CS-A1 and CS-A2 are arranged so as to interpose the gate line Gm1 between them. Likewise, the CS lines CS-B1 and CS-B2 are arranged so as to interpose the gate line Gm2 between them. The CS bus lines CS-A and CS-B have interconnects CS-A3 and CS-B3, respectively, which are formed in the same manufacturing process step as the S bus lines. Thus, the CS bus lines CS-A and CS-B can be formed without short-circuiting the G bus line Gm with the CS bus lines CS-A and CS-B.

Furthermore, since the third subpixel SP-C is arranged at the center of each pixel, the third subpixel SP-C and the CS lines CS-A2 and CS-B1, to which CS signals with mutually different phases are supplied, can form storage capacitor more easily. In addition, the drain extension lines can be shortened and the decrease in aperture ratio can be suppressed.

The third subpixel SP-C includes TFT-C1 and TFT-C2 that are respectively connected to the gate lines Gm1 and Gm2, to which equivalent gate signals are supplied, and therefore, has a redundant structure. The subpixel electrode 111*c* of the third subpixel SP-C is arranged between the gate lines Gm1 and Gm2. FIG. 34 illustrates the subpixel electrode 111*c* of the third subpixel SP-C and the CS lines CS-A2 and CS-B1 so as to allow the reader to understand how they overlap with each other. However, as already described with reference to FIGS. 16 and 17, considering the viewing angle dependence of the γ characteristic, the bright, moderate and dark subpixels preferably have an area ratio of one to one to one. Also, the liquid crystal display device 600A performs a dot inversion drive, and therefore, when viewed in the row direction, a dark subpixel is arranged next to a bright subpixel and a moderate subpixel is arranged adjacent to another moderate subpixel.

In the liquid crystal display devices of the preferred embodiments described above, each pixel is supposed to have three subpixels. However, the present invention is in no way limited to those specific preferred embodiments. Each pixel may also have four or more subpixels.

Figure 35:
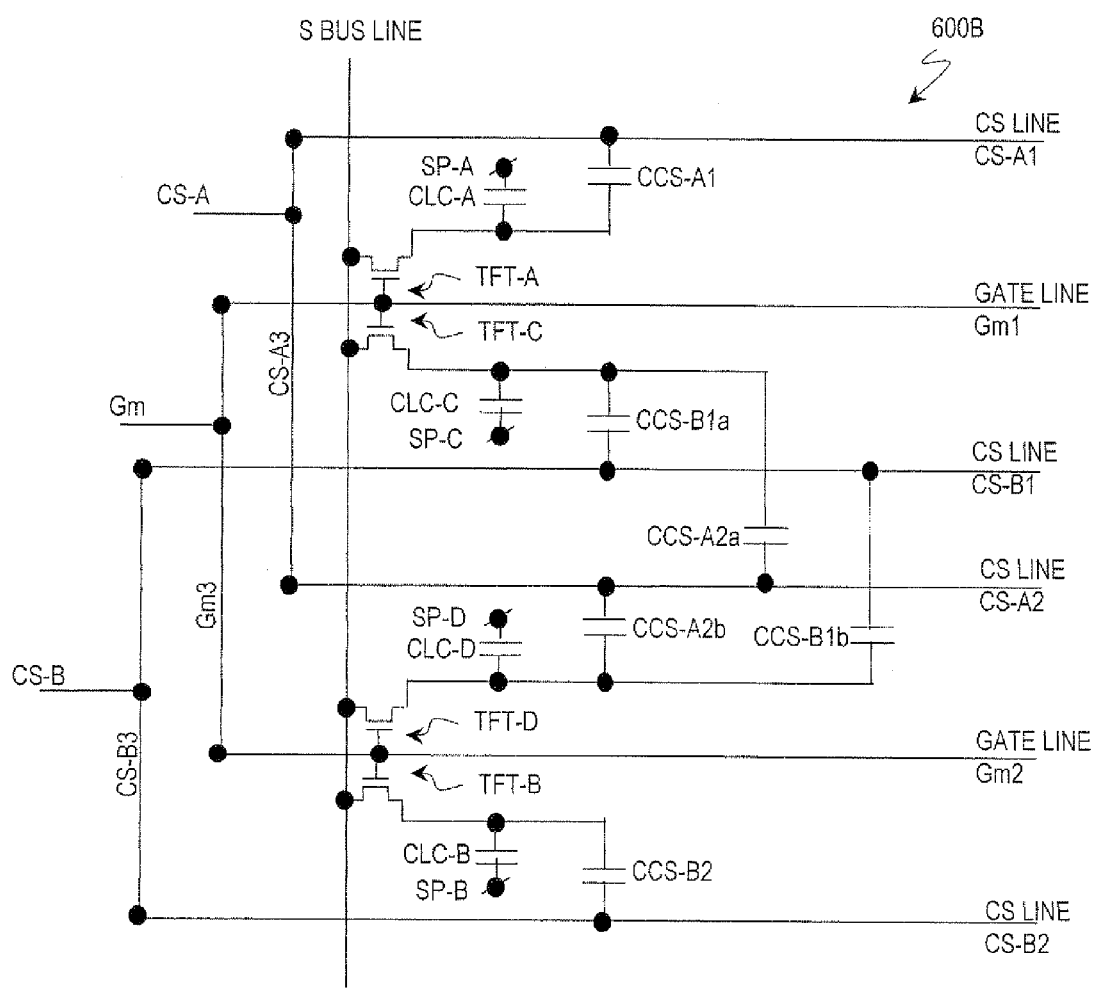
FIG. 35 schematically illustrates an equivalent circuit representing one pixel of a liquid crystal display device 600B as yet another preferred embodiment of the present invention.

FIG. 35 schematically illustrates an equivalent circuit of a single pixel of a liquid crystal display device 600B as another preferred embodiment of the present invention. Each pixel of the liquid crystal display device 600B includes first, second, third and fourth subpixels SP-A, SP-B, SP-C and SP-D.

One of the pixels that form an $m^{th}$ row is illustrated in FIG. 35. The G bus line Gm associated with the $m^{th}$ row includes gate lines Gm1, Gm2 and an interconnect Gm3 that is connected to these gate lines Gm1 and Gm2. Equivalent gate signals are supplied to these gate lines Gm1 and Gm2.

The CS bus line CS-A includes CS lines CS-A1, CS-A2 and an interconnect CS-A3 that is connected to these CS lines CS-A1 and CS-A2. Equivalent CS signals are supplied to these CS lines CS-A1 and CS-A2. Likewise, the CS bus line CS-B includes CS lines CS-B1, CS-B2 and an interconnect CS-B3 that is connected to these CS lines CS-B1 and CS-B2. Equivalent CS signals are supplied to these CS lines CS-81 and CS-B2. The first subpixel SP-A has a liquid crystal capacitor CLC-A and a storage capacitor CCS-A1. The second subpixel SP-B has a liquid crystal capacitor CLC-B and a storage capacitor CCS-B2. The third subpixel SP-C has a liquid crystal capacitor CLC-C and storage capacitors CCS-A2*a* and CCS-B1*a*. And the fourth subpixel SP-D has a liquid crystal capacitor CLC-D and storage capacitors CCS-A2*b* and CCS-B1*b*.

The liquid crystal capacitor of the first subpixel SP-A is subjected to a voltage pull-up (or pull-down) by the CS line CS-A. That of the second subpixel SP-B is subjected to a voltage pull-down (or pull-up) by the CS line CS-B. And the liquid crystal capacitors of the third and fourth subpixels SP-C and SP-D are subjected to both a voltage pull-up (or pull-down) by the CS line CS-A and a voltage pull-down (or pull-up) by the CS line CS-B. In this case, the liquid crystal capacitor of the third subpixel SP-C is affected by the voltage pull-up (or pull-down) by the CS bus line CS-A more significantly than by the voltage pull-down (or pull-up) by the CS bus line CS-B. Meanwhile, the liquid crystal capacitor of the fourth subpixel SP-D is affected by the voltage pull-down (or pull-up) by the CS bus line CS-B more significantly than by the voltage pull-up (or pull-down) by the CS bus line CS-A.

As can be seen, the liquid crystal display device 600B has a four division (4VT) structure. It should be noted that if the difference between the storage capacitors CCS-B1a and CCS-A2a of the third subpixel SP-C is approximately equal to the difference between the storage capacitors CCS-B1b and CCS-A2b of the fourth subpixel SP-D, then the liquid crystal capacitor CLC-C of the third subpixel SP-C gets equal to the liquid crystal capacitor CLC-D of the fourth subpixel SP-D. As a result, the liquid crystal display device 600B conducts a display operation in the same way as a liquid crystal display device with a 3VT structure.

Figure 36:
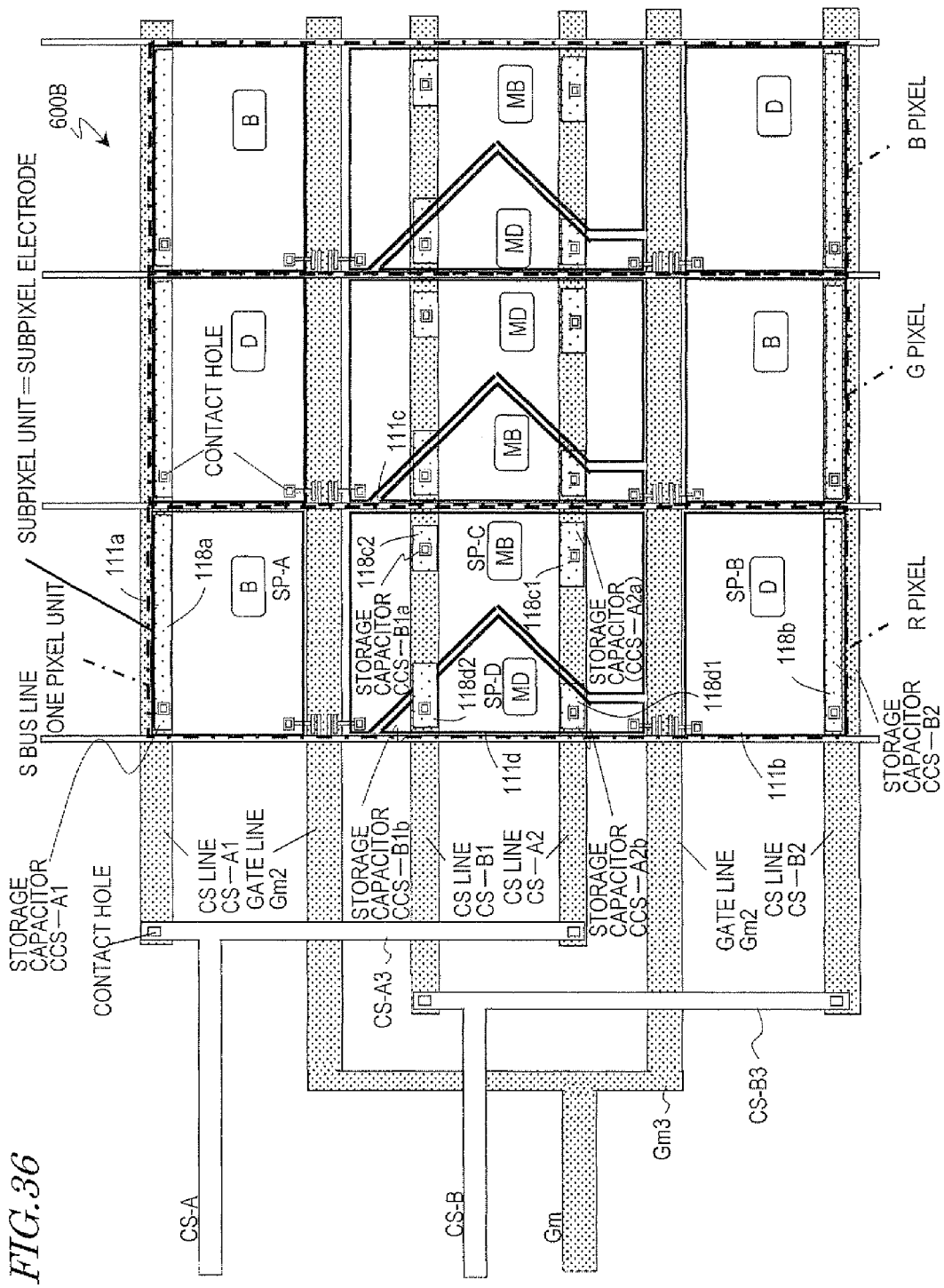
FIG. 36 schematically illustrates the structure on the TFT substrate of a liquid crystal display device 600B as yet another preferred embodiment of the present invention.

FIG. 36 schematically illustrates a plan view of the TFT substrate of a liquid crystal display device 600B. The third and fourth subpixels SP-C and SP-D of the liquid crystal display device 600B are arranged at a position corresponding to that of the third subpixel SP-C of the liquid crystal display device 600A shown in FIG. 34. The boundaries between the subpixel electrodes 111c and 111d of the third and fourth subpixels SP-C and SP-D face at least two different directions and serve as slits that align the liquid crystal molecules.

The storage capacitor CCS-A1 of the first subpixel SP-A is formed by a CS line CS-A1 and a storage capacitor electrode 118a. The storage capacitor CCS-B2 of the second subpixel SP-B is formed by a CS line CS-B2 and a storage capacitor electrode 118b. The storage capacitor CCS-A2a of the third subpixel SP-C is formed by a CS line CS-A2 and a storage capacitor electrode 118c1. The storage capacitor CCS-B1a thereof is formed by a CS line CS-B1 and a storage capacitor electrode 118c2. The storage capacitor CCS-A2b of the fourth subpixel SP-D is formed by a CS line CS-A2 and a storage capacitor electrode 118d1. The storage capacitor CCS-B1b thereof is formed by a CS line CS-B1 and a storage capacitor electrode 118d2.

The storage capacitor electrodes 118a, 118b, 118c1, 118c2, 118d1 and 118d2 are arranged so as to overlap with the CS lines CS-A1, CS-A2, CS-B1 and CS-B2 and have their electrostatic capacitance values defined by their areas in this example. The storage capacitor electrodes 118a, 118b, 118c1, 118c2, 118d1 and 118d2 are formed in the same manufacturing process step as the S bus lines.

Look at the third subpixel SP-C, and it can be seen that the storage capacitor electrode 118c1 has a greater area than the storage capacitor electrode 118c2 and that the storage capacitor CCS-A2a has a greater electrostatic capacitance value than the storage capacitor CCS-B1a. Look at the fourth subpixel SP-D, and it can be seen that the storage capacitor electrode 118d2 has a greater area than the storage capacitor electrode 118d1 and that the storage capacitor CCS-B1b has a greater electrostatic capacitance value than the storage capacitor CCS-A2b. Consequently, if the first and second subpixels become a bright subpixel and a dark subpixel, respectively, the third and fourth subpixel will be a moderately bright subpixel and a moderately dark subpixel, respectively. As used herein, the second brightest one of the four subpixels will be referred to herein as a "moderately bright subpixel" and the second darkest one of the four subpixels (i.e., the third brightest subpixel) will be referred to herein as a "moderately dark subpixel". Also, this liquid crystal display device 600B performs a dot inversion drive operation. Thus, a subpixel that is adjacent to a bright subpixel in the row direction becomes a dark subpixel, and a subpixel that is adjacent to a moderately bright subpixel in the row direction becomes a moderately dark subpixel.

In the preferred embodiments described above, each CS bus line is supposed to have two CS lines. However, the present invention is in no way limited to those specific preferred embodiments.

Figure 37:
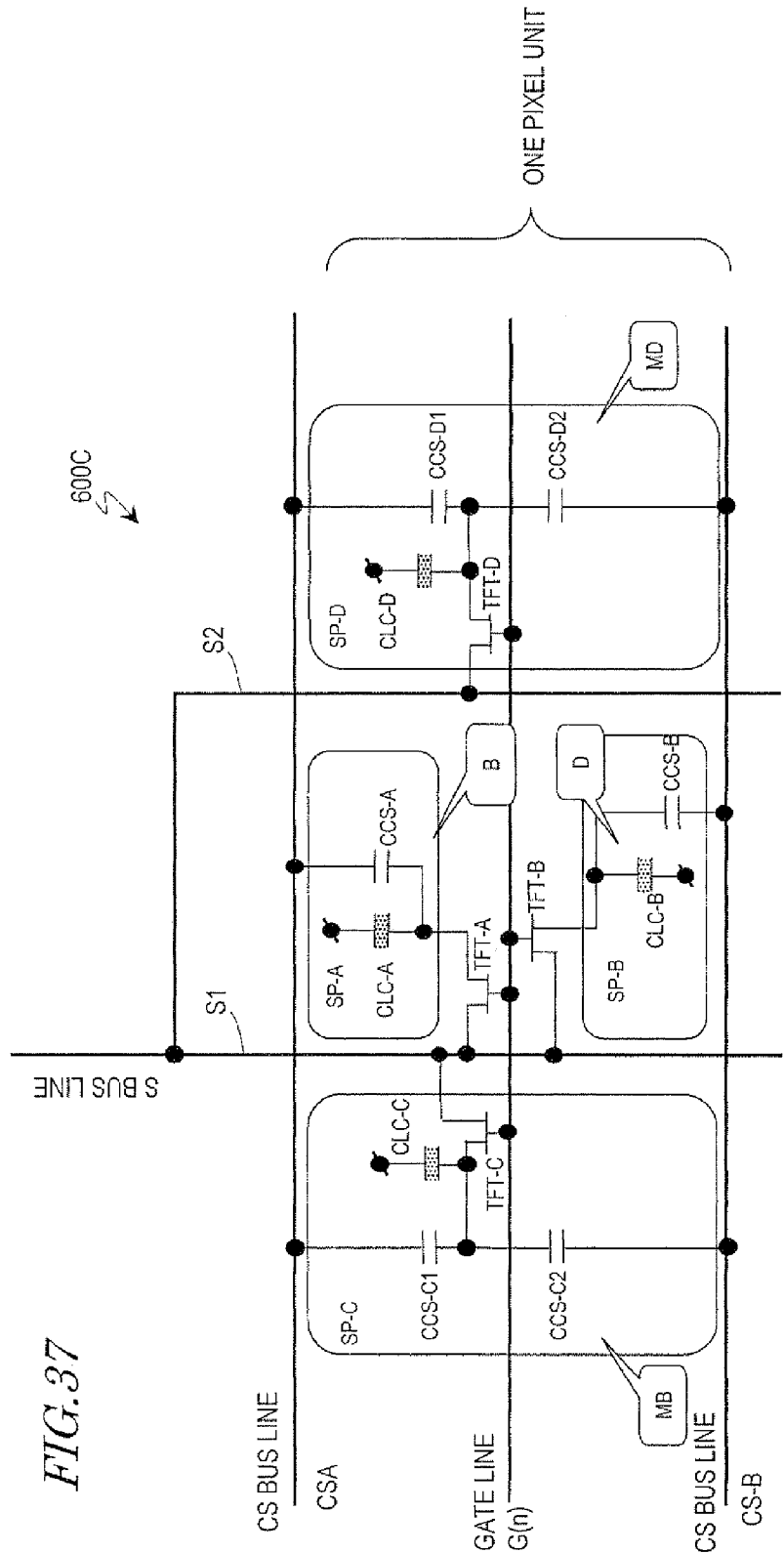
FIG. 37 schematically illustrates an equivalent circuit representing one pixel of a liquid crystal display device 600C as yet another preferred embodiment of the present invention.

FIG. 37 schematically illustrates an equivalent circuit representing a single pixel of a liquid crystal display device 600C as another preferred embodiment of the present invention. The S bus line includes a first source line S1 and a second source line S2 branched from the first source line S1. The first source line S1 is connected to the respective source electrodes of TFT-A, TFT-B and TFT-C of the first, second and third subpixels SP-A, SP-B and SP-C. On the other hand, the second source line S2 is connected to the source electrode of TFT-D of the fourth subpixel SP-D.

The liquid crystal capacitor CLC-A of the first subpixel SP-A is subjected to a voltage pull-up (or pull-down) by the CS bus line CS-A. The liquid crystal capacitor CLC-B of the second subpixel SP-B is subjected to a voltage pull-down (or pull-up) by the CS bus line CS-B. And the liquid crystal capacitors CLC-C and CLC-D of the third and fourth subpixels SP-C and SP-D are subjected to both a voltage pull-up (or pull-down) by the CS bus line CS-A and a voltage pull-down (or pull-up) by the CS bus line CS-B. As for the third subpixel SP-C, however, the storage capacitor CCS-C1 produced with respect to the CS bus line CS-A has a greater electrostatic capacitance value than the storage capacitor CCS-C2 produced with respect to the CS bus line CS-B. As for the fourth subpixel SP-C, on the other hand, the storage capacitor CCS-D2 produced with respect to the CS bus line CS-B has a greater electrostatic capacitance value than the storage capacitor CCS-D1 produced with respect to the CS bus line CS-A. Consequently, the liquid crystal capacitor CLC-C of the third subpixel SP-C is affected by the voltage pull-up (or pull-down) by the CS bus line CS-A more significantly than by the voltage pull-down (or pull-up) by the CS bus line CS-B. Meanwhile, the liquid crystal capacitor CLC-D of the fourth subpixel SP-D is affected by the voltage pull-down (or pull-up) by the CS bus line CS-B more significantly than by the voltage pull-up (or pull-down) by the CS bus line CS-A.

In this manner, due to the difference in electrostatic capacitance value between the two storage capacitors associated with the CS bus lines CS-A and CS-B, the voltage pull-up (or pull-down) caused by the CS bus line CS-A prevails in the third subpixel SP-C, while the voltage pull-down (or pull-up) caused by the CS bus line CS-B prevails in the fourth subpixel SP-D. It should be noted that the storage capacitor CCS-A connected to the CS bus line CS-A for the first subpixel SP-A is approximately equal to the storage capacitor CCS-B connected to the CS bus line CS-B for the second subpixel.

As can be seen, the liquid crystal display device 600C has a 4VT structure. In FIG. 37, two branched lines of a single S bus line are illustrated to make the reader understand this arrangement more easily. Alternatively, two source lines, to which equivalent source signals are supplied, may be provided, too.

Figure 38:
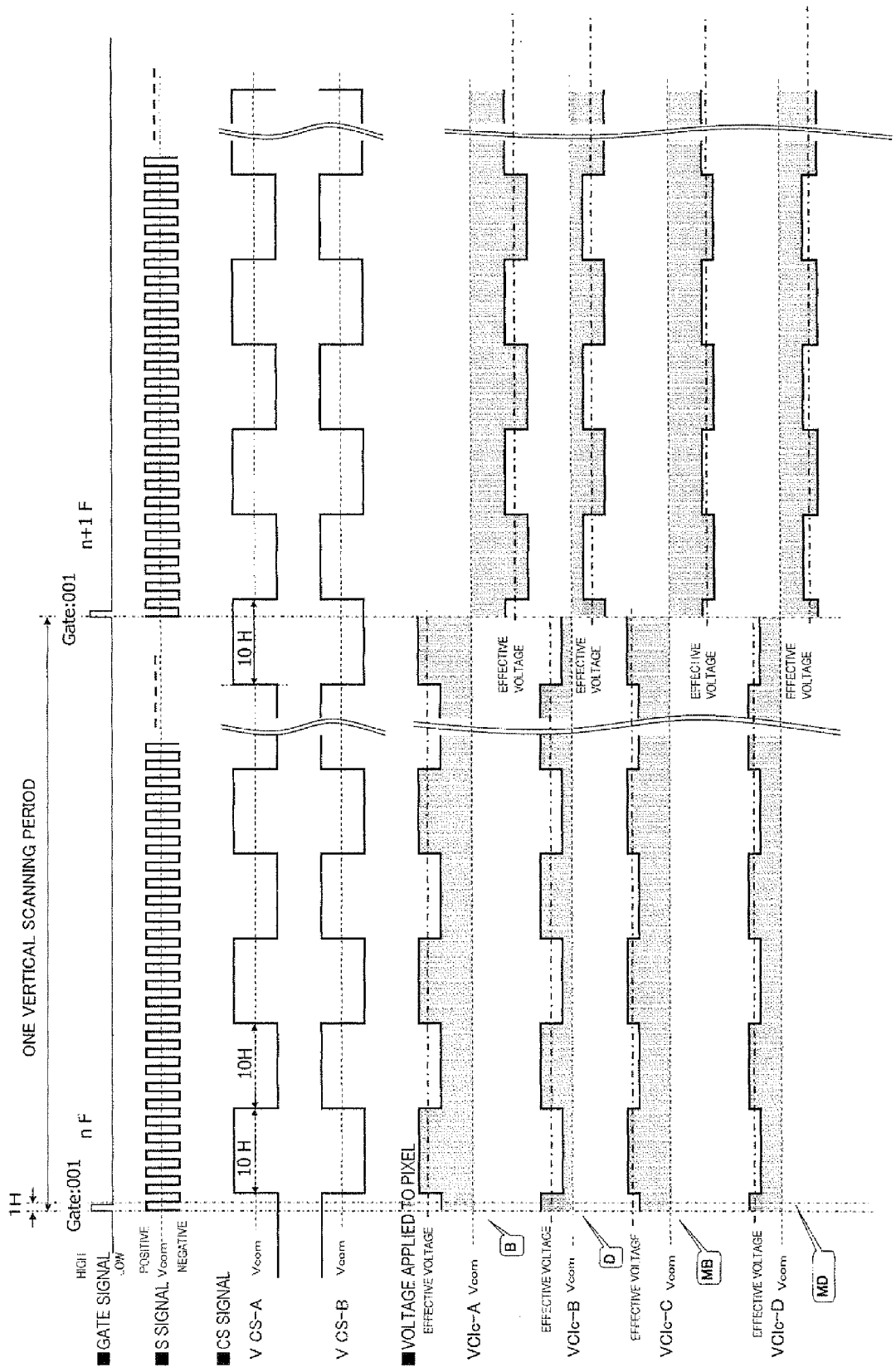
FIG. 38 shows the waveforms of signals applied to a liquid crystal display device 600C.

Hereinafter, the signals supplied to the liquid crystal display device 600C will be described with reference to FIGS. 37 and 38. The signal waveform diagram illustrated in FIG. 38 shows the waveforms of a Gate signal supplied to the G bus line, CS signals VCS-A and VCS-B supplied to the CS bus lines CS-A and CS-B, and voltages VClc-A, VClc-B, VClc-C and VClc-D applied to the liquid crystal capacitors CLC-A, CLC-B, CLC-C and CLC-D of the first, second, third and fourth subpixels SP-A, SP-B, SP-C and SP-D, respectively. In FIG. 38, the one-dot chain on the waveform of the voltage applied to the pixel also indicates the effective voltage for the subpixel electrode.

The influence of the CS bus line CS-A prevails in the liquid crystal capacitor CLC-C of the third subpixel SP-C, while the influence of the CS bus line CS-B prevails in the liquid crystal capacitor CLC-D of the fourth subpixel SP-D. As also can be seen from FIG. 38, the effective voltages decrease in the order of the first, third, fourth and second subpixels SP-A, SP-C, SP-D and SP-B. As a result, the first, second, third and fourth subpixels SP-A, SP-B, SP-C and SP-D become bright, dark, moderately bright, and moderately dark subpixels, respectively. Also, in this case, a typical dot inversion drive is carried out and the polarity of each signal voltage and the polarities of pixels that are adjacent to each other in the row and column directions invert every vertical scanning period. However, their luminance ranking remains the same. It should be noted that the signals shown in FIG. 38 could also be supplied to the liquid crystal display device 600B shown in FIG. 35.

Figure 39:
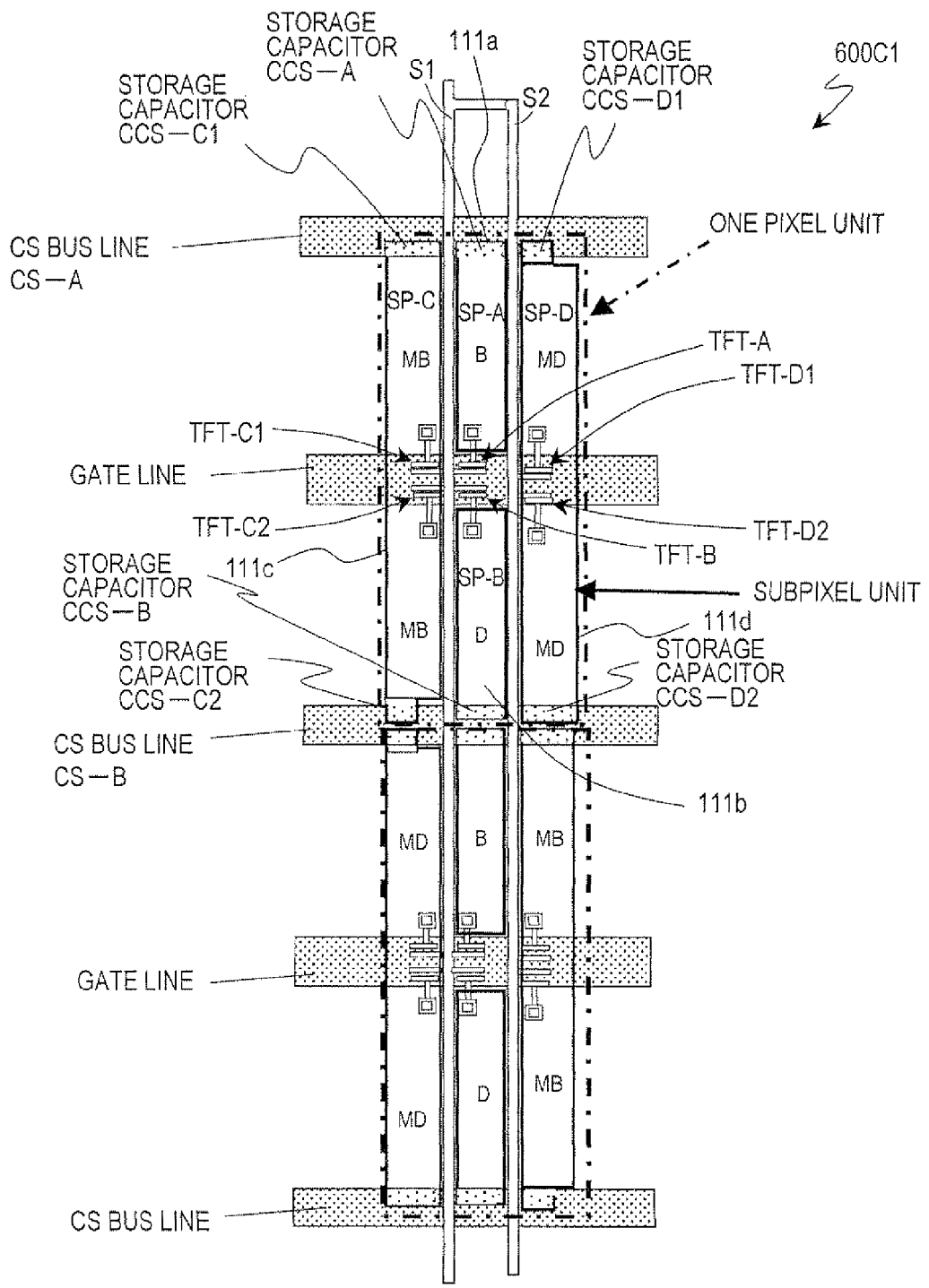
FIG. 39 schematically illustrates the structure on the TFT substrate of a liquid crystal display device 600C1 as yet another preferred embodiment of the present invention.

FIG. 39 schematically illustrates a plan view of the TFT substrate of a liquid crystal display device 600C1 as another preferred embodiment of the present invention. In this liquid crystal display device 600C1, each pixel includes first, second, third and fourth subpixels SP-A, SP-B, SP-C and SP-D. The first and second subpixels SP-A and SP-B are arranged in the column direction (i.e., y direction), and the third and fourth subpixels SP-C and SP-D are arranged so as to interpose the first and second subpixels SP-A and SP-B between them in the row direction (i.e., x direction).

The first, second, third and fourth subpixels SP-A, SP-B, SP-C and SP-D are defined by subpixel electrodes 111a, 111b, 111c and 111d, respectively, of which the lengths are substantially equal to each other as measured in the row direction (i.e., x direction). When measured in the column direction (i.e., y direction), on the other hand, the subpixel electrodes 111a and 111b are approximately a half as long as the subpixel electrodes 111c and 111d. Consequently, the first, second, third and fourth subpixels SP-A, SP-B, SP-C and SP-D have an area ratio of one to one to two to two.

The first and second subpixels SP-A and SP-B include TFT-A and TFT-B, respectively. The third subpixel SP-C includes TFT-C1 and TFT-C2. And the fourth subpixel SP-D includes TFT-D1 and TFT-D2. The G bus line is connected to the respective gate electrodes of TFT-A, TFT-B, TFT-C1, TFT-C2, TFT-D1 and TFT-D2. Thus, the third and fourth subpixels SP-C and SP-D have redundant structures. Also, the first source line S1 of the S bus line is connected to the respective source electrodes of TFT-A, TFT-B, TFT-C1, and TFT-C2 of the first, second and third subpixels SP-A, SP-B and SP-C. On the other hand, the second source line S2 is connected to the respective source electrodes of TFT-D1 and TFT-D2 of the fourth subpixel SP-D.

Also, the CS bus line CS-A is connected to the storage capacitors CCS-A, CCS-C1 and CCS-D1 of the first, third and fourth subpixels SP-A, SP-C and SP-D, while the CS bus line CS-B is connected to the storage capacitors CCS-B, CCS-C2 and CCS-D2 of the second, third and fourth subpixels SP-B, SP-C and SP-D.

Look at the third subpixel SP-C, and it can be seen that the subpixel electrode 111c of the third subpixel SP-C is partially notched in a region where the subpixel electrode 111c overlaps with the CS bus line CS-B. The area of overlap between the subpixel electrode 111c and the CS bus line CS-B is smaller than the area of overlap between the subpixel electrode 111c and the CS bus line CS-A. Therefore, the storage capacitor CCS-C1 of the third subpixel SP-C has a greater electrostatic capacitance value than the storage capacitor CCS-C2. Meanwhile, look at the fourth subpixel SP-D, and it can be seen that the subpixel electrode 111d of the fourth subpixel SP-D is partially notched in a region where the subpixel electrode 111d overlaps with the CS bus line CS-A. The area of overlap between the subpixel electrode 111d and the CS bus line CS-A is smaller than the area of overlap between the subpixel electrode 111d and the CS bus line CS-B. Therefore, the storage capacitor CCS-D1 of the fourth subpixel SP-D has a smaller electrostatic capacitance value than the storage capacitor CCS-D2. As a result, the influence of the CS bus line CS-A prevails in the liquid crystal capacitor CLC-C of the third subpixel SP-C, while the influence of the CS bus line CS-B prevails in the liquid crystal capacitor CLC-D of the fourth subpixel SP-D. Consequently, if the first and second subpixels are a bright subpixel and a dark subpixel, respectively, the third subpixel becomes a moderately bright subpixel and the fourth subpixel becomes a moderately dark subpixel. In that case, the bright, moderately bright, moderately dark and dark subpixels have an area ratio of one to two to two to one.

If this liquid crystal display device 600C1 performs a dot inversion drive, one of the two third subpixels belonging to two pixels that are adjacent to each other in the column direction becomes a moderately bright subpixel and the other third subpixel becomes a moderately dark subpixel. Likewise, a subpixel adjacent to a bright subpixel in the column direction becomes a dark subpixel.

In this liquid crystal display device 600C1, the subpixel electrodes 111c and 111d of the third and fourth subpixels SP-C and SP-D overlap with the G bus line, and therefore, a thick insulating film is provided between the G bus line and the subpixel electrodes 111c and 111d to prevent them from being short-circuited with each other. That insulating film is a stack of a gate insulating film and an interlayer insulating film. By providing such a thick insulating film, increase in parasitic capacitance Cgd can be suppressed.

Figure 40:
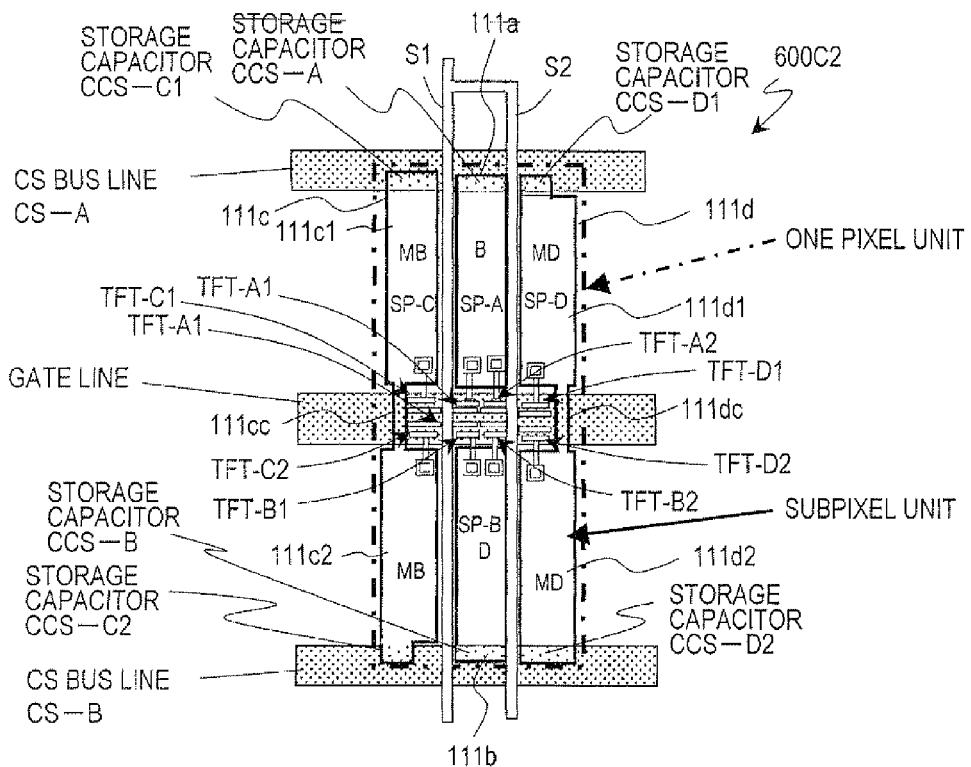
FIG. 40 schematically illustrates the structure on the TFT substrate of a liquid crystal display device 600C2 as yet another preferred embodiment of the present invention.

FIG. 40 schematically illustrates a plan view of the TFT substrate of a liquid crystal display device 600C2 as another preferred embodiment of the present invention.

In this liquid crystal display device 600C2, the first and second subpixels SP-A and SP-B include TFT-A1, TFT-A2 and TFT-B1, TFT-B2, respectively, while the third and fourth subpixels SP-C and SP-D include TFT-C1, TFT-C2 and TFT-D1, TFT-D2, respectively. Thus, the first, second, third and fourth subpixels SP-B, SP-C and SP-D have redundant structures. The respective source electrodes of TFT-A1, TFT-B1, TFT-C1 and TFT-C2 run in the row direction (i.e., in the x direction) from the first source line S1. On the other hand, the respective source electrodes of TFT-A2, TFT-B2, TFT-D1 and TFT-D2 run in the row direction (i.e., in the x direction) from the second source line S2.

Also, in this liquid crystal display device 600C2, the subpixel electrode 111c of the third subpixel SP-C includes electrodes 111c1 and 111c2 and a coupling portion 111cc that couples these electrodes 111c1 and 111c2 together. Likewise, the subpixel electrode 111c1 of the fourth subpixel SP-D includes electrodes 111d1 and 111d2 and a coupling portion 111dc that couples these electrodes 111d1 and 111d2 together. These coupling portions 111cc and 111dc are relatively short in the row direction (i.e., x direction) and the subpixel electrodes 111c, 111d and the G bus line overlap with each other in a smaller area, thereby suppressing the increase in parasitic capacitances Cgd.

Figure 41:
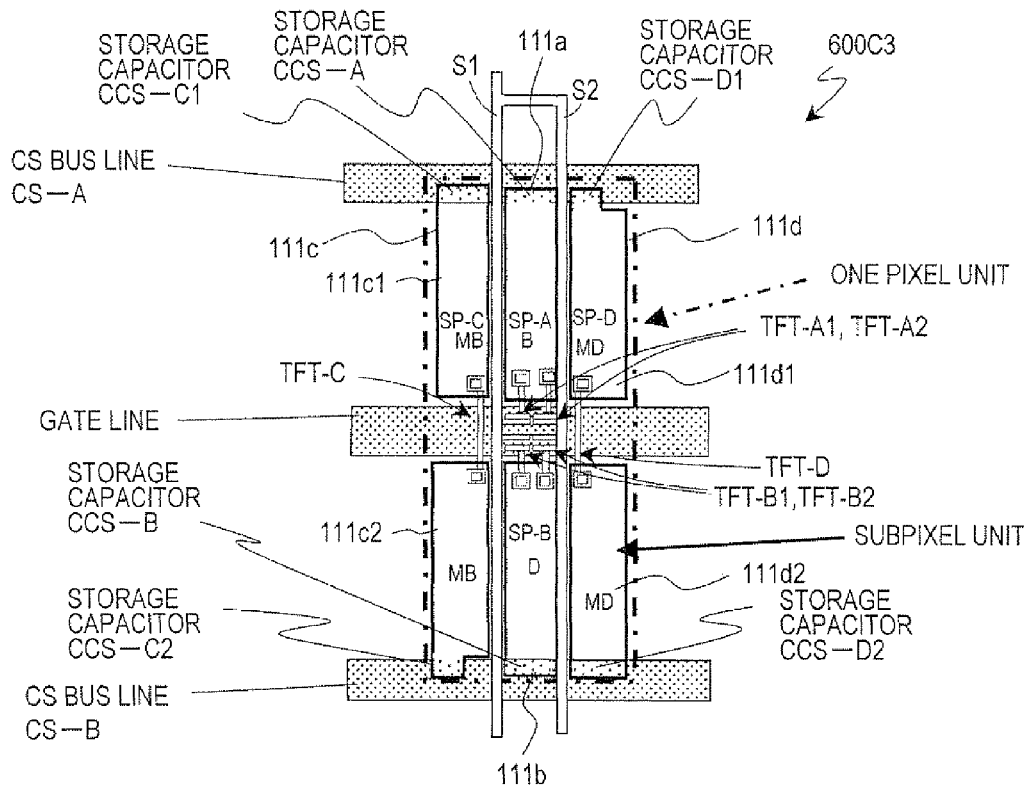
FIG. 41 schematically illustrates the structure on the TFT substrate of a liquid crystal display device 600C3 as yet another preferred embodiment of the present invention.

FIG. 41 schematically illustrates a plan view of the TFT substrate of a liquid crystal display device 600C3 as another preferred embodiment of the present invention.

In this liquid crystal display device 600C3, the subpixel electrode 111c of the third subpixel SP-C includes electrodes 111c1 and 111c2, while the subpixel electrode 111d of the fourth subpixel SP-D includes electrodes 111d1 and 111d2. Also, the third and fourth subpixels SP-C and SP-D include TFT-C and TFT-D, respectively. The drain electrode of TFT-C is arranged parallel to the first source line S1, while that of TFT-D is arranged parallel to the second source line S2. Also, the drain electrode of TFT-C connects together the electrodes 111c1 and 111c2 of the subpixel electrode 111c, while that of TFT-D connects together the electrodes 111*d*1 and 111*d*2 of the subpixel electrode 111*d*. The respective drain electrodes of TFT-C and TFT-D overlap with the G bus line, but are relatively short in the row direction (i.e., x direction), thus suppressing the increase in parasitic capacitances Cgd.

Figure 42:
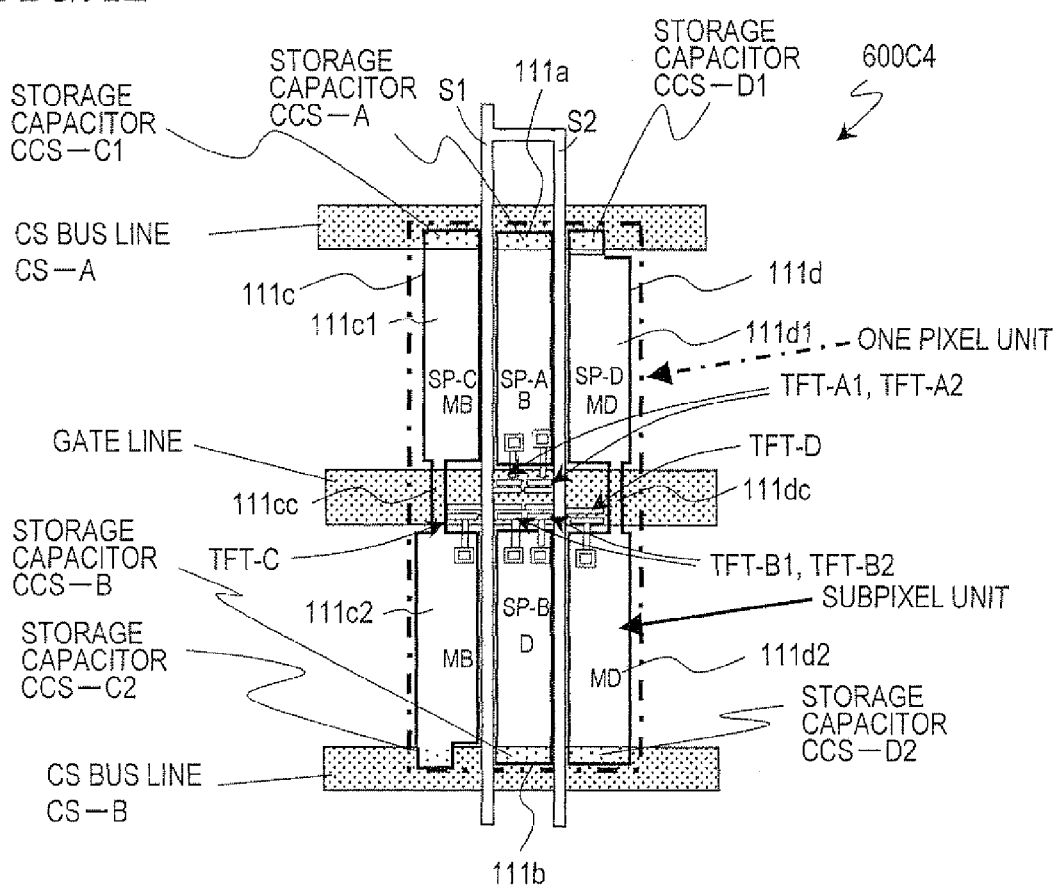
FIG. 42 schematically illustrates the structure on the TFT substrate of a liquid crystal display device 600C4 as yet another preferred embodiment of the present invention.

FIG. 42 schematically illustrates a plan view of the TFT substrate of a liquid crystal display device 600C4 as another preferred embodiment of the present invention.

In this liquid crystal display device 600C4, the first and second subpixels SP-A and SP-B include TFT-A1, TFT-A2 and TFT-B1, TFT-B2, respectively, while the third and fourth subpixels SP-C and SP-D include TFT-C and TFT-D, respectively.

The subpixel electrodes 111*c* and 111*d* of the third and fourth subpixels SP-C and SP-D include coupling portions 111*cc* and 111*dc* that overlap with the G bus line. However, the area of the drain electrode of TFT-C, TFT-D is smaller than the total area of the respective drain electrodes of TFT-A1 and TFT-A2 of the first subpixel SP-A or the total area of the respective drain electrodes of TFT-B1 and TFT-B2 of the first subpixel SP-B. Thus, the parasitic capacitances Cgd between the respective drain electrodes of TFTs of the third and fourth subpixels SP-C and SP-D and the G bus line can be reduced. As a result, the first, second, third and fourth subpixels SP-A, SP-B, SP-C and SP-D can have a substantially even Cgd ratio, and the difference in the feedthrough voltage of the drain voltage can be reduced to about 50 mV or less, for example. Consequently, the occurrence of a flicker can be minimized.

Hereinafter, the viewing angle dependences of the γ characteristics of liquid crystal display devices with the three and four division structures will be described.

Figure 43:
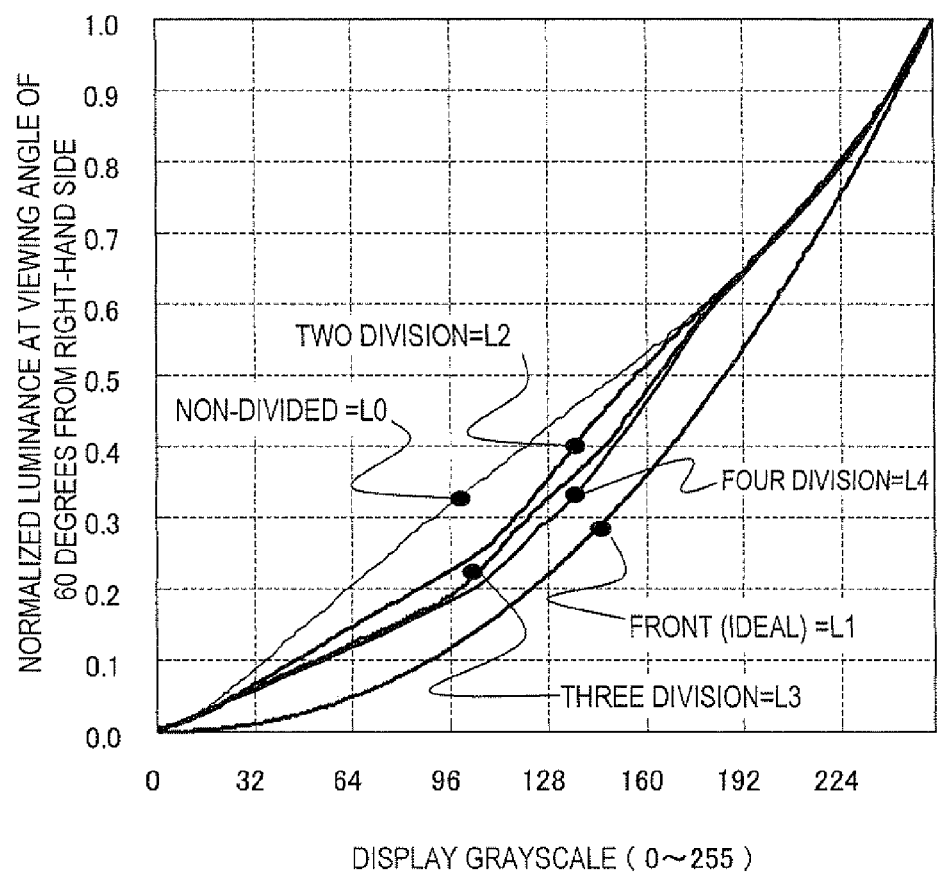
FIG. 43 is a graph showing the viewing angle dependences of the γ characteristics in a liquid crystal display device with a 4VT structure.

FIG. 43 shows the γ curve L4 of a four division structure at a viewing angle of 60 degrees from the right-hand side in addition to the curves L0, L1, L2 and L3 shown in FIG. 3. As described above, the γ curve L3 of the three division structure is closer to an ideal one than the γ curve L2 of the two division structure is. The γ curve L4 of the four division structure is even closer to the ideal one than the γ curve L3 of the three division structure is, thus realizing a superior viewing angle characteristic.

Figure 44:
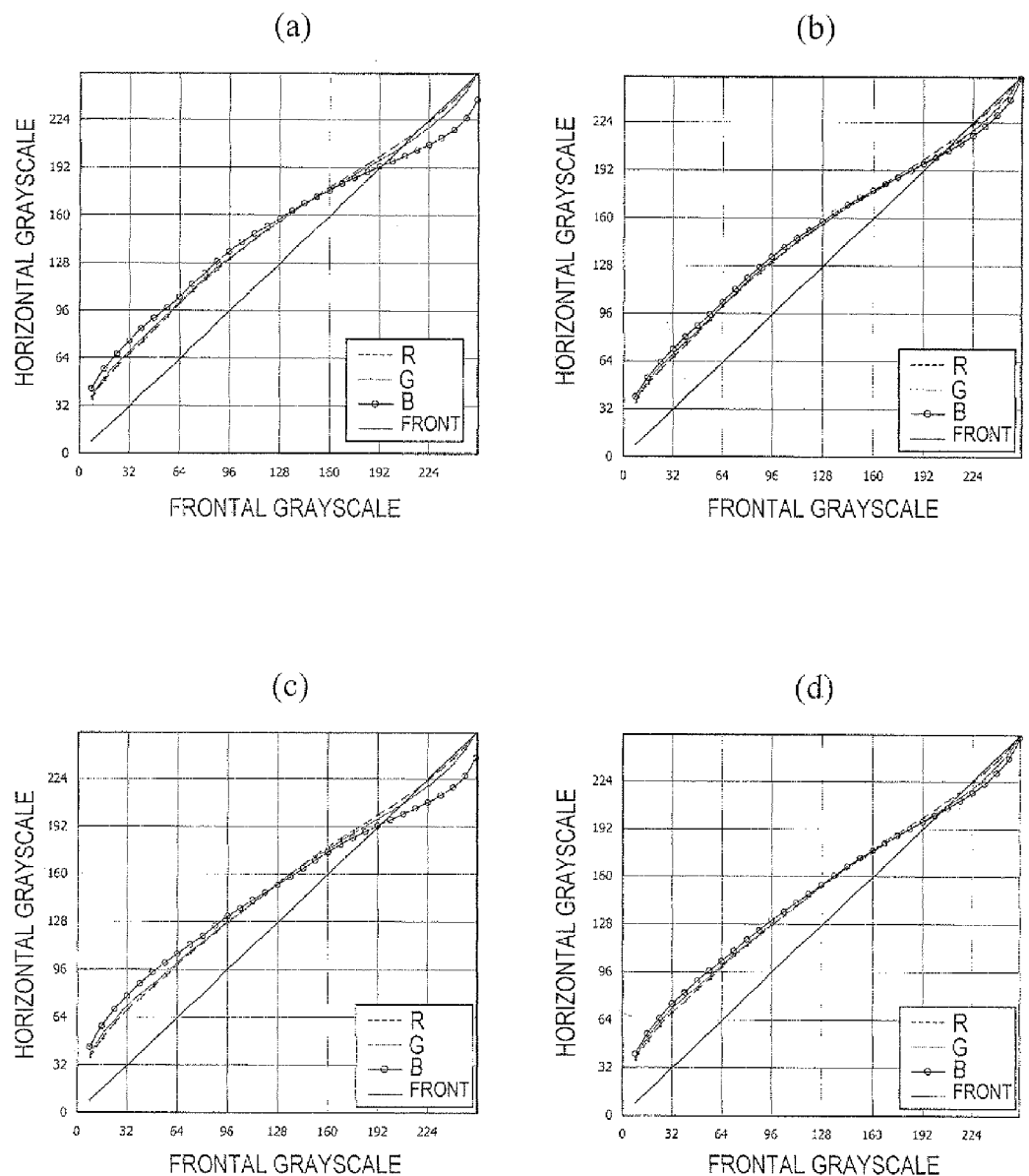
FIGS. 44(a) through 44(d) are graphs showing the viewing angle characteristics of liquid crystal display devices with the 3VT structure.

FIG. 44 illustrates graphs showing the viewing angle characteristics of liquid crystal display devices with the 3VT structure. In these liquid crystal display devices, a moderate subpixel is split into two subpixels as shown in FIG. 16(*a*). The difference between the effective voltages applied to the respective liquid crystal capacitors of those subpixels varies according to the grayscale. Specifically, the effective voltage applied to the liquid crystal capacitor of the bright subpixel is greater than the one applied to the liquid crystal capacitor of the moderate subpixel by at most 0.6 V. On the other hand, the effective voltage applied to the liquid crystal capacitor of the dark subpixel is smaller than the one applied to the liquid crystal capacitor of the moderate subpixel by at most 0.6 V.

Specifically, FIGS. 44(*a*) and 44(*b*) illustrate graphs showing the viewing angle dependences of the γ characteristics of liquid crystal display devices with the 3VT structure. In these liquid crystal display devices, the respective subpixel electrodes of the bright, moderate, dark and moderate subpixels have an area ratio of one to one to one to one, and the bright, moderate and dark subpixels have an area ratio of one to two to one.

If the red (R), green (G) and blue (B) pixels of a liquid crystal display device have substantially equal gaps, then the liquid crystal display device will have the viewing angle dependence of the γ characteristic such as the one shown in FIG. 44(*a*). In that case, the red (R), green (G) and blue (B) pixels have a gap of 3.4 μm. On the other hand, if the blue pixel (B) of a liquid crystal display device has a smaller gap than the red (R) or green (G) pixel thereof, then the liquid crystal display device will have the viewing angle dependence of the γ characteristic as shown in FIG. 44(*b*). In that case, the red (R) and green (G) pixels will have a gap of 3.4 μm and the blue (B) pixel will have a gap of 3.0 μm. Comparing FIGS. 44(*a*) and 44(*b*) to each other, it can be seen that if the blue pixel has a gap that is equal to that of the red and green pixels, the viewing angle dependence of the γ characteristic for blue is still different from the ideal viewing angle dependence of the γ characteristic even at high grayscales. If the gap of the blue pixel is smaller than that of the red and green pixels, however, such a difference can be reduced.

FIGS. 44(*c*) and 44(*d*) illustrate graphs showing the viewing angle dependences of the γ characteristics of liquid crystal display devices with the 3VT structure. In these liquid crystal display devices, the respective subpixel electrodes of the bright, moderate, dark and moderate subpixels have an area ratio of 1 to 0.5 to 1 to 0.5, and the bright, moderate and dark subpixels have an area ratio of one to one to one.

If the red (R), green (G) and blue (B) pixels of a liquid crystal display device have substantially equal gaps, then the liquid crystal display device will have the viewing angle dependence of the γ characteristic such as the one shown in FIG. 44(*c*). In that case, the red (R), green (G) and blue (B) pixels have a gap of 3.4 μm. On the other hand, if the blue pixel (B) of a liquid crystal display device has a smaller gap than the red (R) or green (G) pixel thereof, then the liquid crystal display device will have the viewing angle dependence of the γ characteristic as shown in FIG. 44(*d*). In that case, the red (R) and green (G) pixels will have a gap of 3.4 μm and the blue (B) pixel will have a gap of 3.0 μm.

Comparing FIGS. 44(*c*) and 44(*d*) to each other, it can be seen that if the blue pixel has a gap that is equal to that of the red and green pixels, the viewing angle dependence of the γ characteristic for blue is quite different from the ideal one at high grayscales. If the gap of the blue pixel is smaller than that of the red and green pixels, however, such a difference can be reduced. Furthermore, comparing FIGS. 44(*a*) through 44(*d*) to each other, it can also be seen that if the bright, moderate, and dark subpixels have a substantially even area ratio, the viewing angle dependence of the γ characteristic comes even closer to the ideal one.

Next, the viewing angle characteristics of liquid crystal display devices with the 4VT structure will be described with reference to FIG. 45. In these liquid crystal display devices, the bright, moderately bright, moderately dark and dark subpixels have an area ratio of one to one to one to one. The difference between the effective voltages applied to the respective liquid crystal capacitors of those subpixels varies according to the grayscale. Specifically, the effective voltage applied to the liquid crystal capacitor of the moderately bright subpixel is greater than the one applied to the liquid crystal capacitor of the moderately dark subpixel by at most 0.6 V. The effective voltage applied to the liquid crystal capacitor of the bright subpixel is greater than the one applied to the liquid crystal capacitor of the moderately bright subpixel by at most 0.4 V. And the effective voltage applied to the liquid crystal capacitor of the dark subpixel is smaller than the one applied to the liquid crystal capacitor of the moderately dark subpixel by at most 0.4 V.

If the red (R), green (G) and blue (B) pixels of a liquid crystal display device have substantially equal gaps, then the liquid crystal display device will have the viewing angle dependence of the γ characteristic such as the one shown in FIG. 45(a). In that case, the red (R), green (G) and blue (B) pixels have a gap of 3.4 μm. On the other hand, if the blue pixel (B) of a liquid crystal display device has a smaller gap than the red (R) or green (G) pixel thereof, then the liquid crystal display device will have the viewing angle dependence of the γ characteristic as shown in FIG. 45(b). In that case, the red (R) and green (G) pixels will have a gap of 3.4 μm and the blue (B) pixel will have a gap of 3.0 μm.

Comparing FIGS. 45(a) and 45(b) to each other, it can be seen that if the blue pixel has a gap that is equal to that of the red and green pixels, the viewing angle dependence of the γ characteristic for blue is quite different from the ideal one at high grayscales. If the gap of the blue pixel is smaller than that of the red and green pixels, however, such a difference can be reduced. Furthermore, comparing FIGS. 44 and 45 to each other, it can also be seen that the viewing angle dependence of the γ characteristic in the liquid crystal display device with the 4VT structure comes even closer to the ideal one than in the liquid crystal display device with the 3VT structure.

The liquid crystal display device of the present invention has such a wide viewing angle characteristic and achieves such high display quality as to be used effectively as a display device for a TV receiver with a big screen size. A TV receiver according to the present invention includes a known device such as a tuner for receiving TV broadcasts and the liquid crystal display device described above.

Figure 46:
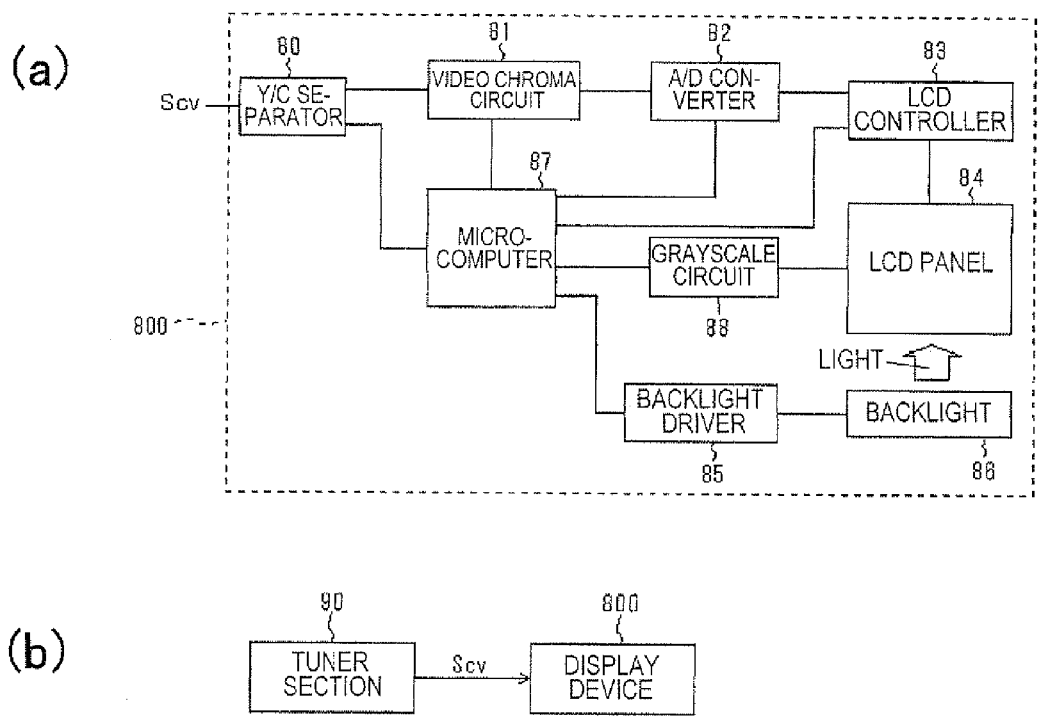
FIGS. 46(a) and 46(b) are schematic representations of a TV receiver including a liquid crystal display device according to any of the preferred embodiments of the present invention.
Figure 47:
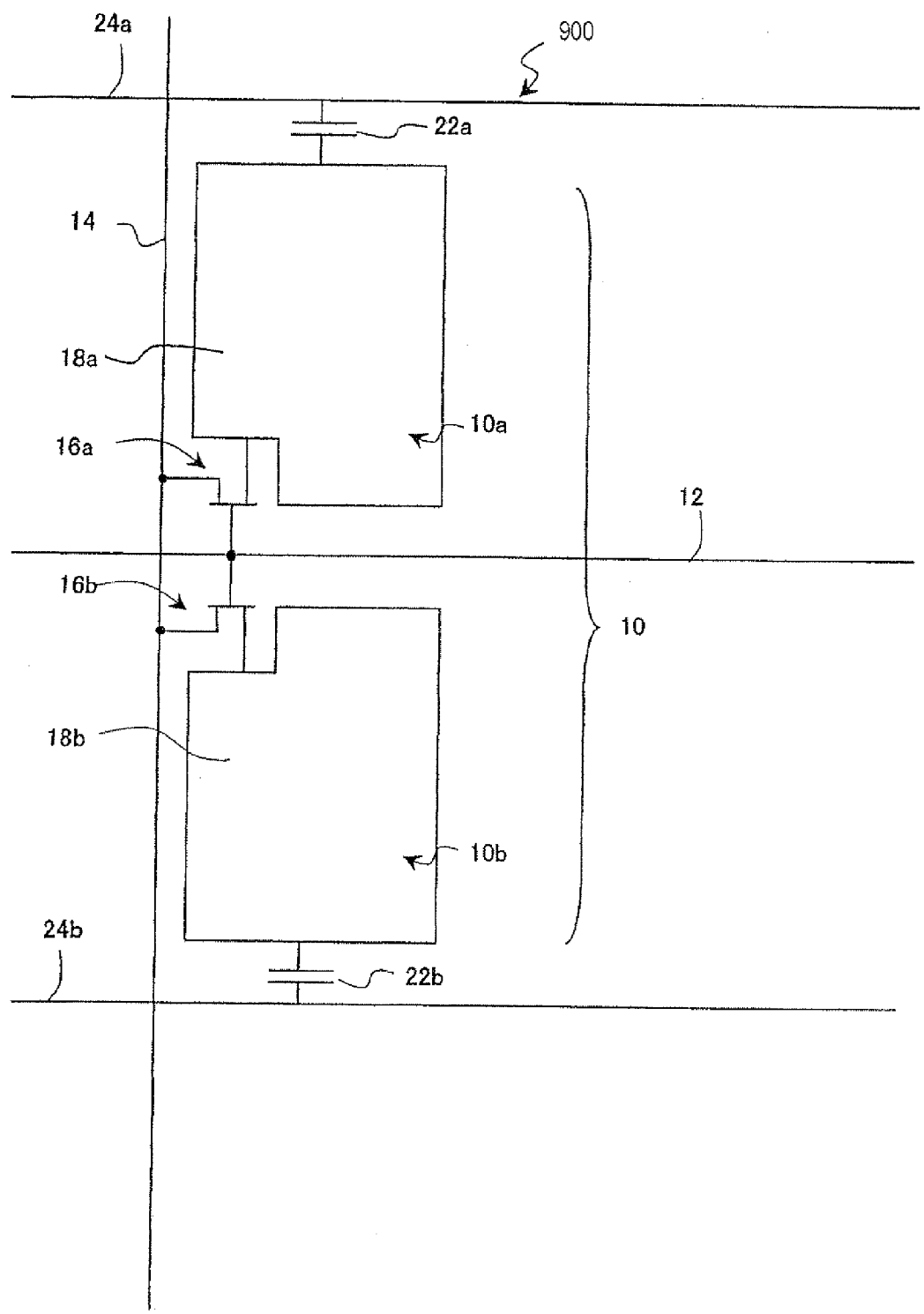
FIG. 47 illustrates the multi-subpixel structure of the liquid crystal display device 900 disclosed in Patent Document No. 3.

Next, an exemplary application of the liquid crystal display device of the present invention to a TV receiver will be described. FIG. 46 is a block diagram illustrating a configuration for a display device 800 for such a TV receiver. The display device 800 includes a Y/C separator 80, a video chroma circuit 81, an A/D converter 82, an LCD controller 83, an LCD panel 84, a backlight driver 85, a backlight 86, a microcomputer 87 and a grayscale circuit 88. The LCD panel 84 includes a display section, which is implemented as an active-matrix-addressed array of pixels, and a source driver and a gate driver for driving the display section.

In the display device 800 with such a configuration, first of all, a composite color video signal Scv is input externally as a television signal to the Y/C separator 80, where the video signal is separated into a luminance signal and a chrominance signal. These luminance and chrominance signals are then converted by the video chroma circuit 81 into an analog RGB signal representing the three primary colors of light, which is then converted by the A/D converter 82 into a digital RGB signal to be input to the LCD controller 83 after that. Meanwhile, the Y/C separator 80 also extracts horizontal and vertical sync signals from the composite color video signal Scv that has been input externally and then passes them to the LCD controller 83, too, by way of the microcomputer 87.

The LCD controller 83 generates and outputs a driver data signal based on the digital RGB signal that has been supplied from the A/D converter 82 (and that corresponds to the digital video signal Dv in the preferred embodiments described above). In addition, the LCD controller 83 also generates a timing control signal for operating a source driver and a gate driver in the LCD panel 84 just as described for the preferred embodiments of the present invention based on the sync signals and then gives those timing control signals to the source driver and the gate driver. Meanwhile, the grayscale circuit 88 generates grayscale voltages for the three primary colors R, G and B for color display and also supplies those grayscale voltages to the LCD panel 84.

Based on the driver data signal, timing control signal and grayscale voltages, the internal source and gate drivers of the LCD panel 84 generate drive signals (such as a data signal and a scan signal). And based on those drive signals, a color image is presented on the display section in the LCD panel 84. To present an image on this LCD panel 84, the LCD panel 84 needs to be irradiated with light from behind it. In this display device 800, the backlight driver 85 drives the backlight 86 under the control of the microcomputer 87, thereby irradiating the LCD panel 84 with light coming from behind it.

The control of the overall system, including the processing described above, is carried out by the microcomputer 87. As the externally input video signal (i.e., the composite color video signal), not only a video signal representing a TV broadcast but also a video signal captured with a camera and a video signal that has been transmitted over the Internet can be used as well. And an image based on any of those various video signals can be presented on this display device 800.

When an image representing a TV broadcast is presented on the display device 800 with such a configuration, a tuner section 90 is connected to the display device 800 as shown in FIG. 46(b). That tuner section 90 extracts a signal representing a channel to receive from the broadcasting wave (i.e., RF signal) that has been received at an antenna (not shown), converts the signal into an intermediate frequency signal, and detects that intermediate frequency signal, thereby extracting a composite color video signal Scv as a TV signal. That composite color video signal Scv is input to the display device 800 as described above, where an image represented by the composite color video signal Scv is presented.

The entire disclosures of Japanese Patent Applications Nos. 2007-66724 and 2007-280865, on which the present application claims priority, are hereby incorporated by reference.

INDUSTRIAL APPLICABILITY

The present invention is applicable particularly effectively to an LCD TV set with a big screen size and a wide viewing angle characteristic.

The invention claimed is:
1. A liquid crystal display device comprising:
a plurality of pixels that are arranged in rows and columns so as to form a matrix pattern; and TFTs, source bus lines, gate bus lines and CS bus lines, which are associated with the respective pixels,
wherein each said pixel includes at least three subpixels with liquid crystal capacitors that are able to retain mutually different voltages,
wherein by supplying a signal that makes two of the at least three subpixels display mutually different luminances at least at a certain grayscale tone from the source, gate and CS bus lines to each said pixel, the at least three subpixels are able to display mutually different luminances;
wherein each said pixel is associated with at least three TFTs for the at least three subpixels, one source bus line, at least one gate bus line and at least two CS bus lines,
wherein each of the TFTs associated with the at least three subpixels includes a gate electrode, a source electrode and a drain electrode;
wherein when the at least three subpixels are comprised of first, second and third subpixels and the at least two CS bus lines are comprised of first and second CS bus lines, the first subpixel has a storage capacitor that is connected to the first CS bus line, the second subpixel has a storage capacitor that is connected to the second CS bus line, and the third subpixel has a storage capacitor that is connected to the first CS bus line and a storage capacitor that is connected to the second CS bus line; and
wherein the pixels include a red pixel to represent the color red, a blue pixel to represent the color blue, and a green pixel to represent the color green, and wherein the blue pixel has a narrower cell gap than the red pixel or the green pixel.

2. The liquid crystal display device of claim 1, wherein the at least three subpixels have liquid crystal capacitors, which include at least three subpixel electrodes, a liquid crystal layer, and a counter electrode that faces the at least three subpixel electrodes with the liquid crystal layer interposed between them, and wherein the counter electrode is a single electrode that is provided in common for the at least three subpixel electrodes.

3. A liquid crystal display device comprising:

a plurality of pixels that are arranged in rows and columns so as to form a matrix pattern; and TFTs, source bus lines, gate bus lines and CS bus lines, which are associated with the respective pixels, wherein each said pixel includes at least three subpixels with liquid crystal capacitors that are able to retain mutually different voltages, wherein by supplying a signal that makes two of the at least three subpixels display mutually different luminances at least at a certain grayscale tone from the source, gate and CS bus lines to each said pixel, the at least three subpixels are able to display mutually different luminances;

wherein each said pixel is associated with at least three TFTs for the at least three subpixels, one source bus line, at least one gate bus line and at least two CS bus lines, wherein each of the TFTs associated with the at least three subpixels includes a gate electrode, a source electrode and a drain electrode wherein if the at least three subpixels are comprised of first, second and third subpixels and the at least two CS bus lines are comprised of first and second CS bus lines, the first subpixel has a storage capacitor that is connected to the first CS bus line, the second subpixel has a storage capacitor that is connected to the second CS bus line, and the third subpixel has a storage capacitor that is connected to the at least one gate bus line;

wherein the first, second and third subpixels are arranged between two adjacent gate bus lines, and wherein the gate electrode of the TFT of each of the first, second and third subpixels is connected to one of the two gate bus lines, and wherein the first and second CS bus lines are also arranged between the two gate bus lines, and wherein the storage capacitor of the third subpixel is connected to the other gate bus line of the two.

* * * * *